(12) United States Patent
Govindan et al.

(10) Patent No.: US 10,463,985 B2
(45) Date of Patent: *Nov. 5, 2019

(54) MOBILE HUMIDIFICATION-DEHUMIDIFICATION DESALINATION SYSTEMS AND METHODS

(71) Applicant: Gradiant Corporation, Woburn, MA (US)

(72) Inventors: Prakash Narayan Govindan, Singapore (SG); Maximus G. St. John, Singapore (SG); Steven Lam, Singapore (SG)

(73) Assignee: Gradiant Corporation, Woburn, MA (US)

( * ) Notice: Subject to any disclaimer, the term of this patent is extended or adjusted under 35 U.S.C. 154(b) by 344 days.

This patent is subject to a terminal disclaimer.

(21) Appl. No.: 15/161,186

(22) Filed: May 20, 2016

(65) Prior Publication Data
US 2016/0375375 A1     Dec. 29, 2016

Related U.S. Application Data

(63) Continuation-in-part of application No. 14/718,483, filed on May 21, 2015, now Pat. No. 10,143,935.

(51) Int. Cl.
*B01D 1/14* (2006.01)
*B01D 5/00* (2006.01)
(Continued)

(52) U.S. Cl.
CPC .............. *B01D 5/006* (2013.01); *B01D 1/14* (2013.01); *B01D 5/003* (2013.01); *C02F 1/04* (2013.01);
(Continued)

(58) Field of Classification Search
CPC .......... B01D 1/14; B01D 5/003; B01D 5/006; C02F 1/04; C02F 1/10; C02F 2103/08
See application file for complete search history.

(56) References Cited

U.S. PATENT DOCUMENTS 2,560,073 A    7/1951   Bloomer
2,560,978 A    7/1951   Persson et al.
(Continued)

FOREIGN PATENT DOCUMENTS

CN         1791557 A         6/2006
CN         101538070         9/2011
(Continued)

OTHER PUBLICATIONS

Achilli et al., Selection of inorganic-based draw solutions for forward osmosis applications. Journal of Membrane Science. 2010;364:233-41. Epub Aug. 14, 2010.
(Continued)

*Primary Examiner* — Jonathan Miller
(74) *Attorney, Agent, or Firm* — Wolf, Greenfield & Sacks, P.C.

(57) ABSTRACT

Embodiments described herein generally relate to humidification-dehumidification desalination systems, including apparatuses that include a vessel comprising a humidification region (e.g., a bubble column humidification region) and a dehumidification region (e.g., a bubble column dehumidification region), mobile humidification-dehumidification (HDH) desalination systems (e.g., systems having a relatively low height and/or a relatively small footprint), and associated systems and methods. Certain embodiments generally relate to methods of operating, controlling, and/or cleaning desalination systems comprising a plurality of desalination units (e.g., HDH desalination units).

19 Claims, 22 Drawing Sheets

(51) Int. Cl.
  *C02F 1/10*    (2006.01)
  *C02F 1/04*    (2006.01)
  *C02F 103/08*  (2006.01)
  *C02F 1/52*    (2006.01)
  *C02F 1/66*    (2006.01)
  *C02F 101/32*  (2006.01)
  *C02F 1/40*    (2006.01)

(52) U.S. Cl.
  CPC .......... *C02F 1/10* (2013.01); *C02F 1/40* (2013.01); *C02F 1/52* (2013.01); *C02F 1/66* (2013.01); *C02F 2101/322* (2013.01); *C02F 2103/08* (2013.01); *C02F 2201/008* (2013.01); *Y02W 10/37* (2015.05)

(56) References Cited

U.S. PATENT DOCUMENTS

| | | |
|---|---|---|
| 2,702,696 A | 2/1955 | Pappas et al. |
| 3,196,864 A | 7/1965 | Johnson |
| 3,214,349 A | 10/1965 | Kehoe et al. |
| 3,232,847 A | 2/1966 | Hoff |
| 3,243,358 A | 3/1966 | McCue |
| 3,257,291 A | 6/1966 | Heinz |
| 3,288,686 A | 11/1966 | Othmer |
| 3,425,935 A | 2/1969 | Cahn |
| 3,434,701 A | 3/1969 | Bauer |
| 3,478,531 A | 11/1969 | Karnofsky |
| 3,558,436 A | 1/1971 | Foley et al. |
| 3,583,895 A | 6/1971 | Othmer |
| 3,606,999 A | 9/1971 | Lawless |
| 3,653,186 A | 4/1972 | McLendon |
| 3,755,088 A | 8/1973 | Osdor |
| 3,783,108 A | 1/1974 | Koivisto et al. |
| 3,860,492 A | 1/1975 | Lowi et al. |
| 4,105,723 A | 8/1978 | Mix |
| 4,252,546 A | 2/1981 | Krugmann |
| 4,276,124 A | 6/1981 | Mock |
| 4,334,886 A | 6/1982 | Tani et al. |
| 4,363,703 A | 12/1982 | ElDifrawi et al. |
| 4,426,322 A | 1/1984 | Stage |
| 4,595,459 A | 6/1986 | Kusakawa |
| 4,624,747 A | 11/1986 | el Din Nasser |
| 4,762,593 A | 8/1988 | Youngner |
| 4,799,941 A | 1/1989 | Westermark |
| 4,820,456 A | 4/1989 | Kiselev |
| 5,096,543 A | 3/1992 | Elmore |
| 5,123,481 A | 6/1992 | Albers et al. |
| 5,176,798 A | 1/1993 | Rodden |
| 5,290,403 A | 3/1994 | Saask |
| 5,378,267 A | 1/1995 | Bros et al. |
| 5,552,022 A | 9/1996 | Wilson |
| 5,724,828 A | 3/1998 | Korenic |
| 5,939,031 A | 8/1999 | Ellis et al. |
| 6,348,137 B1 | 2/2002 | Nommensen |
| 6,423,235 B1 | 7/2002 | Shimoi et al. |
| 6,919,000 B2 | 7/2005 | Klausner et al. |
| 7,081,205 B2 | 7/2006 | Gordon et al. |
| 7,225,620 B2 | 6/2007 | Klausner et al. |
| 7,621,991 B2 | 11/2009 | Ruan |
| 7,823,503 B2 | 11/2010 | Ringstroem |
| 7,832,714 B2 | 11/2010 | Duesel et al. |
| 7,938,888 B2 | 5/2011 | Assaf |
| 7,997,623 B2 | 8/2011 | Williams |
| 8,119,007 B2 | 2/2012 | Bajpayee et al. |
| 8,252,092 B2 | 8/2012 | Govindan et al. |
| 8,292,272 B2 | 10/2012 | Elsharqawy et al. |
| 8,444,829 B2 | 5/2013 | Godshall et al. |
| 8,465,006 B2 | 6/2013 | Elsharqawy et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,778,065 B2 | 7/2014 | Govindan et al. |
| 8,801,910 B2 | 8/2014 | Bazant et al. |
| 8,820,723 B1 | 9/2014 | Sparrow et al. |
| 9,072,984 B2 | 7/2015 | Govindan et al. |
| 9,079,117 B2 | 7/2015 | Govindan et al. |
| 9,120,033 B2 | 9/2015 | Govindan et al. |
| 9,221,694 B1 | 12/2015 | Govindan et al. |
| 9,259,667 B2 * | 2/2016 | Roch ............... B01D 3/007 |
| 9,266,748 B1 | 2/2016 | Govindan et al. |
| 9,320,984 B2 | 4/2016 | Govindan et al. |
| 9,364,771 B2 | 6/2016 | Govindan et al. |
| 9,403,104 B2 | 8/2016 | Govindan et al. |
| 9,416,800 B2 | 8/2016 | Govindan et al. |
| 9,428,404 B2 | 8/2016 | Bajpayee et al. |
| 9,468,864 B2 | 10/2016 | Govindan et al. |
| 9,550,685 B2 | 1/2017 | Klausner et al. |
| 9,556,041 B2 | 1/2017 | Govindan et al. |
| 9,579,590 B2 | 2/2017 | Govindan et al. |
| 9,643,102 B2 | 5/2017 | Al-Sulaiman et al. |
| 9,700,811 B2 | 7/2017 | Govindan et al. |
| 9,790,102 B2 | 10/2017 | Govindan et al. |
| 9,981,860 B2 | 5/2018 | Govindan et al. |
| 10,053,373 B2 | 8/2018 | Govindan et al. |
| 2002/0053505 A1 | 5/2002 | Arrison |
| 2002/0166758 A1 | 11/2002 | Vinz |
| 2003/0092876 A1 | 5/2003 | Beek et al. |
| 2004/0026225 A1 | 2/2004 | Domen |
| 2004/0163536 A1 | 8/2004 | Baudat et al. |
| 2004/0231970 A1 | 11/2004 | Lee et al. |
| 2005/0121304 A1 | 6/2005 | Beckman |
| 2005/0230238 A1 | 10/2005 | Klausner et al. |
| 2006/0231377 A1 | 10/2006 | Costa |
| 2006/0272933 A1 | 12/2006 | Domen et al. |
| 2010/0147673 A1 | 6/2010 | Passarelli |
| 2010/0314228 A1 | 12/2010 | Huang |
| 2010/0314238 A1* | 12/2010 | Frolov ............... B01D 1/0047 203/10 |
| 2011/0056822 A1 | 3/2011 | Elsharqawy et al. |
| 2011/0079504 A1 | 4/2011 | Govindan et al. |
| 2011/0215039 A1 | 9/2011 | Acernese et al. |
| 2011/0266132 A1 | 11/2011 | Takezaki |
| 2012/0031303 A1 | 2/2012 | Contantz et al. |
| 2012/0205236 A1 | 8/2012 | Govindan et al. |
| 2012/0312755 A1 | 12/2012 | Ryan et al. |
| 2013/0074694 A1 | 3/2013 | Govindan et al. |
| 2013/0075940 A1 | 3/2013 | Govindan et al. |
| 2013/0118887 A1 | 5/2013 | Frovlov et al. |
| 2013/0220927 A1 | 8/2013 | Moody et al. |
| 2014/0197022 A1 | 7/2014 | Antar et al. |
| 2014/0291137 A1 | 10/2014 | Barton et al. |
| 2014/0367871 A1 | 12/2014 | Govindan et al. |
| 2015/0047963 A1 | 2/2015 | Roch et al. |
| 2015/0060286 A1 | 3/2015 | Govindan et al. |
| 2015/0068886 A1 | 3/2015 | Domen et al. |
| 2015/0083577 A1 | 3/2015 | Govindan et al. |
| 2015/0107840 A1 | 4/2015 | Ligthelm et al. |
| 2015/0129410 A1 | 5/2015 | Govindan et al. |
| 2015/0190730 A1 | 7/2015 | Govindan et al. |
| 2015/0190731 A1 | 7/2015 | Govindan et al. |
| 2015/0260418 A1 | 9/2015 | Govindan et al. |
| 2015/0290557 A1 | 10/2015 | Govindan et al. |
| 2015/0321118 A1 | 11/2015 | Govindan et al. |
| 2015/0329377 A1 | 11/2015 | Govindan et al. |
| 2015/0353377 A1 | 12/2015 | Al-Sulaiman et al. |
| 2015/0368121 A1 | 12/2015 | Govindan et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0271518 A1 | 9/2016 | Govindan et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2017/0113947 A1 | 4/2017 | Govindan et al. |
| 2017/0334736 A1 | 11/2017 | Lam et al. |
| 2017/0334737 A1 | 11/2017 | Govindan et al. |
| 2018/0236372 A1 | 8/2018 | Govindan et al. |

FOREIGN PATENT DOCUMENTS

| | | |
|---|---|---|
| DE | 1 070 594 B | 12/1959 |
| EP | 0 099 320 A2 | 1/1984 |
| FR | 2 281 896 A1 | 3/1976 |

(56) References Cited

FOREIGN PATENT DOCUMENTS

| GB | 698 966 A | 10/1953 |
|---|---|---|
| GB | 1 235 760 A | 6/1971 |
| JP | S49-75935 U | 7/1974 |
| JP | S51-42078 A | 4/1976 |
| JP | 2006-312134 A | 11/2006 |
| RU | 2239460 C1 | 11/2004 |
| WO | WO 2005/075045 A1 | 8/2005 |
| WO | WO 2007/132477 | 11/2007 |
| WO | WO 2009/103112 A1 | 8/2009 |
| WO | WO 2011/028853 | 3/2011 |
| WO | WO 2011/137149 | 11/2011 |
| WO | WO 2013/037047 | 3/2013 |
| WO | WO 2013/072709 A2 | 5/2013 |
| WO | WO 2013/150040 A2 | 10/2013 |
| WO | WO 2013/158315 | 10/2013 |
| WO | WO 2014/200829 | 12/2014 |
| WO | WO 2015/021062 A1 | 2/2015 |
| WO | WO 2015/042584 | 3/2015 |
| WO | WO 2015/061194 A1 | 4/2015 |
| WO | WO 2017/030941 A1 | 2/2017 |
| WO | WO 2017/127607 A1 | 7/2017 |

OTHER PUBLICATIONS

Chung et al., Forward osmosis processes: Yesterday, today and tomorrow. Desalination. 2012;287:78-81. Epub Jan. 11, 2011.
Ge et al., Exploration of polyelectrolytes as draw solutes in forward osmosis processes. Water Research. 2012;46:1318-26. Epub Dec. 27, 2011.
Invitation to Pay Additional Fees dated Oct. 7, 2016 for PCT/US16/33667.
International Search Report and Written Opinion dated Dec. 9, 2016 for PCT/US16/33667.
International Preliminary Report on Patentability dated Nov. 30, 2017 for PCT/US16/33667.
Office Action dated Jun. 29, 2017 for U.S. Appl. No. 14/718,483 and claims as pending.
Office Action dated Nov. 24, 2017 for U.S. Appl. No. 14/718,483 and claims as pending.
Office Action dated Jun. 30, 2017 for U.S. Appl. No. 14/718,510 and claims as pending.
Office Action dated Nov. 24, 2017 for U.S. Appl. No. 14/718,510 and claims as pending.
Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>.
Govindan, Thermal Design of Humidification Dehumidification Systems for Affordable and Small-scale Desalination. Doctoral Thesis. Massachusetts Institute of Technology. Sep. 2012 286 pages.
Kwak et al., New Insights on the Role of Multivalent Ions in Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.
McGinnis et al., Pilot demonstration of the $NH_3/CO_2$ forward osmosis desalination process on high salinity brines. Desalination. Mar. 2013;312:67-74. Supporting information included.
Office Action dated Mar. 16, 2018 for U.S. Appl. No. 14/718,483 and claims pending.
Notice of Allowance dated Jul. 26, 2018 for U.S. Appl. No. 14/718,483 and claims allowed.
Office Action dated Mar. 16, 2018 for U.S. Appl. No. 14/718,510 and claims pending.
Notice of Allowance dated Jul. 26, 2018 for U.S. Appl. No. 14/718,510 and claims allowed.
[No Author Listed], Recuperator. Wikipedia Entry. As edited on Jul. 17, 2012. Accessed May 11, 2018 at <https://en.wikipedia.org/w/index.php?title=Recuperator&oldid=502784184>. 3 pages.
Ribeiro et al., Gas-Liquid Direct-Contact Evaporation: A Review, Chem. Eng. Technol. 2005;28(10):1081-107.
U.S. Appl. No. 16/069,896, filed Jul. 13, 2018, Lam et al.

\* cited by examiner

US 10,463,985 B2

MOBILE HUMIDIFICATION-DEHUMIDIFICATION DESALINATION SYSTEMS AND METHODS

RELATED APPLICATIONS

This application is a continuation-in-part of U.S. application Ser. No. 14/718,483, filed on May 21, 2015, and entitled "Systems Including an Apparatus Comprising Both a Humidification Region and a Dehumidification Region," which is incorporated herein by reference in its entirety.

TECHNICAL FIELD

Embodiments described herein generally relate to a humidification-dehumidification (HDH) desalination system, which in specific embodiments may be a bubble column HDH desalination system, and methods of operating, controlling, and/or cleaning desalination systems comprising a plurality of HDH desalination units.

BACKGROUND

Fresh water shortages are becoming an increasing problem around the world, with demand for fresh water for human consumption, irrigation, and/or industrial use continuing to grow. In order to meet the growing demand for fresh water, various desalination methods may be used to produce fresh water from salt-containing water such as seawater, brackish water, water produced from oil and/or gas extraction processes, flowback water, and/or wastewater. For example, one desalination method is a humidification-dehumidification (HDH) process, which involves contacting a saline solution with a carrier gas in a humidifier, such that the carrier gas becomes heated and humidified. The heated and humidified gas is then brought into contact with cold water in a dehumidifier, thereby producing pure water.

However, HDH systems and processes often involve certain drawbacks. For example, due to the use of a carrier gas in HDH systems, a large percentage of non-condensable gas (e.g., air) is generally present, which can lead to relatively low heat and mass transfer rates. In addition, the presence of a non-condensable gas in a dehumidifier can increase the thermal resistance to vapor condensation on a cold surface, thereby reducing the effectiveness of surface condensers. HDH systems may, additionally, require relatively large amounts of energy to operate. HDH systems with improved properties such as, for example, reduced power consumption and/or increased heat and mass transfer rates in the presence of non-condensable gases, are therefore desirable.

SUMMARY

Apparatuses comprising both a humidification region and a dehumidification region, and use of the apparatuses in various heat and mass exchange systems, are disclosed. In another aspect, mobile humidification-dehumidification (HDH) desalination systems, and methods of operating, controlling, and/or cleaning desalination systems comprising a plurality of HDH desalination units, are also disclosed. The subject matter of the present invention involves, in some cases, interrelated products, alternative solutions to a particular problem, and/or a plurality of different uses of one or more systems and/or articles.

Certain embodiments relate to desalination systems. In some embodiments, a desalination system comprises a vessel comprising a humidification region comprising a humidification region liquid inlet fluidically connected to a source of salt-containing water, a humidification region gas inlet fluidically connected to a source of a gas, and a humidification region gas outlet. In some embodiments, the humidification region is configured to produce a vapor-containing humidification region gas outlet stream enriched in water vapor relative to the gas received from the gas inlet. In some cases, the vessel further comprises a dehumidification region comprising a dehumidification region gas inlet fluidically connected to the humidification region gas outlet, a dehumidification region gas outlet, and a dehumidification region water outlet. In certain cases, the dehumidification region is configured to remove at least a portion of the water vapor from the vapor-containing humidification region gas outlet stream to produce a dehumidification region water outlet stream and a dehumidification region gas outlet stream lean in water vapor relative to the humidification region gas outlet stream.

In some embodiments, the desalination system comprises a vessel comprising a humidification region comprising a humidification region gas inlet fluidically connected to a source of a gas, a humidification region gas outlet, and at least one humidification chamber containing a liquid layer comprising an amount of salt-containing water. In some cases, the humidification region is configured to produce a vapor-containing humidification region gas outlet stream enriched in water vapor relative to the gas received from the gas inlet. In some embodiments, the vessel further comprises a dehumidification region comprising a dehumidification region gas inlet fluidically connected to the humidification region gas outlet, a dehumidification region water outlet, and at least one dehumidification chamber containing a liquid layer comprising an amount of water. In certain embodiments, the dehumidification region is configured to remove at least a portion of the water vapor from the humidification region gas outlet stream to produce a dehumidification region water outlet stream and a dehumidification region gas outlet stream lean in water vapor relative to the humidification region gas outlet stream. In some cases, the liquid layer of the at least one humidification chamber and/or the liquid layer of the at least one dehumidification chamber have a height of about 0.1 m or less.

In some embodiments, the desalination system comprises a vessel comprising a humidification region comprising a humidification region liquid inlet fluidically connected to a source of salt-containing water, a humidification region gas inlet fluidically connected to a source of a gas, and a humidification region gas outlet. In some embodiments, the humidification region is configured to produce a vapor-containing humidification region gas outlet stream enriched in water vapor relative to the gas received from the gas inlet. In some cases, the vessel further comprises a dehumidification region comprising a dehumidification region gas inlet fluidically connected to the humidification region gas outlet, a dehumidification region gas outlet, and a dehumidification region water outlet. In certain cases, the dehumidification region is configured to remove at least a portion of the water vapor from the vapor-containing humidification region gas outlet stream to produce a dehumidification region water outlet stream and a dehumidification region gas outlet stream lean in water vapor relative to the humidification region gas outlet stream. In some embodiments, the desalination system further comprises a heat exchanger separate from the vessel. In certain cases, the heat exchanger is fluidically connected to the dehumidification region water outlet and the humidification region liquid inlet. In certain embodiments, the heat exchanger is configured to transfer heat from the dehumidification region water outlet stream to the humidification region liquid inlet stream.

According to some embodiments, the desalination system comprises a vessel comprising a humidification region comprising a humidification region liquid inlet fluidically connected to a source of salt-containing water, a humidification region gas inlet fluidically connected to a source of a gas, and a humidification region gas outlet. In some embodiments, the humidification region is configured to produce a vapor-containing humidification region gas outlet stream enriched in water vapor relative to the gas received from the gas inlet. In some cases, the vessel further comprises a dehumidification region comprising a dehumidification region gas inlet fluidically connected to the humidification region gas outlet, a dehumidification region gas outlet, and a dehumidification region water outlet. In certain cases, the dehumidification region is configured to remove at least a portion of the water vapor from the vapor-containing humidification region gas outlet stream to produce a dehumidification region water outlet stream and a dehumidification region gas outlet stream lean in water vapor relative to the humidification region gas outlet stream. In some embodiments, a portion of a gas stream is extracted from at least one intermediate location in the humidification region and fed to at least one intermediate location in the dehumidification region.

In some embodiments, the desalination system comprises a vessel comprising a humidification region comprising a humidification region gas inlet fluidically connected to a source of a gas, a humidification region gas outlet, and at least one humidification chamber containing a liquid layer comprising an amount of salt-containing water. In some cases, the humidification region is configured to produce a vapor-containing humidification region gas outlet stream enriched in water vapor relative to the gas received from the gas inlet. In some embodiments, the vessel further comprises a dehumidification region comprising a dehumidification region gas inlet fluidically connected to the humidification region gas outlet, a dehumidification region water outlet, and at least one dehumidification chamber containing a liquid layer comprising an amount of water. In certain embodiments, the dehumidification region is configured to remove at least a portion of the water vapor from the humidification region gas outlet stream to produce a dehumidification region water outlet stream and a dehumidification region gas outlet stream lean in water vapor relative to the humidification region gas outlet stream. In some cases, the at least one humidification chamber and/or the at least one dehumidification chamber are fluidically connected to one or more bubble generators.

In some embodiments, the desalination system comprises a vessel. In certain cases, the vessel comprises a bubble column humidification region comprising a humidification region liquid inlet fluidically connected to a source of salt-containing water, a humidification region gas inlet fluidically connected to a source of a gas, a humidification region gas outlet, and one or more bubble generators. In certain embodiments, the bubble column humidification region is configured to produce a vapor-containing humidification region gas outlet stream enriched in water vapor relative to the gas received from the humidification region gas inlet. In certain cases, the vessel further comprises a bubble column dehumidification region comprising a dehumidification region gas inlet fluidically connected to the humidification region gas outlet, a dehumidification region gas outlet, a dehumidification region water outlet, and one or more bubble generators. In certain embodiments, the bubble column dehumidification region is configured to remove at least a portion of the water vapor from the vapor-containing humidification region gas outlet stream to produce a dehumidification region water outlet stream and a dehumidification region gas outlet stream lean in water vapor relative to the humidification region gas outlet stream. In some embodiments, the vessel has a height of about 5 m or less.

In some embodiments, the desalination system comprises a bubble column humidifier. In certain cases, the bubble column humidifier comprises a humidifier liquid inlet fluidically connected to a source of salt-containing water; a humidifier gas inlet fluidically connected to a source of a gas; a humidifier gas outlet; and one or more bubble generators. In some embodiments, the bubble column humidifier is configured to produce a vapor-containing humidifier gas outlet stream enriched in water vapor relative to the gas received from the humidifier gas inlet. In certain embodiments, the bubble column humidifier has a height of about 5 m or less. In certain cases, the bubble column humidifier is configured to evaporate at least about 500 barrels per day. In some embodiments, the desalination system comprises a bubble column dehumidifier. In certain cases, the bubble column dehumidifier comprises a dehumidifier gas inlet fluidically connected to the humidifier gas outlet; a dehumidifier gas outlet; a dehumidifier water outlet; and one or more bubble generators. In some embodiments, the bubble column dehumidifier is configured to remove at least a portion of water vapor from the vapor-containing humidifier gas outlet stream to produce a dehumidifier water outlet stream comprising substantially pure water and a dehumidifier gas outlet stream lean in water vapor relative to the humidifier gas outlet stream. In certain embodiments, the bubble column dehumidifier has a height of about 5 m or less. In certain cases, the bubble column dehumidifier is configured to condense at least about 500 barrels per day.

Some aspects are related to methods of removing scale from a plurality of desalination units. In some embodiments, the method comprises providing a desalination system comprising a plurality of desalination units, wherein two or more desalination units of the plurality of desalination units are heat exchanger-containing desalination units that each comprise a humidifier, a dehumidifier, and a first heat exchanger fluidically connected to the humidifier. In some embodiments, the method further comprises flowing a first fluid stream through a first fluidic pathway of the first heat exchanger of each heat exchanger-containing desalination unit. In some embodiments, the method further comprises flowing a second fluid stream through a second fluidic pathway of the first heat exchanger of each heat exchanger-containing desalination unit. In some embodiments, the method further comprises measuring a first temperature of each second fluid stream downstream of the first heat exchanger. In some embodiments, the method further comprises determining an average first temperature of all the first temperatures measured in the measuring step. In some embodiments, the method further comprises identifying at least one fouled first fluidic pathway characterized by a first temperature measured in the measuring step that differs from the average first temperature by greater than 10% on the Kelvin scale. In some embodiments, the method further comprises selectively flowing a de-scaling composition through only the at least one fouled first fluidic pathway.

In some embodiments, the method of removing scale comprises providing a desalination system comprising a plurality of desalination units, wherein two or more desalination units of the plurality of desalination units are heat exchanger-containing desalination units that each comprise a humidifier, a dehumidifier, and a first heat exchanger fluidically connected to the humidifier. In some embodiments, the method further comprises flowing a first fluid stream through a first fluidic pathway of the first heat exchanger of each heat exchanger-containing desalination unit. In some embodiments, the method further comprises flowing a second fluid stream through a second fluidic pathway of the first heat exchanger of each heat exchanger-containing desalination unit. In some embodiments, the method further comprises measuring a first flow rate of each second fluid stream downstream of the first heat exchanger. In some embodiments, the method further comprises determining an average first flow rate of all the first flow rates measured in the measuring step. In some embodiments, the method further comprises identifying at least one fouled first fluidic pathway characterized by a first flow rate measured in the measuring step that differs from the average first flow rate by greater than 10%. In some embodiments, the method further comprises selectively flowing a de-scaling composition through only the at least one fouled first fluidic pathway.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
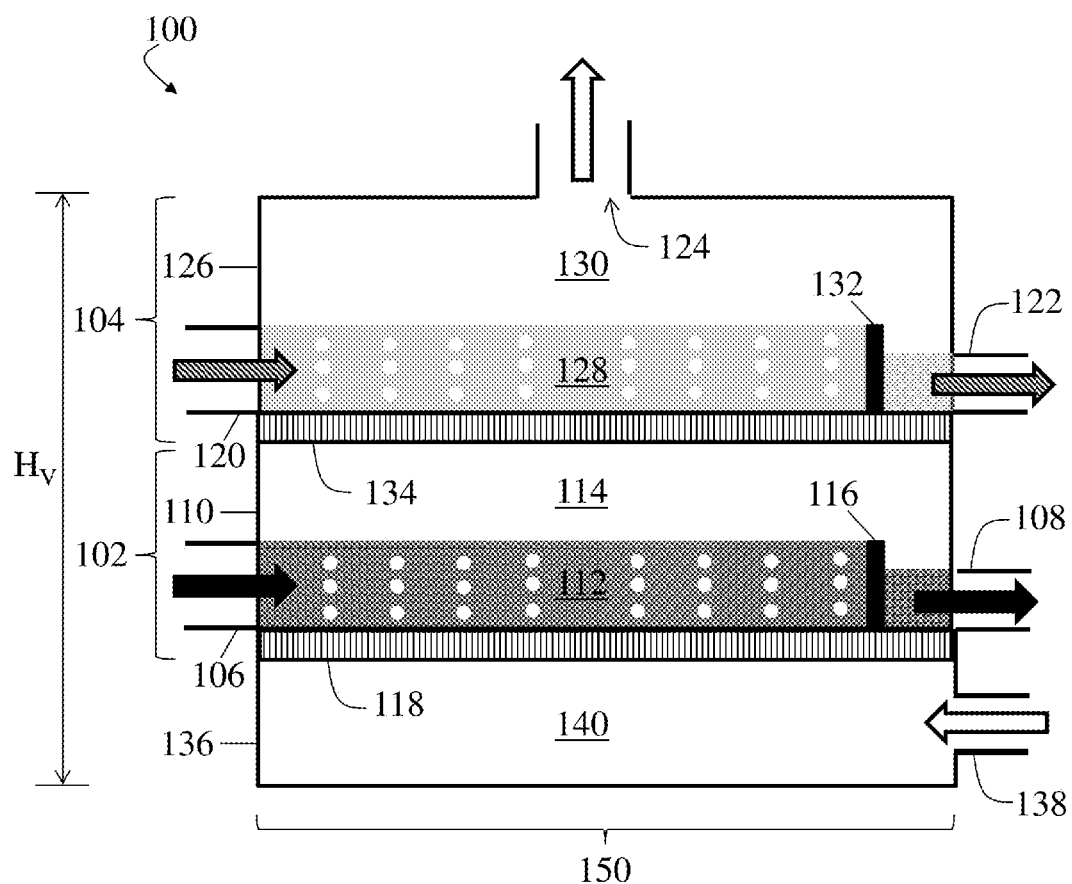
FIG. 1A shows a schematic illustration of an exemplary desalination system comprising a vessel comprising a single-stage humidification region and a single-stage dehumidification region, according to some embodiments.

Certain embodiments described herein generally relate to apparatuses that include a vessel comprising a humidification region (e.g., a bubble column humidification region) and a dehumidification region (e.g., a bubble column dehumidification region), and associated systems and methods. In certain embodiments, the apparatuses are configured to include various internal features, such as vapor distribution regions and/or liquid flow control weirs and/or baffles. In some embodiments, mobile humidification-dehumidification (HDH) desalination systems are described that comprise a humidifier (e.g., a bubble column humidifier) having a relatively low height and/or a relatively small footprint and/or a dehumidifier (e.g., a bubble column condenser) having a relatively low height and/or a relatively small footprint. In some embodiments, the mobile HDH desalination system comprises a vessel comprising a humidification region (e.g., a bubble column humidification region) and a dehumidification region (e.g., a bubble column dehumidification region), where the vessel has a relatively low height and/or a relatively small footprint. In certain cases, the relatively low height and/or relatively small footprint may facilitate transport and/or installation of the HDH desalination system. In some cases, the systems described herein allow for simplified, lower cost systems with improved performance (e.g., higher thermodynamic efficiency). According to some embodiments, the apparatuses may be used in water purification systems, such as desalination systems. The water purification systems may comprise additional devices external to the apparatuses, such as one or more heat exchangers, one or more heating devices, and/or one or more cooling devices. Certain embodiments generally relate to methods of operating, controlling, and/or cleaning desalination systems comprising a plurality of desalination units (e.g., HDH desalination units).

While generally embodiments of the invention may employ a variety of humidifier and dehumidifier designs, including but not limited to those involving direct contact between gas and liquid phases, in some embodiments, bubble column humidifiers and bubble column dehumidifiers are described, which may be associated with certain advantages over certain other types of humidifiers and dehumidifiers. For example, bubble column humidifiers and dehumidifiers may exhibit higher thermodynamic efficiency than certain other types of humidifiers (e.g., packed bed humidifiers, spray towers, wetted wall towers) and dehumidifiers (e.g., surface condensers). Without wishing to be bound by a particular theory, the increased thermodynamic efficiency may be at least partially attributed to the use of gas bubbles for heat and mass transfer in bubble column humidifiers and dehumidifiers, since gas bubbles may have more surface area available for heat and mass transfer than other types of surfaces (e.g., metallic tubes, liquid films, packing material). As described in further detail herein, a bubble column humidifier and/or dehumidifier may have certain features that further increase thermodynamic efficiency, including, but not limited to, relatively low liquid level height, relatively high aspect ratio liquid flow paths, and multi-staged designs. As a result of their increased thermodynamic efficiency, bubble column humidifiers and/or dehumidifiers having a certain capacity may be reduced in size compared to other types of humidifiers and/or dehumidifiers having the same capacity. In a particular, non-limiting example, a bubble column humidifier having a height of 8 feet and a certain diameter may be capable of replacing two packed bed humidifier towers having a combined height of 25 feet and the same diameter.

It has been recognized within the context of this invention that it may be advantageous to combine both a humidification region, for example a bubble column humidification region, and a dehumidification region, for example a bubble column dehumidification region, into a single vessel of an apparatus. A vessel generally refers to any structure (e.g., a tank) capable of housing a humidification region and a dehumidification region. In some cases, a combined humidification-dehumidification (HDH) apparatus (e.g., an apparatus comprising a vessel comprising a humidification region and a dehumidification region) may have fewer components and/or use less material than an HDH system comprising a separate humidifier (e.g., a bubble column humidifier) and a separate dehumidifier (e.g., a bubble column dehumidifier). For example, an HDH system comprising a separate humidifier and dehumidifier may require one or more ducts (e.g., for gas flow) and/or pipes (e.g., for liquid flow) connecting the humidifier and dehumidifier. In certain cases, the ducts and/or pipes may be expensive and/or burdensome to install. For example, in some industrial facilities (e.g., oil and gas facilities) that are located in remote areas, system components may be built off-site as deployable skids. If a humidifier resides on one skid and a dehumidifier resides on another skid, ducting and/or piping connections may need to be made during on-site installation, which may lengthen the time required for system deployment. In contrast, ducting and/or piping may be reduced or eliminated in a combined HDH apparatus (e.g., a combined bubble column apparatus). For example, a combined HDH apparatus may eliminate the need for ducting between a humidifier gas outlet and a dehumidifier gas inlet. In certain embodiments, the combined HDH apparatus comprises one or more gas conduits (e.g., internal gas conduits) in fluid communication with the humidification region and the dehumidification region of the apparatus. In some cases, for example, the one or more gas conduits (e.g., internal gas conduits) are in fluid communication with a gas outlet (e.g., a main gas outlet) of the humidification region and a gas inlet (e.g., a main gas inlet) of the dehumidification region. In some embodiments, the combined HDH apparatus further comprises one or more auxiliary gas conduits (e.g., internal auxiliary gas conduits) in fluid communication with an intermediate gas outlet of the humidification region and an intermediate gas inlet of the dehumidification region. To the extent that ducting is still required, the gas inlets and outlets may be positioned closer together, resulting in less ducting than in HDH systems comprising separate humidifiers and dehumidifiers. This may be advantageous, since ducting used to transport heated, humidified gas in an HDH system may be relatively expensive, large, heavy, and/or rigid. For example, one suitable type of ducting is stainless steel with fiberglass insulation, which is generally capable of accommodating high gas flow rates at high temperatures and/or withstanding potentially corrosive environments. Installation of such ducting may be challenging due to its relatively large size, heavy weight, and/or high rigidity. Similarly, a combined HDH apparatus may require less piping (e.g., for liquid flow) than an HDH system comprising separate humidifiers and dehumidifiers, since liquid inlets and outlets may be positioned in closer proximity to each other. Any required piping may comprise hard pipes, flexible hoses, or any other type of suitable piping known in the art.

In addition to eliminated or reduced ducting and/or piping, a combined HDH apparatus (e.g. combined bubble column apparatus) may have additional features that allow it to take up less space and/or use fewer materials than an HDH system comprising a separate humidifier and dehumidifier. For example, a combined HDH apparatus may require less space for walkways and/or maintenance points since components may be positioned closer together. In some cases, a combined HDH apparatus may also require less insulating material. For example, an HDH system comprising a separate humidifier and dehumidifier may have additional walls to be insulated compared to a combined HDH apparatus.

Other aspects of a combined HDH apparatus (e.g. combined bubble column apparatus) may further reduce cost. For example, the humidification and dehumidification regions of a combined HDH apparatus may have structural similarities, which may advantageously allow certain parts to be used in both the humidification and dehumidification regions. Due to economies of scale, a decrease in the number of unique parts in an HDH system may advantageously reduce the cost of the HDH system. Reducing the number of unique parts may also simplify the production process.

According to some embodiments of the invention, an apparatus (e.g., a combined bubble column apparatus) comprises a vessel, and the vessel comprises a humidification region (e.g., a bubble column humidification region) and a dehumidification region (e.g., a bubble column dehumidification region). The humidification region may be configured to receive a humidification region gas inlet stream from a source of a gas via at least one humidification region gas inlet. In some cases, the gas comprises at least one non-condensable gas. A non-condensable gas generally refers to a gas that cannot be condensed from gas phase to liquid phase under the operating conditions of the apparatus. Examples of suitable non-condensable gases include, but are not limited to, air, nitrogen, oxygen, helium, argon, carbon monoxide, carbon dioxide, sulfur oxides ($SO_x$) (e.g., $SO_2$, $SO_3$), and/or nitrogen oxides ($NO_x$) (e.g., $NO$, $NO_2$). In some embodiments, in addition to the at least one non-condensable gas, the gas further comprises one or more additional gases (e.g., the gas may be a gas mixture).

The humidification region may also be configured to receive a humidification region liquid inlet stream (e.g., liquid feed stream) from a source of a liquid via at least one humidification region liquid inlet. In some embodiments, the liquid comprises a condensable fluid in liquid phase. A condensable fluid generally refers to a fluid that is able to condense from gas phase to liquid phase under the operating conditions of the apparatus. Non-limiting, illustrative examples of suitable condensable fluids include water, ammonia, benzene, toluene, ethyl benzene, and/or alcohols. In addition to the condensable fluid in liquid phase, the liquid may further comprise one or more additional liquids (e.g., the liquid may be a liquid mixture). In some embodiments, the liquid further comprises one or more contaminants. The one or more contaminants may, for example, comprise one or more dissolved salts. A dissolved salt generally refers to a salt that has been solubilized to such an extent that the component ions (e.g., an anion, a cation) of the salt are no longer ionically bonded to each other. Non-limiting examples of dissolved salts that may be present in the liquid include sodium chloride (NaCl), sodium bromide (NaBr), potassium chloride (KCl), potassium bromide (KBr), ammonium chloride ($NH_4Cl$), calcium chloride ($CaCl_2$), magnesium chloride ($MgCl_2$), sodium carbonate ($Na_2CO_3$), sodium bicarbonate ($NaHCO_3$), potassium bicarbonate ($KHCO_3$), sodium sulfate ($Na_2SO_4$), potassium sulfate ($K_2SO_4$), calcium sulfate ($CaSO_4$), magnesium sulfate ($MgSO_4$), strontium sulfate ($SrSO_4$), barium sulfate ($BaSO_4$), barium-strontium sulfate ($BaSr(SO_4)_2$), calcium nitrate ($Ca(NO_3)_2$), iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), ammonium bicarbonate, ammonium sulfate, boron salts, polyacrylic acid sodium salts, and/or silicates.

In a particular embodiment, the liquid comprises salt-containing water (e.g., water comprising one or more dissolved salts). In certain cases, the salt-containing water comprises seawater, brackish water, water produced form an oil and/or gas extraction process, flowback water, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or chemical process).

In some embodiments, the humidification region liquid inlet stream has a relatively high concentration of one or more contaminants (e.g., dissolved salts). In certain embodiments, the concentration of one or more contaminants in the humidification region liquid inlet stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 102,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 219,000 mg/L, at least about 220,000 mg/L, at least about 250,000 mg/L, at least about 275,000 mg/L, at least about 300,000 mg/L, at least about 310,000 mg/L, at least about 312,000 mg/L, at least about 320,000 mg/L, at least about 350,000 mg/L, or at least about 375,000 mg/L (and/or, in certain embodiments, up to the solubility limit of the one or more contaminants in the liquid stream). In some embodiments, the concentration of one or more contaminants in the humidification region liquid inlet stream is in the range of about 100 mg/L to about 375,000 mg/L, about 1,000 mg/L to about 10,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 375,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 375,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 375,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 375,000 mg/L, about 102,000 mg/L to about 219,000 mg/L, about 102,000 mg/L to about 312,000 mg/L, about 150,000 mg/L to about 200,000 mg/L, about 150,000 mg/L to about 250,000 mg/L, about 150,000 mg/L to about 300,000 mg/L, about 150,000 mg/L to about 350,000 mg/L, about 150,000 mg/L to about 375,000 mg/L, about 200,000 mg/L to about 250,000 mg/L, about 200,000 mg/L to about 300,000 mg/L, about 200,000 mg/L to about 350,000 mg/L, about 200,000 mg/L to about 375,000 mg/L, about 250,000 mg/L to about 300,000 mg/L, about 250,000 mg/L to about 350,000 mg/L, about 250,000 mg/L to about 375,000 mg/L, about 300,000 mg/L to about 350,000 mg/L, or about 300,000 mg/L to about 375,000 mg/L. As noted above, the one or more contaminants may comprise one or more dissolved salts (e.g., NaCl). The concentration of a dissolved salt generally refers to the combined concentrations of the cation and the anion of the salt. For example, the concentration of dissolved NaCl would refer to the sum of the concentration of sodium ions ($Na^+$) and the concentration of chloride ions ($Cl^-$). The concentration of a contaminant (e.g., a dissolved salt) may be measured according to any method known in the art. For example, methods for measuring the concentration of a contaminant include inductively coupled plasma (ICP) spectroscopy (e.g., inductively coupled plasma optical emission spectroscopy). As one non-limiting example, an Optima 8300 ICP-OES spectrometer may be used.

In some embodiments, the humidification region liquid inlet stream contains at least one contaminant (e.g., dissolved salt) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the at least one contaminant in the liquid stream). In some embodiments, the humidification region liquid inlet stream comprises at least one contaminant in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

According to some embodiments, the humidification region liquid inlet stream has a relatively high total contaminant concentration (e.g., concentration of all contaminants present in the liquid stream). In certain cases, the total contaminant concentration of the humidification region liquid inlet stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 220,000 mg/L, at least about 250,000 mg/L, at least about 275,000 mg/L, at least about 300,000 mg/L, at least about 310,000 mg/L, at least about 320,000 mg/L, at least about 350,000 mg/L, at least about 375,000 mg/L, at least about 400,000 mg/L, at least about 450,000 mg/L, or at least about 500,000 mg/L (and/or, in certain embodiments, up to the solubility limit of the dissolved contaminant(s) in the liquid stream). In some embodiments, the total contaminant concentration of the humidification region liquid inlet stream is in the range of about 1,000 mg/L to about 10,000 mg/L, about 1,000 mg/L to about 20,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 75,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the contaminants present in the humidification region liquid inlet stream comprise two or more dissolved salts. The concentration of a plurality of dissolved salts generally refers to the combined concentrations of all the cations and anions of the dissolved salts. As a simple, non-limiting example, in a liquid stream comprising dissolved NaCl and dissolved $MgSO_4$, the total dissolved salt concentration would refer to the sum of the concentrations of the $Na^+$, $Cl^-$, Me, and $SO_4^{2-}$ ions. The total contaminant concentration may be measured according to any method known in the art. For example, a non-limiting example of a suitable method for measuring total contaminant concentration is the SM 2540C method. According to the SM 2540C method, a sample comprising an amount of liquid comprising one or more dissolved solids is filtered (e.g., through a glass fiber filter), and the filtrate is evaporated to dryness in a weighed dish at 180° C. The increase in dish weight represents the mass of the total dissolved solids in the sample. The total contaminant concentration of the sample may be obtained by dividing the mass of the total dissolved solids by the volume of the original sample.

In some embodiments, the humidification region liquid inlet stream has a total contaminant concentration of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved contaminant(s) in the liquid stream). In some embodiments, the humidification region liquid inlet stream has a total contaminant concentration in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the humidification region is configured to receive the humidification region liquid inlet stream at a relatively high rate. In some embodiments, the humidification region receives the humidification region liquid inlet stream at a rate of at least about 40 gpm, at least about 50 gpm, at least about 100 gpm, at least about 150 gpm, at least about 200 gpm, at least about 300 gpm, at least about 400 gpm, at least about 500 gpm, at least about 600 gpm, at least about 700 gpm, at least about 800 gpm, at least about 900 gpm, at least about 1000 gpm, at least about 1100 gpm, at least about 1200 gpm, at least about 1300 gpm, at least about 1400 gpm, at least about 1500 gpm, at least about 2000 gpm, at least about 2500 gpm, at least about 3000 gpm, at least about 3500 gpm, or at least about 4000 gpm. In some embodiments, the humidification region receives the humidification region liquid inlet stream at a rate of about 40 gpm to about 100 gpm, about 40 gpm to about 150 gpm, about 40 gpm to about 200 gpm, about 40 gpm to about 500 gpm, about 40 gpm to about 1000 gpm, about 40 gpm to about 1500 gpm, about 40 gpm to about 2000 gpm, about 40 gpm to about 2500 gpm, about 40 gpm to about 3000 gpm, about 40 gpm to about 3500 gpm, about 40 gpm to about 4000 gpm, about 100 gpm to about 150 gpm, about 100 gpm to about 200 gpm, about 100 gpm to about 500 gpm, about 100 gpm to about 1000 gpm, about 100 gpm to about 1500 gpm, about 100 gpm to about 2000 gpm, about 100 gpm to about 2500 gpm, about 100 gpm to about 3000 gpm, about 100 gpm to about 3500 gpm, about 100 gpm to about 4000 gpm, about 150 gpm to about 200 gpm, about 150 gpm to about 500 gpm, about 150 gpm to about 1000 gpm, about 150 gpm to about 1500 gpm, about 150 gpm to about 2000 gpm, about 150 gpm to about 2500 gpm, about 150 gpm to about 3000 gpm, about 150 gpm to about 3500 gpm, about 150 gpm to about 4000 gpm, about 200 gpm to about 500 gpm, about 200 gpm to about 1000 gpm, about 200 gpm to about 1500 gpm, about 200 gpm to about 2000 gpm, about 200 gpm to about 2500 gpm, about 200 gpm to about 3000 gpm, about 200 gpm to about 3500 gpm, about 200 gpm to about 4000 gpm, about 500 gpm to about 1000 gpm, about 500 gpm to about 1500 gpm, about 500 gpm to about 2000 gpm, about 500 gpm to about 2500 gpm, about 500 gpm to about 3000 gpm, about 500 gpm to about 3500 gpm, about 500 gpm to about 4000 gpm, about 1000 gpm to about 1500 gpm, about 1000 gpm to about 2000 gpm, about 1000 gpm to about 2500 gpm, about 1000 gpm to about 3000 gpm, about 1000 gpm to about 3500 gpm, about 1000 gpm to about 4000 gpm, about 1500 gpm to about 2000 gpm, about 1500 gpm to about 2500 gpm, about 1500 gpm to about 3000 gpm, about 1500 gpm to about 3500 gpm, about 1500 gpm to about 4000 gpm, about 2000 gpm to about 3000 gpm, about 2000 gpm to about 4000 gpm, or about 3000 gpm to about 4000 gpm. In certain embodiments, the humidification region receives the humidification region liquid inlet stream at a rate of about 150 gpm to about 1500 gpm.

In the humidification region, the gas may come into contact (e.g., direct or indirect contact) with the liquid. In some embodiments, the temperature of the liquid is higher than the temperature of the gas, and upon contact of the gas and the liquid, heat and/or mass may be transferred from the liquid to the gas. According to certain embodiments, at least a portion of the condensable fluid in the liquid is transferred to the gas via an evaporation (e.g., humidification) process, thereby producing a vapor-containing humidification region gas outlet stream (e.g., an at least partially humidified gas stream) and a humidification region liquid outlet stream. In some embodiments, the humidification region gas outlet stream comprises a vapor mixture (e.g., a mixture of the condensable fluid in vapor phase and the non-condensable gas). In certain cases, the condensable fluid is water, and the humidification region gas outlet stream is enriched in water vapor relative to the gas received from the humidification region gas inlet. In some embodiments, the humidification region liquid outlet stream has a higher concentration of one or more contaminants (e.g., dissolved salts) than the humidification region liquid inlet stream (e.g., the humidification region liquid outlet stream is enriched in the one or more contaminants relative to the humidification region liquid inlet stream).

According to some embodiments, the humidification region liquid outlet stream has a relatively high concentration of one or more contaminants (e.g., dissolved salts). In certain embodiments, the concentration of one or more contaminants in the humidification region liquid outlet stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the one or more contaminants in the liquid stream). In some embodiments, the concentration of one or more contaminants in the humidification region liquid outlet stream is in the range of about 1,000 mg/L to about 10,000 mg/L, about 1,000 mg/L to about 20,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the humidification region liquid outlet stream contains at least one contaminant (e.g., dissolved salt) in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the contaminant in the liquid stream). In some embodiments, the humidification region liquid outlet stream comprises at least one contaminant in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the concentration of one or more contaminants in the humidification region liquid outlet stream is substantially greater than the concentration of the one or more contaminants in the humidification region liquid inlet stream (e.g., liquid feed stream) received by the apparatus. In some cases, the concentration of one or more contaminants in the humidification region liquid outlet stream is at least about 0.5%, about 1%, about 2%, about 5%, about 10%, about 15%, or about 20% greater than the concentration of the one or more contaminants in the humidification region liquid inlet stream.

According to some embodiments, the humidification region liquid outlet stream has a relatively high total contaminant concentration (e.g., concentration of all contaminants present in the liquid stream). In certain cases, the humidification region liquid outlet stream has a total contaminant concentration of at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, at least about 500,000 mg/L, at least about 550,000 mg/L, or at least about 600,000 mg/L (and/or, in certain embodiments, up to the solubility limit of the contaminant(s) in the liquid stream). In some embodiments, the total contaminant concentration of the humidification region liquid outlet stream is in the range of about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 10,000 mg/L to about 550,000 mg/L, about 10,000 mg/L to about 600,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 20,000 mg/L to about 550,000 mg/L, about 20,000 mg/L to about 600,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 50,000 mg/L to about 550,000 mg/L, about 50,000 mg/L to about 600,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, about 100,000 mg/L to about 500,000 mg/L, about 100,000 mg/L to about 550,000 mg/L, or about 100,000 mg/L to about 600,000 mg/L.

In some embodiments, the humidification region liquid outlet stream has a total contaminant concentration of at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the contaminant(s) in the liquid stream). In some embodiments, the humidification region liquid outlet stream has a total contaminant concentration in the range of about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the humidification region liquid outlet stream has a substantially greater total contaminant concentration than the humidification region liquid inlet stream (e.g., liquid feed stream) received by the apparatus. In some cases, the total contaminant concentration of the humidification region liquid outlet stream is at least about 5%, at least about 6%, at least about 10%, at least about 14%, at least about 15%, at least about 20%, or at least about 25% greater than the total contaminant concentration of the humidification region liquid inlet stream.

In some embodiments, the humidification region is configured to have a relatively high evaporation rate. In certain cases, for example, the humidification region has an evaporation rate of at least about 50 barrels/day, at least about 100 barrels/day, at least about 200 barrels/day, at least about 500 barrels/day, at least about 1,000 barrels a day, at least about 1,500 barrels/day, at least about 2,000 barrels/day, at least about 3,000 barrels/day, at least about 4,000 barrels/day, or at least about 5,000 barrels/day. In some embodiments, the humidification region has an evaporation rate of about 50 barrels/day to about 500 barrels/day, about 50 barrels/day to about 1,000 barrels/day, about 50 barrels/day to about 1,500 barrels/day, about 50 barrels/day to about 2,000 barrels/day, about 50 barrels/day to about 3,000 barrels/day, about 50 barrels/day to about 4,000 barrels/day, about 50 barrels/day to about 5,000 barrels/day, about 100 barrels/day to about 500 barrels/day, about 100 barrels/day to about 1,000 barrels/day, about 100 barrels/day to about 1,500 barrels/day, about 100 barrels/day to about 2,000 barrels/day, about 100 barrels/day to about 3,000 barrels/day, about 100 barrels/day to about 4,000 barrels/day, about 100 barrels/day to about 5,000 barrels/day, about 200 barrels/day to about 1,000 barrels/day, about 200 barrels/day to about 1,500 barrels/day, about 200 barrels/day to about 2,000 barrels/day, about 200 barrels/day to about 3,000 barrels/day, about 200 barrels/day to about 4,000 barrels/day, about 200 barrels/day to about 5,000 barrels/day, about 500 barrels/day to about 1,000 barrels/day, about 500 barrels/day to about 1,500 barrels/day, about 500 barrels/day to about 2,000 barrels/day, about 500 barrels/day to about 3,000 barrels/day, about 500 barrels/day to about 4,000 barrels/day, about 500 barrels/day to about 5,000 barrels/day, about 1,000 barrels/day to about 2,000 barrels/day, about 1,000 barrels/day to about 3,000 barrels/day, about 1,000 barrels/day to about 4,000 barrels/day, about 1,000 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day. The evaporation rate of the humidification region may be obtained by measuring the total liquid output volume of the humidification region (e.g., the volume of the humidification region liquid output stream and any other liquid output streams of the humidification region) over a time period (e.g., one day) and subtracting the total liquid input volume of the humidification region (e.g., the volume of the humidification region liquid inlet stream and any other liquid inlet streams of the humidification region) over the same time period.

In some embodiments, the humidification region is configured such that a liquid inlet is positioned at a first end (e.g., a top end) of the humidification region, and a gas inlet is positioned at a second, opposite end (e.g., a bottom end) of the humidification region. Such a configuration may facilitate the flow of a liquid stream in a first direction (e.g., downwards) through the humidification region and the flow of a gas stream in a second, substantially opposite direction (e.g., upwards) through the humidification region, which may advantageously result in high thermal efficiency.

In some embodiments, the dehumidification region of the vessel of the combined HDH apparatus (e.g., combined bubble column apparatus) is configured to receive the humidification region gas outlet stream (e.g., a heated, at least partially humidified gas stream) via at least one dehumidification region gas inlet as a dehumidification region gas inlet stream. The dehumidification region may also be configured to receive a dehumidification region liquid inlet stream via at least one dehumidification region liquid inlet. According to some embodiments, the dehumidification region liquid inlet stream comprises the condensable fluid in liquid phase. In some embodiments, for example, the dehumidification region liquid inlet stream comprises water. In certain cases, the dehumidification region liquid inlet stream comprises substantially pure water (e.g., water having a relatively low level of contaminants).

In the dehumidification region, the dehumidification region gas inlet stream (e.g., the heated, at least partially humidified humidification region gas outlet stream) may come into contact (e.g., direct or indirect contact) with the dehumidification region liquid inlet stream. The dehumidification region gas inlet stream may have a higher temperature than the dehumidification region liquid inlet stream, and upon contact of the gas and liquid streams, heat and/or mass may be transferred from the dehumidification region gas inlet stream to the dehumidification region liquid inlet stream. In certain embodiments, the dehumidification region gas inlet stream comprises the condensable fluid in vapor phase and the non-condensable gas, and at least a portion of the condensable fluid is transferred from the dehumidification region gas inlet stream to the dehumidification region liquid inlet stream via a condensation (e.g., dehumidification) process, thereby producing a dehumidification region liquid outlet stream comprising the condensable fluid in liquid phase and an at least partially dehumidified dehumidification region gas outlet stream. In certain cases, the condensable fluid is water, and the dehumidification region gas outlet stream is lean in water vapor relative to the dehumidification region gas inlet stream (e.g., humidification region gas outlet stream). In some embodiments, the dehumidification region liquid outlet stream comprises substantially pure water. In certain cases, the dehumidification region liquid outlet stream comprises water in the amount of at least about 95 wt %, at least about 99 wt %, at least about 99.9 wt %, or at least about 99.99 wt % (and/or, in certain embodiments, up to about 99.999 wt %, or more).

According to some embodiments, the dehumidification region liquid outlet stream has a relatively low concentration of one or more contaminants (e.g., dissolved salts). In certain embodiments, the concentration of one or more contaminants in the dehumidification region liquid outlet stream is about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. In some cases, the concentration of one or more contaminants in the dehumidification region liquid outlet stream is substantially zero (e.g., not detectable). In certain cases, the concentration of one or more contaminants in the dehumidification region liquid outlet stream is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the dehumidification region liquid outlet stream contains one or more contaminants in an amount of about 2 wt % or less, about 1 wt % or less, about 0.5 wt % or less, about 0.2 wt % or less, about 0.1 wt % or less, about 0.05 wt % or less, or about 0.01 wt % or less. In some embodiments, the dehumidification region liquid outlet stream contains one or more contaminants in an amount in the range of about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %.

In some embodiments, the concentration of one or more contaminants in the dehumidification region liquid outlet stream is substantially less than the concentration of the one or more contaminants in the humidification region liquid inlet stream (e.g., liquid feed stream) received by the apparatus. In some cases, the concentration of one or more contaminants in the dehumidification region liquid outlet stream is at least about 0.5%, about 1%, about 2%, about 5%, about 10%, about 15%, or about 20% less than the concentration of the one or more contaminants in the humidification region liquid inlet stream.

According to some embodiments, the dehumidification region liquid outlet stream has a relatively low total contaminant concentration (e.g., concentration of all contaminants present in the liquid stream). In certain cases, the dehumidification region liquid outlet stream has a total contaminant concentration of about 500 mg/L or less, about 200 mg/L or less, about 100 mg/L or less, about 50 mg/L or less, about 20 mg/L or less, about 10 mg/L or less, about 5 mg/L or less, about 2 mg/L or less, about 1 mg/L or less, about 0.5 mg/L or less, about 0.2 mg/L or less, about 0.1 mg/L or less, about 0.05 mg/L or less, about 0.02 mg/L or less, or about 0.01 mg/L or less. In some cases, the total contaminant concentration of the dehumidification region liquid outlet stream is substantially zero (e.g., not detectable). In certain embodiments, the total contaminant concentration of the dehumidification region liquid outlet stream is in the range of about 0 mg/L to about 500 mg/L, about 0 mg/L to about 200 mg/L, about 0 mg/L to about 100 mg/L, about 0 mg/L to about 50 mg/L, about 0 mg/L to about 20 mg/L, about 0 mg/L to about 10 mg/L, about 0 mg/L to about 5 mg/L, about 0 mg/L to about 2 mg/L, about 0 mg/L to about 1 mg/L, about 0 mg/L to about 0.5 mg/L, about 0 mg/L to about 0.2 mg/L, about 0 mg/L to about 0.1 mg/L, about 0 mg/L to about 0.05 mg/L, about 0 mg/L to about 0.02 mg/L, or about 0 mg/L to about 0.01 mg/L.

In some embodiments, the dehumidification region liquid outlet stream contains a total amount of contaminants of about 5 wt % or less, about 2 wt % or less, about 1 wt % or less, about 0.5 wt % or less, about 0.2 wt % or less, about 0.1 wt % or less, about 0.05 wt % or less, or about 0.01 wt % or less. In some embodiments, the dehumidification region liquid outlet stream contains a total amount of contaminants in the range of about 0.01 wt % to about 5 wt %, about 0.01 wt % to about 2 wt %, about 0.01 wt % to about 1 wt %, about 0.01 wt % to about 0.5 wt %, about 0.01 wt % to about 0.2 wt %, or about 0.01 wt % to about 0.1 wt %.

In some embodiments, the total contaminant concentration of the dehumidification region liquid outlet stream is substantially less than the total contaminant concentration of the humidification region liquid inlet stream (e.g., liquid feed stream) received by the apparatus. In some cases, the total contaminant concentration of the dehumidification region liquid outlet stream is at least about 0.5%, about 1%, about 2%, about 5%, about 10%, about 15%, or about 20% less than the total contaminant concentration of the humidification region liquid inlet stream.

In some embodiments, the dehumidification region is configured to have a relatively high condensation rate. In certain cases, for example, the dehumidification region has a condensation rate of at least about 50 barrels/day, at least about 100 barrels/day, at least about 200 barrels/day, at least about 500 barrels/day, at least about 1,000 barrels a day, at least about 1,500 barrels/day, at least about 2,000 barrels/day, at least about 3,000 barrels/day, at least about 4,000 barrels/day, or at least about 5,000 barrels/day. In some embodiments, the dehumidification region has a condensation rate of about 50 barrels/day to about 500 barrels/day, about 50 barrels/day to about 1,000 barrels/day, about 50 barrels/day to about 1,500 barrels/day, about 50 barrels/day to about 2,000 barrels/day, about 50 barrels/day to about 3,000 barrels/day, about 50 barrels/day to about 4,000 barrels/day, about 50 barrels/day to about 5,000 barrels/day, about 100 barrels/day to about 500 barrels/day, about 100 barrels/day to about 1,000 barrels/day, about 100 barrels/day to about 1,500 barrels/day, about 100 barrels/day to about 2,000 barrels/day, about 100 barrels/day to about 3,000 barrels/day, about 100 barrels/day to about 4,000 barrels/day, about 100 barrels/day to about 5,000 barrels/day, about 200 barrels/day to about 1,000 barrels/day, about 200 barrels/day to about 1,500 barrels/day, about 200 barrels/day to about 2,000 barrels/day, about 200 barrels/day to about 3,000 barrels/day, about 200 barrels/day to about 4,000 barrels/day, about 200 barrels/day to about 5,000 barrels/day, about 500 barrels/day to about 1,000 barrels/day, about 500 barrels/day to about 1,500 barrels/day, about 500 barrels/day to about 2,000 barrels/day, about 500 barrels/day to about 3,000 barrels/day, about 500 barrels/day to about 4,000 barrels/day, about 500 barrels/day to about 5,000 barrels/day, about 1,000 barrels/day to about 2,000 barrels/day, about 1,000 barrels/day to about 3,000 barrels/day, about 1,000 barrels/day to about 4,000 barrels/day, about 1,000 barrels/day to about 5,000 barrels/day, about 2,000 barrels/day to about 5,000 barrels/day, about 3,000 barrels/ day to about 5,000 barrels/day, or about 4,000 barrels/day to about 5,000 barrels/day. The condensation rate of the dehumidification region may be obtained by measuring the total liquid output volume of the dehumidification region (e.g., the volume of the dehumidification region liquid output stream and any other liquid output streams of the dehumidification region) over a time period (e.g., one day) and subtracting the total liquid input volume of the dehumidification region over the same time period.

In some embodiments, the dehumidification region is configured to produce the dehumidification region liquid outlet stream at a relatively high rate. In some embodiments, the dehumidification region produces the dehumidification region liquid outlet stream at a rate of at least about 1,250 barrels/day, at least about 1,500 barrels/day, at least about 2,000 barrels/day, at least about 5,000 barrels/day, at least about 10,000 barrels/day, at least about 25,000 barrels/day, at least about 50,000 barrels/day, at least about 75,000 barrels/day, at least about 100,000 barrels/day, or at least about 125,000 barrels/day. In some embodiments, the dehumidification region produces the dehumidification region liquid outlet stream at a rate of about 1,250 barrels/day to about 5,000 barrels/day, about 1,250 barrels/day to about 10,000 barrels/day, about 1,250 barrels/day to about 25,000 barrels/day, about 1,250 barrels/day to about 50,000 barrels/day, about 1,250 barrels/day to about 75,000 barrels/day, about 1,250 barrels/day to about 100,000 barrels/day, about 1,250 barrels/day to about 125,000 barrels/day, about 5,000 barrels/day to about 10,000 barrels/day, about 5,000 barrels/day to about 25,000 barrels/day, about 5,000 barrels/day to about 50,000 barrels/day, about 5,000 barrels/day to about 75,000 barrels/day, about 5,000 barrels/day to about 100,000 barrels/day, about 5,000 barrels/day to about 125,000 barrels/day, about 10,000 barrels/day to about 25,000 barrels/day, about 10,000 barrels/day to about 50,000 barrels/day, about 10,000 barrels/day to about 75,000 barrels/day, about 10,000 barrels/day to about 100,000 barrels/day, about 10,000 barrels/day to about 125,000 barrels/day, about 50,000 barrels/day to about 100,000 barrels/day, or about 50,000 barrels/day to about 125,000 barrels/day.

In some embodiments, the dehumidification region is configured such that a liquid inlet is positioned at a first end (e.g., a top end) of the dehumidification region, and a gas inlet is positioned at a second, opposite end (e.g., a bottom end) of the dehumidification region. Such a configuration may facilitate the flow of a liquid stream in a first direction (e.g., downwards) through the dehumidification region and the flow of a gas stream in a second, substantially opposite direction (e.g., upwards) through the dehumidification region, which may advantageously result in high thermal efficiency.

According to some embodiments, the humidification region is a bubble column humidification region. In certain cases, the bubble column humidification region comprises at least one stage comprising a chamber. The chamber may, according to some embodiments, comprise a liquid layer and a vapor distribution region (e.g., positioned above the liquid layer). The vapor distribution region refers to the space within the chamber (e.g., the portion of the chamber not occupied by the liquid layer) throughout which vapor is distributed. In some cases, the liquid layer comprises a condensable fluid in liquid phase (e.g., water) and one or more contaminants (e.g., dissolved salts). The chamber may also be in fluid communication with a bubble generator, which may act as a gas inlet for the at least one stage of the humidification region.

In some embodiments, the dehumidification region is a bubble column dehumidification region. In certain cases, the bubble column dehumidification region comprises at least one stage comprising a chamber. The chamber may, according to some embodiments, comprise a liquid layer and a vapor distribution region (e.g., positioned above the liquid layer). In some cases, the liquid layer comprises the condensable fluid in liquid phase. The chamber may also be in fluid communication with a bubble generator, which may act as a gas inlet for the at least one stage of the dehumidification region.

In certain cases, the combined HDH apparatus is a combined bubble column apparatus that further comprises a gas distribution chamber. In some embodiments, the gas distribution chamber comprises an apparatus gas inlet fluidically connected to a source of a gas (e.g., a non-condensable gas). The gas distribution chamber may comprise a gas distribution region, which may have sufficient volume to allow the gas to substantially evenly diffuse over the cross section of the combined bubble column apparatus. The gas distribution region refers to the space within the gas distribution chamber throughout which gas is distributed. In some cases, the gas distribution chamber further comprises a liquid layer (e.g., a liquid sump volume). For example, liquid (e.g., comprising the condensable fluid in liquid phase and one or more contaminants) may collect in the sump volume after exiting the humidification region. In some cases, the liquid sump volume is in direct contact with a liquid outlet of the combined bubble column apparatus (e.g., a humidification region liquid outlet). In certain embodiments, the liquid sump volume is in fluid communication with a pump that pumps liquid out of the combined bubble column apparatus. The liquid sump volume may, for example, provide a positive suction pressure on the intake of the pump, and may advantageously prevent negative (e.g., vacuum) suction pressure that could induce deleterious cavitation bubbles. In some cases, the liquid sump volume may advantageously decrease the sensitivity of the bubble column apparatus to sudden changes in heat transfer rates (e.g., due to intermittent feeding of salt-containing water to and/or intermittent discharge of pure water from the apparatus). In certain embodiments, such as those embodiments in which at least the humidification region of the combined bubble column apparatus comprises a plurality of vertically-arranged stages, the gas distribution chamber is positioned at or near the bottom portion of the combined bubble column apparatus (e.g., below the humidification region).

In some embodiments, a humidification region gas inlet stream comprising the gas (e.g., the non-condensable gas) enters the bubble column humidification region. The humidification region gas inlet stream may flow through the bubble generator of the at least one stage of the humidification region, thereby forming a plurality of gas bubbles. In some cases, the gas bubbles flow through the liquid layer of the at least one stage of the humidification region. As the gas bubbles directly contact the liquid layer, which may have a higher temperature than the gas bubbles, heat and/or mass (e.g., the condensable fluid) may be transferred from the liquid layer to the gas bubbles through an evaporation (e.g., humidification) process, thereby forming a heated, at least partially humidified humidification region gas outlet stream and a humidification region liquid outlet stream having a higher concentration of the one or more contaminants than the humidification region liquid inlet stream. In certain embodiments, the condensable fluid is water, and the vapor-containing humidification region gas outlet stream is enriched in water vapor relative to the humidification region gas inlet stream received from the humidification region gas inlet. In some embodiments, bubbles of the heated, at least partially humidified gas exit the liquid layer and recombine in the vapor distribution region, and the heated, at least partially humidified gas is substantially evenly distributed throughout the vapor distribution region. The humidification region gas outlet stream and humidification region liquid outlet stream may then exit the humidification region.

In some cases, the bubble column dehumidification region is configured to receive the humidification region gas outlet stream (e.g., comprising the heated, at least partially humidified gas) as a dehumidification region gas inlet stream. The dehumidification region gas inlet stream may flow through the bubble generator of the at least one stage of the dehumidification region, thereby forming a plurality of bubbles of the heated, at least partially humidified gas. In some cases, the gas bubbles flow through the liquid layer of the at least one stage of the dehumidification region. As the gas bubbles directly contact the liquid layer, which may have a lower temperature than the gas bubbles, heat and/or mass (e.g., condensable fluid) may be transferred from the gas bubbles to the liquid layer via a condensation (e.g., dehumidification) process, thereby forming a cooled, at least partially dehumidified dehumidification region gas outlet stream and a dehumidification region liquid outlet stream comprising the condensable fluid in liquid phase. In certain embodiments, the condensable fluid is water, and the dehumidification region gas outlet stream is lean in water vapor relative to the dehumidification region gas inlet stream received from the dehumidification region gas inlet. In some embodiments, bubbles of the cooled, at least partially dehumidified gas exit the liquid layer and recombine in the vapor distribution region, and the cooled, at least partially dehumidified gas is substantially evenly distributed throughout the vapor distribution region. The dehumidification region gas outlet stream and dehumidification region liquid outlet stream may then exit the dehumidification region.

FIG. 1A shows, according to some embodiments, a schematic cross-sectional diagram of an exemplary combined bubble column apparatus 100 comprising a vessel 150 comprising a bubble column humidification region 102 and a bubble column dehumidification region 104. As shown in FIG. 1A, humidification region 102 comprises a single stage comprising a humidification region liquid inlet 106, a humidification region liquid outlet 108, and a humidification chamber 110. Liquid layer 112 occupies a portion of humidification chamber 110. In some embodiments, liquid layer 112 comprises a condensable fluid in liquid phase (e.g., liquid water) and one or more contaminants (e.g., dissolved salts). In some embodiments, a vapor distribution region 114 occupies at least a portion of humidification chamber 110 that is not occupied by liquid layer 112. Humidification chamber 110 may, in addition, comprise weir 116, which may limit the height of liquid layer 112. Humidification chamber 110 may also comprise bubble generator 118, which may be in fluid communication with humidification chamber 110 and/or may be arranged within humidification chamber 110. In some cases, bubble generator 118 forms the bottom surface of humidification chamber 110 and/or acts as a gas inlet for humidification chamber 110. In some embodiments, vessel 150 of apparatus 100 further comprises gas distribution chamber 136 positioned below humidification region 102. In FIG. 1A, gas distribution chamber 136 is in fluid communication with apparatus gas inlet 138 and with humidification chamber 110 via bubble generator 118. Bubble generator 118 may form a bottom surface of humidification chamber 110 and a top surface of gas distribution chamber 136. Gas distribution chamber 136 may comprise gas distribution region 140, which represents the space within chamber 136 throughout which a gas entering through apparatus gas inlet 138 is distributed.

As shown in FIG. 1A, dehumidification region 104 is positioned above humidification region 102. Dehumidification region 104 comprises dehumidification region liquid inlet 120, dehumidification region liquid outlet 122, apparatus gas outlet 124, and dehumidification chamber 126. Liquid layer 128 may occupy at least a portion of dehumidification chamber 126. In some embodiments, liquid layer 128 comprises the condensable fluid in liquid phase (e.g., liquid water). In some embodiments, a vapor distribution region 130 occupies at least a portion of dehumidification chamber 126 that is not occupied by liquid layer 128. In addition, dehumidification chamber 126 may comprise weir 132, which may limit the height of liquid layer 128. In some cases, dehumidification chamber 126 comprises bubble generator 134, which may be in fluid communication with dehumidification chamber 126 and/or may be arranged within dehumidification chamber 126. In some cases, bubble generator 134 forms the bottom surface of dehumidification chamber 126 and/or acts as a gas inlet for dehumidification chamber 126. As shown in FIG. 1A, bubble generator 134 forms a bottom surface of dehumidification chamber 126 and a top surface of humidification chamber 110.

In operation, a liquid stream comprising the condensable fluid in liquid phase and one or more contaminants may enter humidification region 102 through humidification region liquid inlet 106, flowing into liquid layer 112 in humidification chamber 110. The liquid stream may flow across humidification chamber 110 to weir 116 and exit humidification chamber 110 through humidification region liquid outlet 108. Weir 116 may maintain the height of liquid layer 112 at the height of weir 116 (e.g., excess liquid may flow over weir 116 to humidification region liquid outlet 108). In dehumidification region 104, a liquid stream comprising the condensable fluid in liquid phase may enter through dehumidification region liquid inlet 120, flowing into liquid layer 128 in dehumidification chamber 126. The liquid stream may flow across dehumidification chamber 126 to weir 132 and exit dehumidification chamber 126 through dehumidification region liquid outlet 122.

In some cases, apparatus gas inlet 138 is in fluid communication with a source of a gas (e.g., a non-condensable gas). The gas may enter vessel 150 of apparatus 100 through apparatus gas inlet 138, flowing into gas distribution chamber 136. After being substantially homogeneously distributed throughout gas distribution region 140 of gas distribution chamber 136, the gas may pass through bubble generator 118, producing a plurality of gas bubbles that travel through liquid layer 112 in humidification chamber 110. The temperature of liquid layer 112 may be higher than the temperature of the gas bubbles, resulting in transfer of heat and/or mass from liquid layer 112 to the gas bubbles through a humidification process. In certain cases, the transfer of heat and/or mass may increase the temperature of the gas, and thus the amount of the condensable fluid that it can carry. After passing through liquid layer 112, the gas, which has been heated and at least partially humidified, may enter vapor distribution region 114 within humidification chamber 110. In some cases, the gas may be substantially evenly distributed throughout vapor distribution region 114. The heated, at least partially humidified gas may then pass through bubble generator 134, thereby forming a plurality of bubbles of the heated, at least partially humidified gas. The bubbles of the heated, at least partially humidified gas may then travel through liquid layer 128 in dehumidification chamber 126. The liquid (e.g., condensable fluid in liquid phase) of liquid layer 128 may have a lower temperature than the bubbles of the heated, at least partially humidified gas. As the gas bubbles travel through liquid layer 128, heat and/or mass may be transferred from the gas bubbles to liquid layer 128 through a dehumidification process. After traveling through liquid layer 128, bubbles of the cooled, at least partially dehumidified gas may enter vapor distribution region 130 within dehumidification chamber 126. The cooled, at least partially dehumidified gas may then exit vessel 150 of apparatus 100 via apparatus gas outlet 124.

Appropriate conditions under which to operate the combined HDH apparatuses (e.g., combined bubble column apparatuses) described herein for desired performance may be selected by an operator of the system and/or by an algorithm. In some embodiments, the pressure in the vessel of the combined HDH apparatus may be selected to be approximately ambient atmospheric pressure during operation. According to certain embodiments, the pressure in the vessel of the combined HDH apparatus may be selected to be about 90 kPa or less during operation. It may be desirable, in some embodiments, for the pressure in the humidification region of the vessel to be less than approximately ambient atmospheric pressure during operation. In some cases, as the pressure inside the humidification region decreases, the ability of the humidified carrier gas to carry more water vapor increases, allowing for increased production of substantially pure water when the carrier gas is dehumidified in the dehumidification region. Without wishing to be bound by a particular theory, this effect may be explained by the humidity ratio, which generally refers to the ratio of water vapor mass to dry air mass in moist air, being higher at pressures lower than atmospheric pressure.

In some embodiments, the combined HDH apparatus (e.g., combined bubble column apparatus) may have a relatively low pressure drop during operation. As used herein, the pressure drop across an apparatus refers to the difference between the pressure of a gas stream entering the apparatus at an inlet and the pressure of a gas stream exiting the apparatus at an outlet. In FIG. 1A, for example, the pressure drop across apparatus 100 would be the difference between the pressure of the gas at apparatus gas inlet 138 and the pressure of the gas at apparatus gas outlet 124. In some cases, the pressure drop may not include the effect of pressure-increasing devices (e.g., fans, blowers, compressors, pumps). For example, in certain cases, the pressure drop may be obtained by subtracting the effect of one or more pressure-increasing devices on a gas stream from the difference between the pressure of the gas stream entering the apparatus at an inlet and the pressure of the gas stream exiting the apparatus at an outlet. In some embodiments, the pressure drop across the apparatus is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, about 2 kPa or less, or about 1 kPa or less. In certain embodiments, the pressure drop across the apparatus (e.g., difference in pressure between the outlet and the inlet) is in the range of about 1 kPa to about 2 kPa, about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. In some embodiments, the pressure of the gas at inlet 138 is substantially the same as the pressure of the gas at outlet 124 (e.g., the pressure drop is substantially zero).

In some cases, inlets and/or outlets within the humidification region and/or the dehumidification region may be provided as separate and distinct structural elements/features. In some cases, inlets and/or outlets within the humidification region and/or the dehumidification region may be provided by certain components such as the bubble generator and/or any other features that establish fluid communication between components of the apparatus. For example, the "gas inlet" and/or "gas outlet" of a humidification region or a dehumidification region may be provided as a plurality of holes of a bubble generator (e.g., a sparger plate). In some embodiments, at least one bubble generator is coupled to a gas inlet of a stage of the humidification region and/or the dehumidification region. In some embodiments, a bubble generator is coupled to a gas inlet of each stage of the humidification region and/or dehumidification region.

The bubble generators may have various features (e.g., holes) used for generation of bubbles. The selection of a bubble generator can affect the size and/or shape of the gas bubbles generated, thereby affecting heat and/or mass transfer between gas bubbles and a liquid layer of a humidification region or a dehumidification region. Appropriate bubble generator and/or bubble generator conditions (e.g., bubble generator speeds) may be selected to produce a particular desired set of gas bubbles. Non-limiting examples of suitable bubble generators include a sparger plate (e.g., a plate comprising a plurality of holes through which a gas can travel), a device comprising one or more perforated pipes (e.g., having a radial, annular, spider-web, or hub-and-spoke configuration), a device comprising one or more nozzles, and/or porous media (e.g., microporous metal).

In some embodiments, a bubble generator comprises a sparger plate. It has been recognized that a sparger plate may have certain advantageous characteristics. For example, the pressure drop across a sparger plate may be relatively low. Additionally, the simplicity of the sparger plate may render it inexpensive to manufacture and/or resistant to the effects of fouling. According to some embodiments, the sparger plate comprises a plurality of holes, at least a portion of which have a diameter (or maximum cross-sectional dimension for non-circular holes) in the range of about 0.1 mm to about 50 mm, about 0.1 mm to about 25 mm, about 0.1 mm to about 15 mm, about 0.1 mm to about 10 mm, about 0.1 mm to about 5 mm, about 0.1 mm to about 1 mm, about 1 mm to about 50 mm, about 1 mm to about 25 mm, about 1 mm to about 15 mm, about 1 mm to about 10 mm, or about 1 mm to about 5 mm. In certain embodiments, substantially all the holes of the plurality of holes have a diameter (or maximum cross-sectional dimension) in the range of about 0.1 mm to about 50 mm, about 0.1 mm to about 25 mm, about 0.1 mm to about 15 mm, about 0.1 mm to about 10 mm, about 0.1 mm to about 5 mm, about 0.1 mm to about 1 mm, about 1 mm to about 50 mm, about 1 mm to about 25 mm, about 1 mm to about 15 mm, about 1 mm to about 10 mm, or about 1 mm to about 5 mm. The holes may have any suitable shape. For example, at least a portion of the plurality of holes may be substantially circular, substantially elliptical, substantially square, substantially rectangular, substantially triangular, and/or irregularly shaped. In some embodiments, substantially all the holes of the plurality of holes are substantially circular, substantially elliptical, substantially square, substantially rectangular, substantially triangular, and/or irregularly shaped.

In some cases, the sparger plate may be arranged along the bottom surface of a stage within the humidification region and/or the dehumidification region. In some embodiments, the sparger plate may have a surface area that covers at least about 50%, at least about 60%, at least about 70%, at least about 80%, at least about 90%, at least about 95%, or about 100% of a cross-section of the humidification region and/or the dehumidification region.

In some embodiments, a combined HDH apparatus (e.g., a combined bubble column apparatus) further comprises an optional stack. A stack generally refers to a structure (e.g., conduit) in fluid communication with a gas outlet of the combined HDH apparatus, where the maximum cross-sectional dimension (e.g., diameter) and/or length of the stack is larger than the corresponding maximum cross-sectional dimension and/or length of the gas outlet. In some cases, a stack may reduce or eliminate droplet entrainment (e.g., droplets of liquid flowing out of the apparatus with the gas stream). Without wishing to be bound by a particular theory, increasing the maximum cross-sectional dimension of a conduit through which a gas stream flows will tend to reduce the velocity of the gas stream. As a result, dimensions of the stack may be determined or selected for a given gas stream flow volume that can result in a gas stream velocity in the stack that may be insufficient to entrain any liquid droplets or at least some liquid droplets that may be present in the gas stream, the result being that such droplets may fall out of the gas stream instead of exiting the apparatus. For example, in certain cases, the drag force on a liquid droplet (assuming such droplet is substantially spherical in shape) in a gas stream may be approximated by Stokes' Law:

$$F_{drag} = 6\pi\mu R V$$

where $F_{drag}$ is the drag force exerted on the droplet (e.g., by the moving gas stream), $\mu$ is the dynamic viscosity of the gas, R is the radius of the droplet, and V is the velocity of the gas relative to the velocity of the droplet. In some cases, when $F_{drag}$ is greater than the gravitational force acting on the droplet, the droplet may remain entrained and may exit the apparatus with the gas stream. In some cases, when $F_{drag}$ is less than the gravitational force acting on the droplet, the droplet may fall out of the gas stream and return to the apparatus. According to some embodiments, the expanded maximum cross-sectional dimension of the stack (e.g., compared to the maximum cross-sectional dimension of the gas outlet) may cause the velocity of the gas stream flowing through the stack (e.g., the dehumidified gas stream) to be reduced. According to Stokes' Law, reducing the velocity of the gas stream flowing through the stack may reduce the drag force exerted on liquid droplets in the gas stream. In certain cases, the drag force may be reduced to such an extent that the drag force exerted on the droplets becomes less than the gravitational force. Accordingly, in certain embodiments, as a gas stream containing entrained liquid droplets flows into a stack having an expanded cross-sectional dimension relative to the gas outlet, one or more of the entrained liquid droplets may fall out of the gas stream and return to a liquid layer of the apparatus (e.g., through the gas outlet and/or a separate conduit). In a particular, non-limiting embodiment, one or more entrained liquid droplets may fall out of a gas stream flowing through the stack and may form a surface film on the sides of the stack. In the particular embodiment, liquid droplets may subsequently flow from the surface film on the sides of the stack to a liquid layer of the apparatus.

Figure 1B:
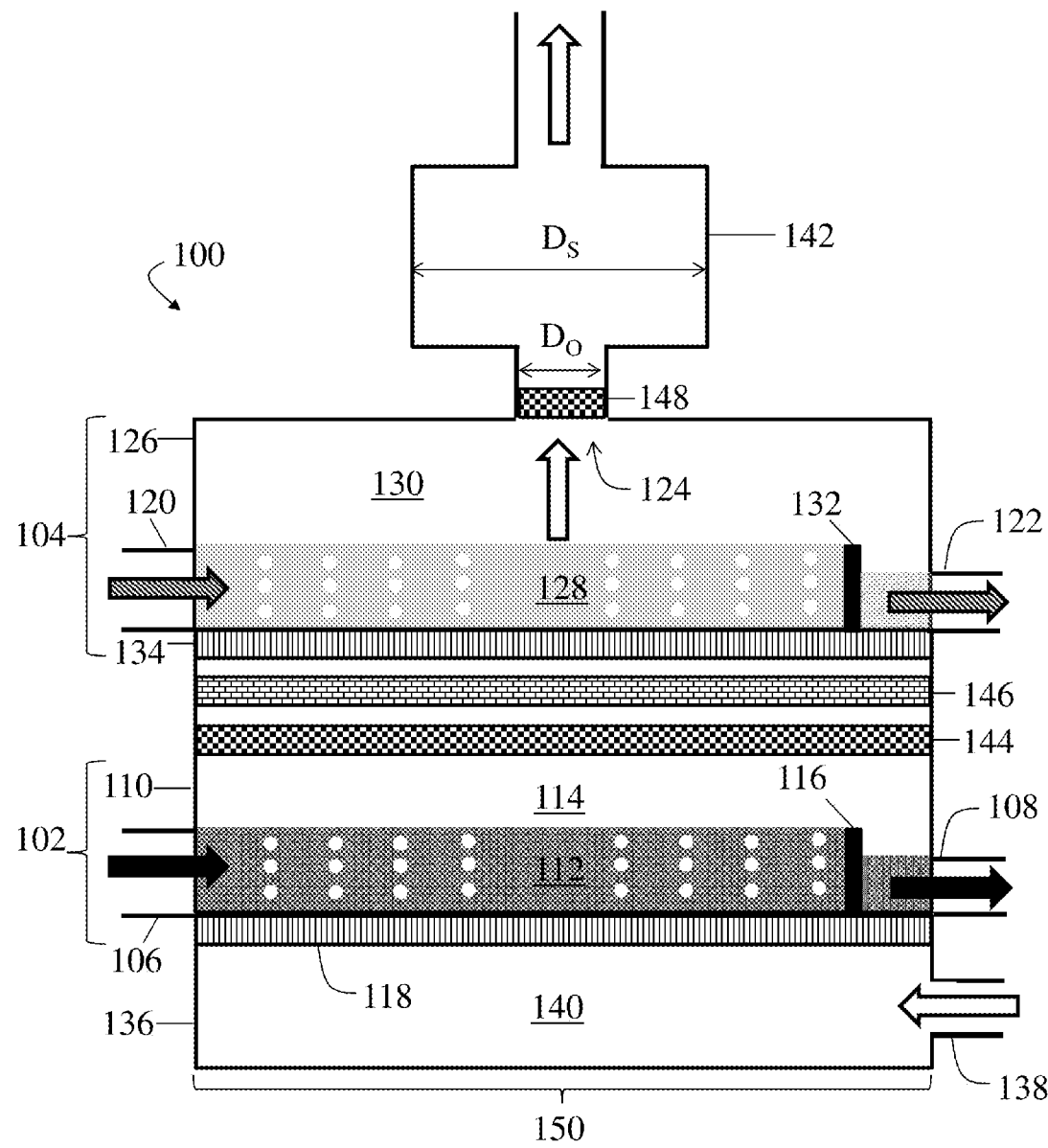
FIG. 1B shows a schematic illustration of an exemplary desalination system comprising a vessel comprising a single-stage humidification region, a single-stage dehumidification region, a stack, two droplet eliminators, and a liquid collector, according to some embodiments.

FIG. 1B shows, according to some embodiments, a schematic illustration of an exemplary apparatus 100 comprising optional stack 142 in fluid communication with apparatus gas outlet 124. In some cases, stack 142 may prevent droplets of liquid from liquid layer 128 from flowing out of apparatus 100 with a dehumidification region gas outlet stream (e.g., a dehumidified gas stream). Instead, liquid droplets present in the dehumidified gas stream may fall out of the dehumidified gas stream and return to liquid layer 128 (e.g., through gas outlet 124 and/or a separate conduit). As shown in FIG. 1B, in some cases, stack 142 has a maximum cross-sectional dimension (e.g., length, diameter) $D_s$ that is greater than the maximum cross-sectional dimension $D_o$ of gas outlet 124. In certain embodiments, the maximum cross-sectional dimension $D_s$ of the stack is at least about 0.01 m, at least about 0.02 m, at least about 0.05 m, at least about 0.1 m, at least about 0.2 m, at least about 0.5 m, at least about 1 m, at least about 2 m, or at least about 5 m greater than the maximum cross-sectional dimension $D_o$ of the outlet. In some embodiments, maximum cross-sectional dimension $D_s$ of the stack is greater than maximum cross-sectional dimension $D_o$ of the outlet by an amount in the range of about 0.01 m to about 0.05 m, about 0.01 m to about 0.1 m, about 0.01 m to about 0.5 m, about 0.01 m to about 1 m, about 0.01 m to about 5 m, about 0.1 m to about 0.5 m, about 0.1 m to about 1 m, about 0.1 m to about 5 m, about 0.5 m to about 1 m, about 0.5 m to about 5 m, or about 1 m to about 5 m.

In some embodiments, a combined HDH apparatus (e.g., a combined bubble column apparatus) optionally comprises one or more droplet eliminators. A droplet eliminator generally refers to a device or structure configured to prevent entrainment of liquid droplets. Non-limiting examples of suitable types of droplet eliminators include mesh eliminators (e.g., wire mesh mist eliminators), vane eliminators (e.g., vertical flow chevron vane mist eliminators, horizontal flow chevron vane mist eliminators), cyclonic separators, vortex separators, droplet coalescers, and/or knockout drums. In some cases, the droplet eliminator may be configured such that liquid droplets entrained in a gas stream collide with a portion of the droplet eliminator and fall out of the gas stream. In certain embodiments, the droplet eliminator may extend across the opening (e.g., mouth) of one or more gas outlets.

In some cases, a droplet eliminator may be positioned within a combined HDH apparatus (e.g., a combined bubble column apparatus) upstream of a gas outlet of a humidification region and/or a dehumidification region. For example, in FIG. 1B, combined bubble column apparatus 100 comprises a first droplet eliminator 144 positioned between humidification chamber 110 and dehumidification chamber 126 (e.g., upstream of bubble generator 134, which acts as a gas outlet of humidification region 102). In addition, combined bubble column apparatus 100 comprises a second droplet eliminator 148 positioned between dehumidification chamber 126 and apparatus gas outlet 124, which acts as a gas outlet of dehumidification region 104. In operation, liquid droplets in a gas stream flowing through apparatus 100 may encounter first droplet eliminator 144 and/or second droplet eliminator 148 and return to a liquid layer (e.g., liquid layer 112 and/or liquid layer 128).

In some cases, reducing or eliminating droplet entrainment may advantageously increase the amount of condensable fluid in liquid phase (e.g., purified water) recovered from a combined HDH apparatus (e.g., by reducing the amount of condensable fluid lost through an apparatus gas outlet). In certain embodiments, reducing or eliminating droplet entrainment may increase the amount of condensable fluid in liquid phase (e.g., purified water) recovered from a combined HDH apparatus by at least about 1%, at least about 5%, at least about 10%, at least about 15%, at least about 20%, at least about 30%, at least about 40%, at least about 50%, or at least about 60%. In some cases, reducing or eliminating droplet entrainment may increase the amount of condensable fluid recovered from a combined HDH apparatus by an amount in the range of about 1% to about 10%, about 1% to about 20%, about 1% to about 40%, about 1% to about 60%, about 5% to about 20%, about 5% to about 40%, about 5% to about 60%, about 10% to about 20%, about 10% to about 30%, about 10% to about 40%, about 10% to about 50%, about 10% to about 60%, about 20% to about 30%, about 20% to about 40%, about 20% to about 50%, about 20% to about 60%, about 30% to about 40%, about 30% to about 50%, about 30% to about 60%, about 40% to about 50%, about 40% to about 60%, or about 50% to about 60%.

In some embodiments, a combined HDH apparatus (e.g., a combined bubble column apparatus) optionally comprises a liquid collector. A liquid collector generally refers to a structure or device configured to collect a liquid while allowing a gas to freely flow through it. Examples of suitable types of liquid collectors include, but are not limited to, deck collectors, trough collectors, and vane collectors. According to some embodiments, a liquid collector is configured to collect water that falls on it from above (e.g., from a dehumidification region positioned above the liquid collector) while allowing a gas stream (e.g., a humidification region gas outlet stream comprising a heated, at least partially humidified gas) to freely flow through the liquid collector. In some cases, the liquid collector advantageously prevents liquid from a dehumidification region of a combined HDH apparatus from flowing to a humidification region of the combined HDH apparatus. For example, if gas flow through a combined bubble column apparatus is terminated while liquid remains in one or more stages of the dehumidification region, the liquid may exit the one or more stages through one or more bubble generators (e.g., through the holes of sparger plates). The presence of a liquid collector may, in some cases, prevent the liquid exiting the one or more dehumidification stages from entering the humidification region. This may avoid, for example, the commingling of liquid from the dehumidification region, which may comprise a condensable fluid in liquid phase (e.g., substantially pure water), with liquid from the humidification region, which may comprise the condensable fluid in liquid phase and one or more contaminants (e.g., salt-containing water). In certain embodiments, the liquid collector may act as a liquid sump volume for the dehumidification region.

In some cases, a liquid collector is positioned between the humidification region and the dehumidification region of a combined HDH apparatus (e.g., a combined bubble column apparatus). In some embodiments, the liquid collector is positioned between a vapor distribution region of a stage of the humidification region (e.g., the last stage of the humidification region through which a gas stream flows) and a bubble generator of a stage of the dehumidification region (e.g., the first stage of the dehumidification region through which a gas stream flows). In certain embodiments, the liquid collector is positioned between a droplet eliminator and a bubble generator of a stage of the dehumidification region (e.g., the first stage of the dehumidification region through which a gas stream flows). For example, in FIG. 1B, liquid collector 146 is positioned between droplet eliminator 144 and bubble generator 134 of dehumidification chamber 126.

In some embodiments, the humidification region and/or dehumidification region of a vessel of a combined HDH apparatus (e.g., a combined bubble column apparatus) comprise a plurality of stages. In some cases, the stages may be arranged such that a gas flows sequentially from a first stage to a second stage. In some cases, the stages may be vertically arranged (e.g., a second stage may be positioned above or below a first stage in an apparatus) or horizontally arranged (e.g., a second stage may be positioned to the right or left of a first stage in an apparatus). The stages may be arranged such that a gas stream flows sequentially through a first stage, a second stage, a third stage, and so on. In some cases, each stage may comprise a liquid layer. In embodiments relating to humidification regions comprising a plurality of stages (e.g., multi-stage humidification regions), the temperature of a liquid layer of a first stage (e.g., the bottommost stage in a vertically arranged humidification region) may be lower than the temperature of a liquid layer of a second stage (e.g., a stage positioned above the first stage in a vertically arranged humidification region), which may be lower than the temperature of a liquid layer of a third stage (e.g., a stage positioned above the second stage in a vertically arranged humidification region). In some embodiments, each stage in a multi-stage humidification region operates at a temperature above that of the previous stage (e.g., the stage below it, in embodiments comprising vertically arranged humidification regions). In embodiments relating to dehumidification regions comprising a plurality of stages (e.g., multi-stage dehumidification regions), the temperature of a liquid layer of a first stage (e.g., the bottommost stage in a vertically arranged dehumidification region) may be higher than the temperature of a liquid layer of a second stage (e.g., a stage positioned above the first stage in a vertically arranged dehumidification region), which may be higher than the temperature of a liquid layer of a third stage (e.g., a stage positioned above the second stage in a vertically arranged dehumidification region). In some embodiments, each stage in a multi-stage dehumidification region operates at a temperature below that of the previous stage (e.g., the stage below it, in embodiments comprising vertically arranged dehumidification regions).

The presence of multiple stages within the humidification region and/or dehumidification region of a combined HDH apparatus may, in some cases, advantageously result in increased humidification and/or dehumidification of a gas. In some cases, the presence of multiple stages may advantageously lead to higher recovery of a condensable fluid in liquid phase. For example, the presence of multiple stages may provide numerous locations where the gas may be humidified and/or dehumidified (e.g., treated to recover the condensable fluid). That is, the gas may travel through more than one liquid layer in which at least a portion of the gas undergoes humidification (e.g., evaporation) or dehumidification (e.g., condensation). In addition, the presence of multiple stages may increase the difference in temperature between a liquid stream at an inlet and an outlet of a humidification region and/or dehumidification region. For example, the use of multiple stages can produce a dehumidification region liquid outlet stream having increased temperature relative to the dehumidification region liquid inlet stream, as discussed more fully below. This may be advantageous in systems where heat from a liquid stream (e.g., dehumidification region liquid outlet stream) is transferred to a separate stream (e.g., humidification region liquid inlet stream) within the system. In such cases, the ability to produce a heated dehumidification region liquid outlet stream can increase the energy effectiveness of the system. Additionally, the presence of multiple stages may enable greater flexibility for fluid flow within an apparatus. For example, as discussed in further detail below, extraction and/or injection of fluids (e.g., gas streams) from intermediate humidification and/or dehumidification stages may occur through intermediate exchange conduits.

It should be understood that the humidification region and/or dehumidification region of a vessel of a combined HDH apparatus may have any number of stages. In some embodiments, the humidification region and/or dehumidification region may have at least one, at least two, at least three, at least four, at least five, at least six, at least seven, at least eight, at least nine, or at least ten or more stages. In some embodiments, the humidification region and/or dehumidification region may have no more than one, no more than two, no more than three, no more than four, no more than five, no more than six, no more than seven, no more than eight, no more than nine, or no more than ten stages. In some embodiments, the stages may be arranged such that they are substantially parallel to each other. In certain cases, the stages may be positioned at an angle.

In some cases, at least one stage of the plurality of stages of a humidification region and/or dehumidification region of a vessel of a combined HDH apparatus comprises a chamber in fluid communication with one or more bubble generators. In some cases, a liquid layer occupies a portion of the chamber. In some embodiments, a vapor distribution region comprises at least a portion of the chamber not occupied by the liquid layer (e.g., the portion of the chamber above the liquid layer). In some embodiments, the vapor distribution region is positioned between two liquid layers of two consecutive stages. The vapor distribution region may, in certain cases, advantageously damp out flow variations created by random bubbling by allowing a gas to redistribute evenly across the cross section of the vessel of the apparatus. Additionally, in the free space of the vapor distribution region, large droplets entrained in the gas may have some space to fall back into the liquid layer before the gas enters the subsequent stage. The vapor distribution region may also serve to separate two subsequent stages, thereby increasing the thermodynamic effectiveness of the apparatus by keeping the liquid layers of each stage separate. As discussed in further detail below, the chamber may further comprise one or more weirs and/or baffles to control liquid flow through the chamber. The chamber may, additionally, comprise one or more conduits (e.g., liquid conduits) to adjacent stages.

Figure 2A:
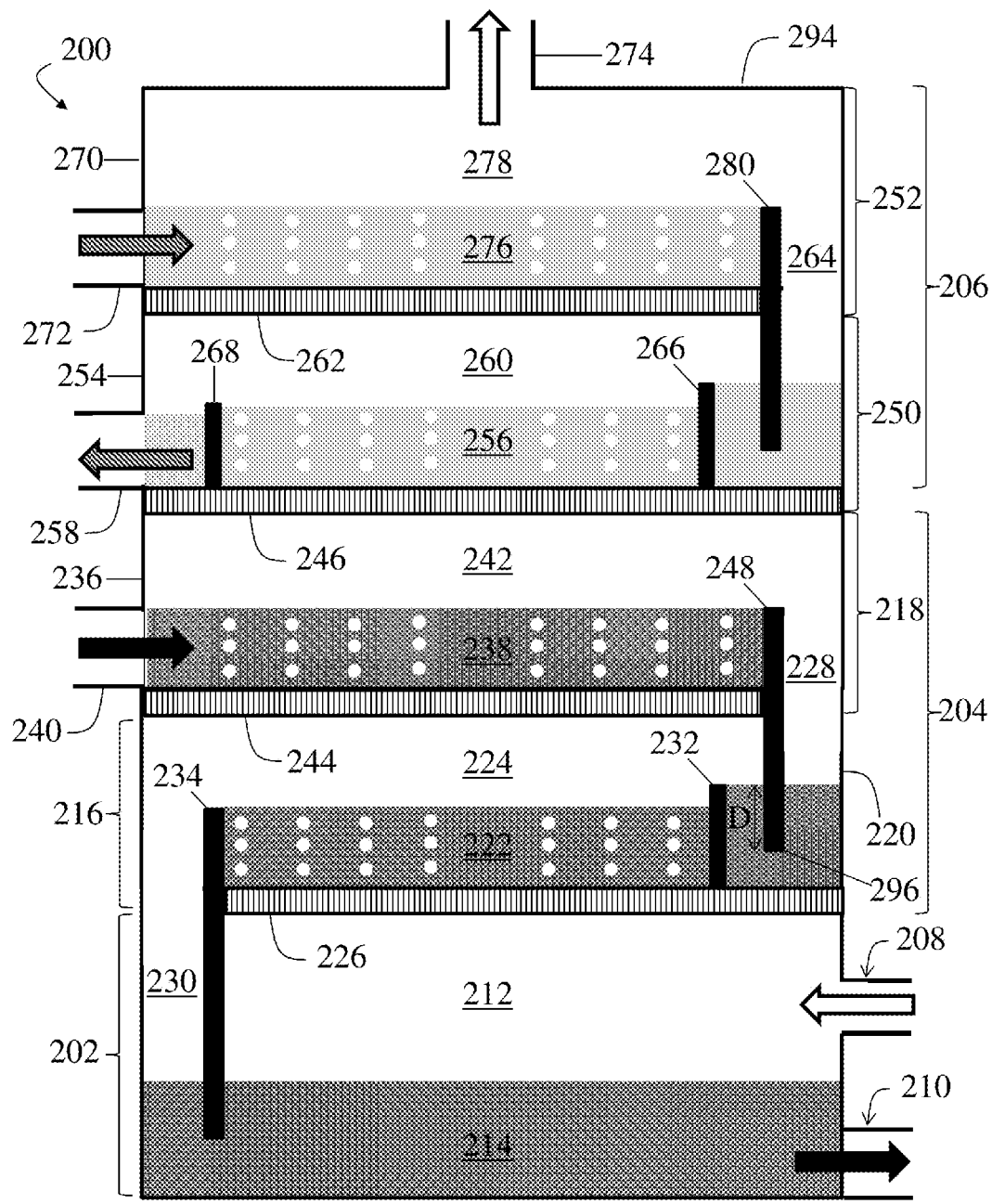
FIG. 2A shows, according to some embodiments, a schematic illustration of an exemplary desalination system comprising a vessel comprising a multi-stage humidification region and a multi-stage dehumidification region.

FIG. 2A shows a schematic cross-sectional diagram of an exemplary multi-stage combined bubble column apparatus, according to some embodiments. In FIG. 2A, combined bubble column apparatus 200 comprises vessel 294 comprising gas distribution chamber 202, humidification region 204, and dehumidification region 206. Humidification region 204 may be arranged vertically above gas distribution chamber 202, and dehumidification region 206 may be arranged vertically above humidification region 204. In some embodiments, gas distribution chamber 202 comprises an apparatus gas inlet 208 and a humidification region liquid outlet 210. Apparatus gas inlet 208 may be fluidically connected to a source of a first gas comprising a condensable fluid in vapor phase and/or a non-condensable gas (not shown in FIG. 2A). In some cases, gas distribution chamber 202 comprises a gas distribution region 212, throughout which a gas entering through apparatus gas inlet 208 is substantially evenly distributed (e.g., along a bottom surface of bubble generator 226). In some embodiments, gas distribution chamber 202 further comprises liquid sump volume 214 occupying at least a portion of gas distribution chamber 202 that is not occupied by gas distribution region 212. In some cases, liquid collects in sump volume 214 after exiting humidification region 204 prior to exiting vessel 294 of apparatus 200. As shown in FIG. 2A, sump volume 214 may be in direct contact with humidification region liquid outlet 210. Sump volume 214 and humidification region liquid outlet 210 may, in some cases, be in fluid communication with a pump that pumps liquid out of vessel 294 of combined bubble column apparatus 200 (not shown in FIG. 2A). In some cases, sump volume 214 may provide a positive suction pressure on the intake of the pump and may advantageously prevent negative suction pressure that may induce cavitation bubbles. Sump volume 214 may also decrease the sensitivity of apparatus 200 to sudden changes in heat transfer rates.

As shown in FIG. 2A, humidification region 204 comprises first humidification stage 216 and second humidification stage 218, where second humidification stage 218 is arranged vertically above first humidification stage 216. First humidification stage 216 comprises chamber 220, which is partially occupied by liquid layer 222. In some cases, liquid layer 222 comprises a condensable fluid in liquid phase and one or more contaminants (e.g., dissolved salts). A vapor distribution region 224 may occupy at least a portion of humidification chamber 220 that is not occupied by liquid layer 222 (e.g., the region above liquid layer 222). Vapor distribution region 224 may be positioned between liquid layer 222 of first humidification stage 216 and liquid layer 238 of second humidification stage 218. In FIG. 2A, humidification chamber 220 is in fluid communication with bubble generator 226, which may act as a gas inlet of first humidification stage 216 and allow fluid communication between gas distribution chamber 202 and first humidification stage 216, and bubble generator 244, which may act as a gas outlet of first humidification stage 216 and allow fluid communication between first humidification stage 216 and second humidification stage 218. Bubble generator 226 may occupy substantially the entire bottom surface of first humidification stage 216 or may occupy a smaller portion of the bottom surface of first humidification stage 216. Bubble generator 244 may occupy substantially the entire top surface of first humidification stage 216 or may occupy a smaller portion of the top surface of first humidification stage 216. Humidification chamber 220 may also be in fluid communication with downcomer 228, which provides a liquid conduit between first stage 216 and second stage 218, and downcomer 230, which provides a liquid conduit between first stage 216 and gas distribution chamber 202. Downcomer 228, which is positioned between first stage 216 and second stage 218, provides a path for any overflowing condensable fluid (e.g., from liquid layer 238) to travel from second stage 218 to first stage 216.

Chamber 220 may also comprise one or more liquid flow structures (e.g., weirs and/or baffles). For example, as shown in FIG. 2A, chamber 220 comprises first weir 232 and second weir 234. First weir 232 is positioned downstream of downcomer 228 and may form a pool surrounding the outlet of downcomer 228. The outlet of downcomer 228 may be submerged in the pool, thereby preventing the gas flowing through first stage 216 from flowing to second stage 218 through downcomer 228 instead of through bubble generator 244. For example, in some cases, the pool of liquid surrounding the outlet of downcomer 228 has a height higher than the height of liquid layer 222 (e.g., the height of weir 232 is higher than the height of liquid layer 222). This may advantageously result in an increased hydrostatic head around downcomer 228, such that gas bubbles preferentially flow through liquid layer 222 instead of through the pool of liquid surrounding downcomer 228 (e.g., the hydrostatic head of liquid that the gas has to overcome is higher in the pool of liquid surrounding downcomer 228 than in liquid layer 222), preventing the gas from bypassing bubble generator 244. In some cases, allowing the gas to flow through downcomer 228 to bypass bubble generator 244 may have the deleterious effect of disrupting the flow of liquid through apparatus 200 and may, in certain cases, stop operation of apparatus 200 entirely. In certain embodiments, the pool of liquid surrounding downcomer 228 has a height higher than the height of liquid layer 222 and higher than the height of liquid layer 238. In certain cases, the portion of the bottom surface of chamber 220 around and/or beneath downcomer 228 (e.g., the portion of the bottom surface of chamber 220 between weir 232 and an end wall) is substantially impermeable to gas flow (e.g., does not comprise a bubble generator), and any pool of liquid surrounding downcomer 228 may have a height that is higher than, lower than, or equal to the height of liquid layer 222 and/or liquid layer 238. In some embodiments, the distance D (e.g., vertical distance) between the top of weir 232 and the bottom of the outlet of downcomer 228 (indicated as 296 in FIG. 2A) is greater than the height of liquid layer 238. This may, in some cases, advantageously prevent back flow through downcomer 228. In certain embodiments, the distance D (e.g., vertical distance) between the top of weir 232 and the bottom of the outlet of downcomer 228 is greater than the height of liquid layer 222 and greater than the height of liquid layer 238. In some cases, second weir 234 is positioned upstream of downcomer 230 and establishes the maximum height of liquid layer 222, such that any liquid above that height would flow over weir 234, through downcomer 230, to liquid sump volume 214. Weir 232 and weir 234 may be positioned such that liquid entering first humidification stage 216 is directed to flow from first weir 232 to second weir 234.

Second humidification stage 218 comprises humidification chamber 236 and liquid layer 238 positioned within chamber 236. Liquid layer 238 is in fluid communication with humidification region liquid inlet 240, which may be fluidically connected to a source of a liquid comprising a condensable fluid in liquid phase and one or more contaminants (e.g., dissolved salts). In some embodiments, a vapor distribution region 242 occupies at least a portion of humidification chamber 236 that is not occupied by liquid layer 238 (e.g., the region above liquid layer 238). In FIG. 2A, humidification chamber 236 is in fluid communication with bubble generator 244, which may act as a gas inlet of second humidification stage 218 and allow fluid communication between first humidification stage 216 and second humidification stage 218, and bubble generator 246, which may act as a gas outlet of second humidification stage 218 and allow fluid communication between second humidification stage 218 and first dehumidification stage 250. Bubble generator 244 may occupy substantially the entire bottom surface of second humidification stage 218 or may occupy a smaller portion of the bottom surface of second humidification stage 218. Bubble generator 246 may occupy substantially the entire top surface of second humidification stage 218 or may occupy a smaller portion of the top surface of second humidification stage 218. Humidification chamber 236 may also be in fluid communication with downcomer 228. Humidification chamber 236 may further comprise weir 248, which may be positioned upstream of downcomer 228. Weir 248 may establish the maximum height of liquid layer 238, such that any liquid that would exceed the height of weir 248 would flow over weir 248, through downcomer 228, and into liquid layer 222 of first humidification stage 216. Weir 248 may be positioned such that liquid may flow across humidification chamber 236 from humidification region liquid inlet 240 to weir 248.

As shown in FIG. 2A, dehumidification region 206 comprises first dehumidification stage 250 and second dehumidification stage 252, where second dehumidification stage 252 is arranged vertically above first dehumidification stage 250. First dehumidification stage 250 comprises dehumidification chamber 254, which is partially occupied by liquid layer 256. In some cases, liquid layer 256, which may be in fluid communication with dehumidification region liquid outlet 258, comprises the condensable fluid in liquid phase (e.g., substantially pure water). A vapor distribution region 260 may occupy at least a portion of chamber 254 that is not occupied by liquid layer 256 (e.g., the region above liquid layer 256). Vapor distribution region 260 may be positioned between liquid layer 256 of first dehumidification stage 250 and liquid layer 276 of second dehumidification stage 252. In FIG. 2A, dehumidification chamber 254 is in fluid communication with bubble generator 246, which may act as a gas inlet of first dehumidification stage 250 and facilitate fluid communication between second humidification stage 218 and first dehumidification stage 250, and bubble generator 262, which may act as a gas outlet of first dehumidification stage 250 and facilitate fluid communication between first dehumidification stage 250 and second dehumidification stage 252. Bubble generator 246 may occupy substantially the entire bottom surface of first dehumidification stage 250 or may occupy a smaller portion of the bottom surface of first dehumidification stage 250. Bubble generator 262 may occupy substantially the entire top surface of first dehumidification stage 250 or may occupy a smaller portion of the top surface of first dehumidification stage 250.

In FIG. 2A, dehumidification chamber 254 of first dehumidification stage 250 is also in fluid communication with downcomer 264, which provides a liquid conduit between first stage 250 and second stage 252 of dehumidification region 206. Dehumidification chamber 254 may also comprise first weir 266 and second weir 268. First weir 266 may be located downstream of downcomer 264 and may establish a pool of liquid around the outlet of downcomer 264 having a height higher than the height of liquid layer 256 (e.g., the height of weir 266 may be higher than the height of liquid layer 256). First weir 266 may be configured to prevent a gas stream flowing through first dehumidification stage 250 from bypassing bubble generator 262. In some embodiments, the distance (e.g., vertical distance) between the top of first weir 266 and the bottom of the outlet of downcomer 264 is greater than the height of liquid layer 276. In some embodiments, second weir 268 may be positioned upstream of dehumidification region liquid outlet 258. Second weir 268 may establish the maximum height of liquid layer 256 (e.g., any liquid that would cause the height of liquid layer 256 to exceed the height of weir 268 would flow over weir 268 and exit through outlet 258). In some cases, dehumidification stage 250 may be configured such that liquid entering first dehumidification stage 250 via downcomer 264 flows from first weir 266 to second weir 268.

Second dehumidification stage 252 comprises dehumidification chamber 270, which may be in fluid communication with bubble generator 262, dehumidification region liquid inlet 272, apparatus gas outlet 274, and downcomer 264. Bubble generator 262 may act as a gas inlet to second dehumidification stage 252 and may allow fluid communication between first dehumidification stage 250 and second dehumidification stage 252. For example, bubble generator 262 may be arranged to receive the gas from first dehumidification stage 250. Bubble generator 262 may occupy substantially the entire bottom surface of second stage 252 or may occupy a smaller portion of the bottom surface of second stage 252. Downcomer 264 may provide a liquid conduit between first stage 250 and second stage 252 of dehumidification region 206. Chamber 270 may be at least partially occupied by liquid layer 276, which may comprise the condensable fluid in liquid phase. Liquid layer 276 may be in fluid communication with dehumidification region liquid inlet 272. At least a portion of chamber 270 not occupied by liquid layer 276 may comprise a vapor distribution region 278, which may be in fluid communication with apparatus gas outlet 274. Dehumidification chamber 270 may also comprise weir 280, which may establish the maximum height of liquid layer 276. Second dehumidification stage 252 may be configured such that liquid flows across chamber 270 from dehumidification region liquid inlet 272 to weir 280.

In operation, a first gas stream may enter vessel 294 of apparatus 200 via apparatus gas inlet 208, which is in fluid communication with gas distribution chamber 202. In gas distribution chamber 202, the first gas stream may be substantially homogeneously distributed throughout gas distribution region 212, along the bottom surface of bubble generator 226. The first gas stream may flow through bubble generator 226, thereby forming a plurality of gas bubbles. The gas bubbles may then flow through liquid layer 222, which may comprise a condensable fluid in liquid phase (e.g., liquid water) and one or more contaminants (e.g., dissolved salts). As the gas bubbles flow through liquid layer 222, which may have a higher temperature than the gas bubbles, heat and/or mass (e.g., condensable fluid) may be transferred from liquid layer 222 to the gas bubbles through an evaporation (e.g., humidification) process, such that the gas bubbles comprise the condensable fluid in vapor phase. In some embodiments, the condensable fluid is water, and the gas bubbles are at least partially humidified as they travel through liquid layer 222. Bubbles of the at least partially humidified first gas may enter vapor distribution region 224 of humidification chamber 220 and recombine, resulting in the at least partially humidified first gas stream being substantially evenly distributed throughout vapor distribution region 224.

The at least partially humidified first gas stream may then enter humidification chamber 236 of second humidification stage 218, flowing through bubble generator 244 and forming bubbles of the at least partially humidified first gas. The gas bubbles may then flow through liquid layer 238, which may have a higher temperature than the gas bubbles. As the gas bubbles flow through liquid layer 238, they may undergo an evaporation process, and heat and/or mass may be transferred from liquid layer 238 to the gas bubbles. After exiting liquid layer 238, the gas bubbles may enter vapor distribution region 242 of humidification chamber 236, where they may recombine and form a further heated and humidified first gas stream that is substantially homogeneously distributed throughout vapor distribution region 242, along the bottom surface of bubble generator 246.

The further humidified first gas stream may then enter first dehumidification stage 250 of dehumidification region 206 through bubble generator 246. Bubbles of the further humidified first gas may travel through liquid layer 256, which may comprise the condensable fluid in liquid phase (e.g., substantially pure water). The temperature of liquid layer 256 may be lower than the temperature of the bubbles of the further humidified first gas, and heat and/or mass (e.g., condensable fluid) may be transferred from the heated, humidified first gas bubbles to liquid layer 256 through a condensation (e.g., dehumidification) process to form an at least partially dehumidified gas. Bubbles of the cooled, at least partially dehumidified first gas may recombine in vapor distribution region 260 of dehumidification chamber 254. The recombined cooled, at least partially dehumidified first gas may then enter second dehumidification stage 252 through bubble generator 262. Bubbles of the cooled, at least partially dehumidified gas may travel through liquid layer 276, which may have a lower temperature than the gas bubbles. As the gas bubbles travel through liquid layer 276, they may be further dehumidified, transferring heat and/or mass to liquid layer 276 through a condensation (e.g., dehumidification) process. Bubbles of the further dehumidified first gas may recombine in vapor distribution region 278 of dehumidification chamber 270 and subsequently exit vessel 294 of combined bubble column apparatus 200 through apparatus gas outlet 274.

In some embodiments, one or more liquid streams flows through combined bubble column apparatus 200 (e.g., in substantially the opposite direction as the first gas stream). According to some embodiments, a first liquid stream comprising the condensable fluid in liquid phase and one or more contaminants enters vessel 294 of apparatus 200 through humidification region liquid inlet 240, which is in fluid communication with liquid layer 238 of second humidification stage 218. As the first liquid stream flows across chamber 236, from humidification region liquid inlet 240 to weir 248, the first liquid stream (e.g., as part of liquid layer 238) may directly contact a plurality of gas bubbles having a temperature lower than the temperature of the first liquid stream. Heat and/or mass may be transferred from the first liquid stream to the gas bubbles through an evaporation (e.g., humidification) process, resulting in a cooled first liquid stream. If the height of liquid layer 238 exceeds the height of weir 248, the cooled first liquid stream may flow over the top of weir 248, through downcomer 228, to a pool of liquid surrounding the outlet of downcomer 228. If the height of the pool of liquid exceeds the height of weir 232, the cooled first liquid stream may flow over the top of weir 232 to liquid layer 222 of first humidification stage 216. As the cooled first liquid stream flows across chamber 220 of first humidification stage 216, from weir 232 to weir 234, the cooled first liquid stream (e.g., as part of liquid layer 222) may directly contact a plurality of gas bubbles having a temperature lower than the cooled first liquid stream. Heat and/or mass may be transferred from the cooled first liquid stream to the gas bubbles through an evaporation process, resulting in a further cooled first liquid stream. If the height of liquid layer 222 exceeds the height of weir 234, the further cooled first liquid stream may flow over the top of weir 234, through downcomer 230, to liquid sump volume 214. The further cooled first liquid stream may then exit vessel 294 of combined bubble column apparatus 200 through humidification region liquid outlet 210.

In some embodiments, a second liquid stream comprising the condensable fluid in liquid phase enters vessel 294 of apparatus 200 through dehumidification region liquid inlet 272, which is in fluid communication with liquid layer 276 of second dehumidification stage 252. As the second liquid stream flows across dehumidification chamber 270, from dehumidification region liquid inlet 272 to weir 280, the second liquid stream (e.g., as part of liquid layer 276) may directly contact a plurality of gas bubbles having a temperature higher than the temperature of the second liquid stream.

Heat and/or mass may be transferred from the gas bubbles to the second liquid stream, resulting in a heated second liquid stream. If the height of liquid layer 276 exceeds the height of weir 280, the heated second liquid stream may flow over the top of weir 280, through downcomer 264, to a pool of liquid surrounding the outlet of downcomer 264. If the height of the pool of liquid exceeds the height of weir 266, the heated second liquid stream may flow over the top of weir 266 to liquid layer 256 of first dehumidification stage 250. As the heated second liquid stream flows across chamber 254 of first dehumidification stage 250, from weir 266 to weir 268, the heated second liquid stream (e.g., as part of liquid layer 256) may directly contact a plurality of gas bubbles having a higher temperature than the heated second liquid stream. Heat and/or mass may be transferred from the gas bubbles to the second liquid stream, resulting in a further heated second liquid stream. If the height of liquid layer 256 exceeds the height of weir 268, the further heated second liquid stream may flow over the top of weir 268 and exit vessel 294 of combined bubble column apparatus 200 through dehumidification region liquid outlet 258.

Figure 2B:
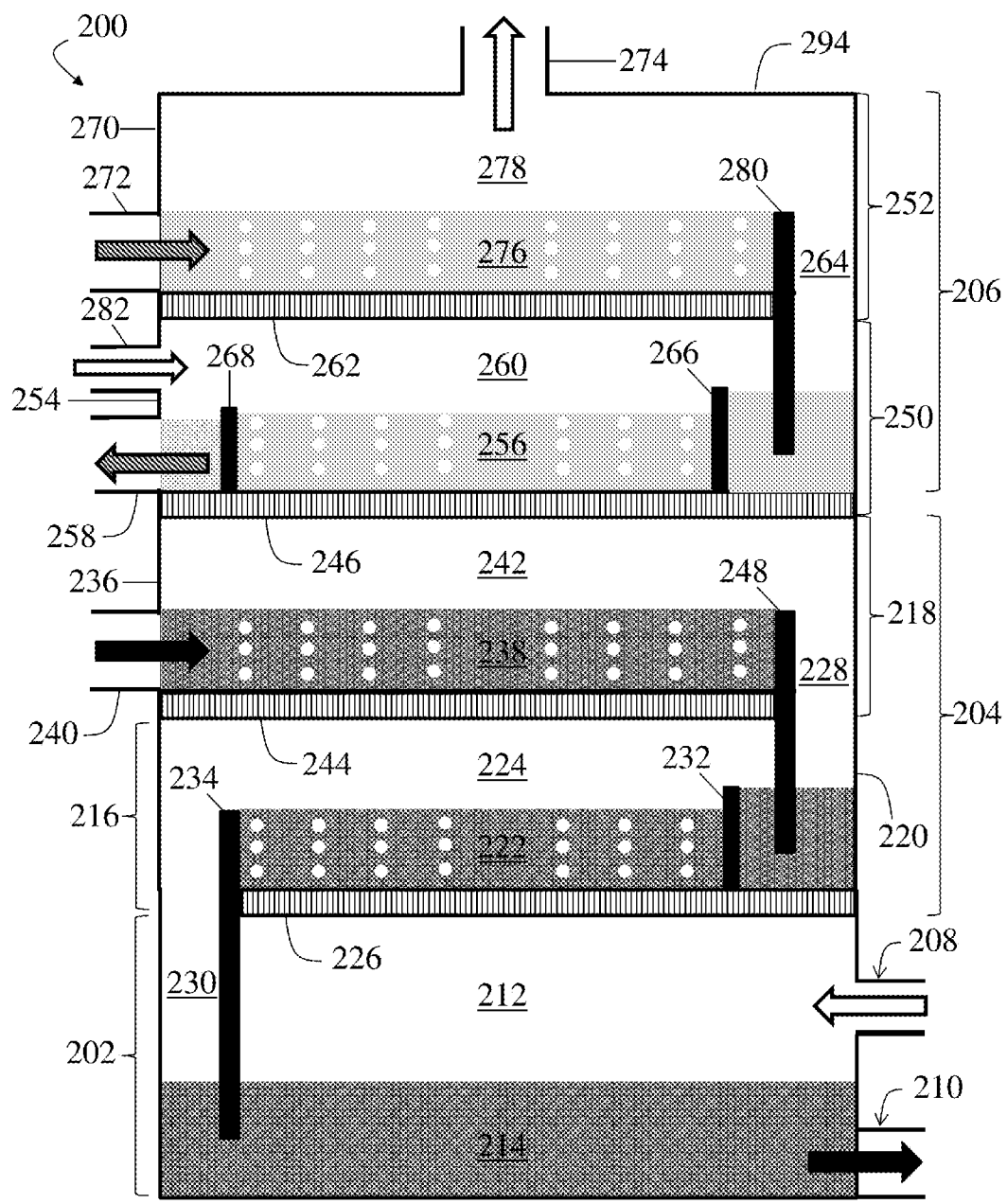
FIG. 2B shows, according to some embodiments, a schematic illustration of an exemplary desalination system comprising a vessel comprising a multi-stage humidification region, a multi-stage dehumidification region, and an intermediate gas injection point.

In certain embodiments, combined bubble column apparatus 200 further comprises one or more additional gas inlets. For example, in FIG. 2B, apparatus 200 further comprises optional second apparatus gas inlet 282. Second apparatus gas inlet 282 may be in fluid communication with a source of a second gas (not shown in FIG. 2B). The composition of the second gas may be the same or different as the first gas. In some cases, the second gas may comprise the condensable fluid in vapor phase (e.g., water vapor) and/or a non-condensable gas. In some embodiments, the first and second gases may have different vapor (e.g., water vapor) concentrations. The first and second gases may, in certain cases, have substantially the same vapor concentration. In some cases, the first and second gases may be maintained at different temperatures. The difference between the temperatures of the first and second gases may, in certain embodiments, be at least about 1° C., at least about 5° C., at least about 10° C., at least about 20° C., at least about 50° C., at least about 100° C., at least about 150° C., or at least about 200° C. In certain cases, the first and second gases may be maintained at substantially the same temperature.

Figure 2C:
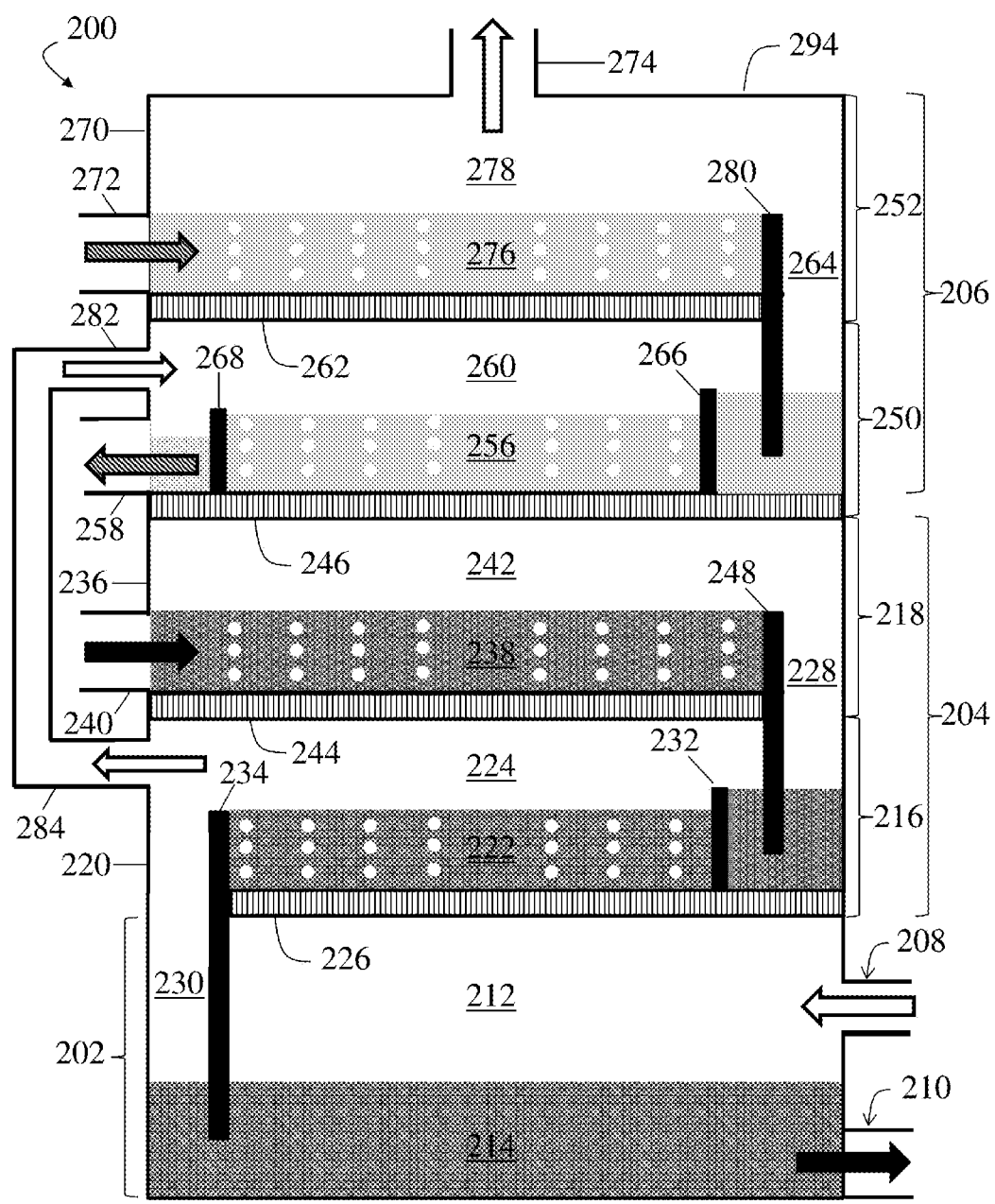
FIG. 2C shows, according to some embodiments, a schematic illustration of an exemplary desalination system comprising a vessel comprising a multi-stage humidification region, a multi-stage dehumidification region, and an intermediate gas extraction point fluidically connected to an intermediate gas injection point.

In some embodiments, the one or more additional gas inlets are fluidically connected to one or more additional gas outlets of the combined bubble column apparatus. As shown in FIG. 2C, combined bubble column apparatus 200 may further comprise optional second apparatus gas outlet 284. In some cases, second apparatus gas outlet 284 is fluidically connected to second apparatus gas inlet 282 via a gas conduit. In certain cases, second apparatus gas outlet 284 is in fluid communication with an intermediate humidification stage (e.g., not the final humidification stage). In some embodiments, second apparatus gas inlet 282 is in fluid communication with an intermediate dehumidification stage (e.g., not the first dehumidification stage).

In some cases, extraction from at least one intermediate location in the humidification region and injection into at least one intermediate location in the dehumidification region may be thermodynamically advantageous. Because the portion of a gas flow exiting the humidification region at an intermediate gas outlet (e.g., the extracted portion) has not passed through the entire humidification region, the temperature of the gas flow at the intermediate gas outlet (e.g., outlet 284) may be lower than the temperature of the gas flow at the main gas outlet of the humidification region (e.g., bubble generator 246). The locations of the intermediate extraction points (e.g., gas outlets) and/or injection points (e.g., gas inlets) may be selected to increase the thermal efficiency of the system. For example, because a gas (e.g., air) may have increased vapor content at higher temperatures than at lower temperatures, and because the specific enthalpy of a gas with higher vapor content may be higher than the specific enthalpy of a gas with lower vapor content, less gas may be used in higher temperature areas of the humidification region and/or dehumidification region to better balance the heat capacity rate ratios of the gas (e.g., air) and liquid (e.g., water) streams. Extraction and/or injection of a portion of a gas flow at intermediate locations may therefore advantageously allow for manipulation of gas mass flows and for greater heat recovery.

However, it should be recognized that in some embodiments, under certain operating conditions, intermediate extraction and/or injection may not necessarily or always increase the thermal efficiency of a combined HDH apparatus (e.g., a combined bubble column apparatus). Additionally, there may be certain drawbacks associated with extraction and/or injection at intermediate locations in some situations. For example, intermediate extraction and/or injection may reduce the condensable fluid (e.g., water) production rate of the apparatus, and there may be certain additional costs associated with intermediate extraction and/or injection (e.g., costs associated with instrumentation, ducting, insulation, and/or droplet separation). In some cases, if the temperature difference between a gas flow at an intermediate injection location in the dehumidification region and a gas flow extracted from the humidification region and injected in the intermediate injection location is too great, production rates and/or energy efficiency may be decreased. Accordingly, in some cases, it may be advantageous to build and/or operate an apparatus without intermediate extraction and/or injection.

Figure 2D:
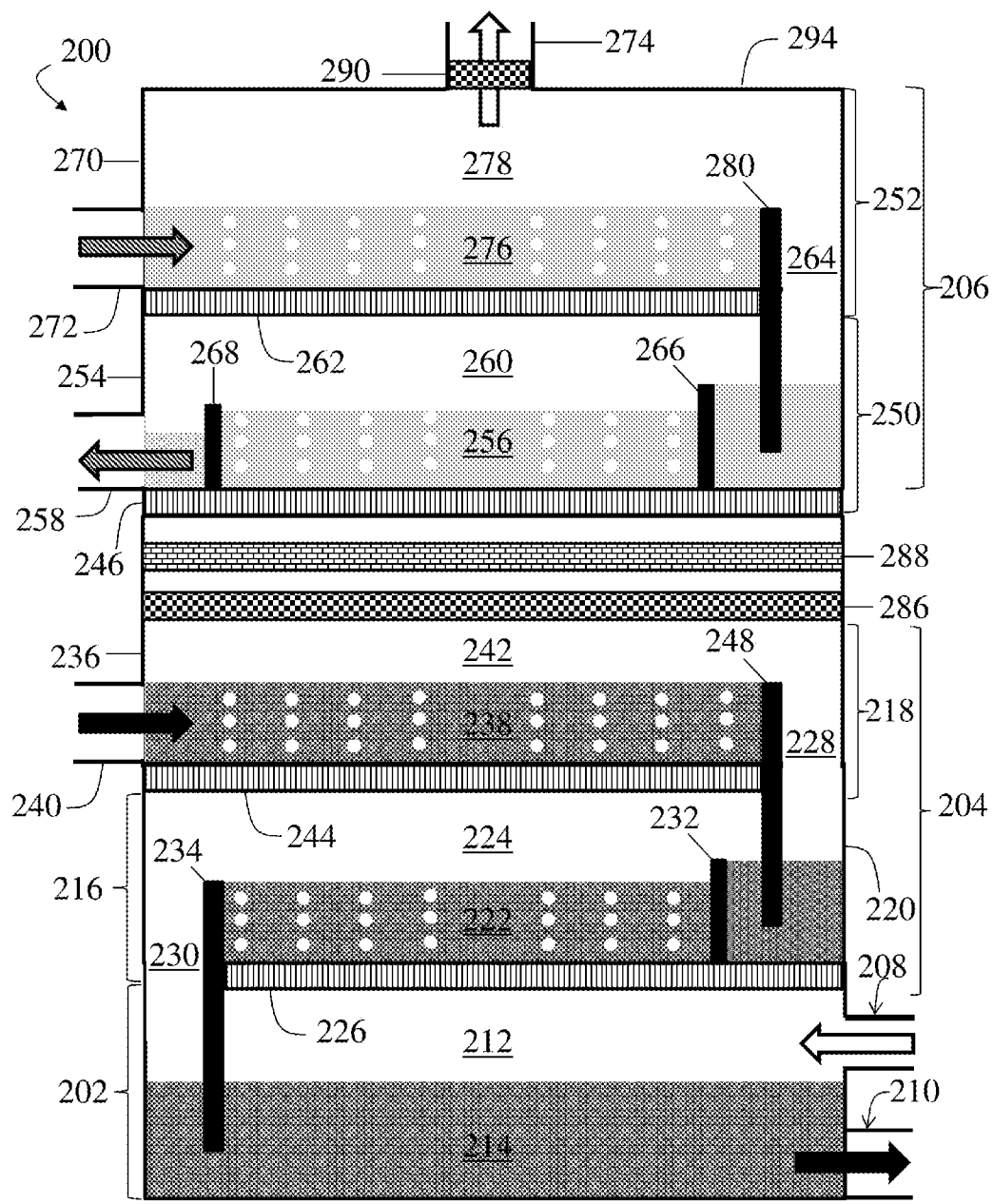
FIG. 2D shows, according to some embodiments, a schematic illustration of an exemplary desalination system comprising a vessel comprising a multi-stage humidification region, a multi-stage dehumidification region, two droplet eliminators, and a liquid collector.

In some embodiments, a combined HDH apparatus (e.g., a combined bubble column apparatus) further comprises additional components that may enhance apparatus performance. For example, in certain embodiments, the combined HDH apparatus comprises one or more optional droplet eliminators. As noted above, the presence of one or more droplet eliminators (e.g., extending across the opening of one or more gas outlets) may advantageously reduce or eliminate droplet entrainment and may thereby increase the amount of condensable fluid (e.g., substantially pure water) recovered using the combined HDH apparatus. In FIG. 2D, combined bubble column apparatus 200 comprises a first droplet eliminator 286 positioned upstream of bubble generator 246, which acts as a gas outlet of humidification region 204. As shown in FIG. 2D, combined bubble column apparatus 200 further comprises a second droplet eliminator 290 positioned across the opening of apparatus gas outlet 274, which acts as a gas outlet of dehumidification region 206.

According to some embodiments, the combined HDH apparatus (e.g., combined bubble column apparatus) further comprises an optional liquid collector. In some cases, the liquid collector is positioned between the humidification region and the dehumidification region of the vessel of the combined HDH apparatus. As noted above, the presence of a liquid collector may advantageously prevent any liquid (e.g., substantially pure water) that falls from the dehumidification region from commingling with liquid from the humidification region (e.g., salt-containing water). In FIG. 2D, combined bubble column apparatus 200 comprises a liquid collector 288 positioned between humidification region 204 and dehumidification region 206.

Figure 2E:
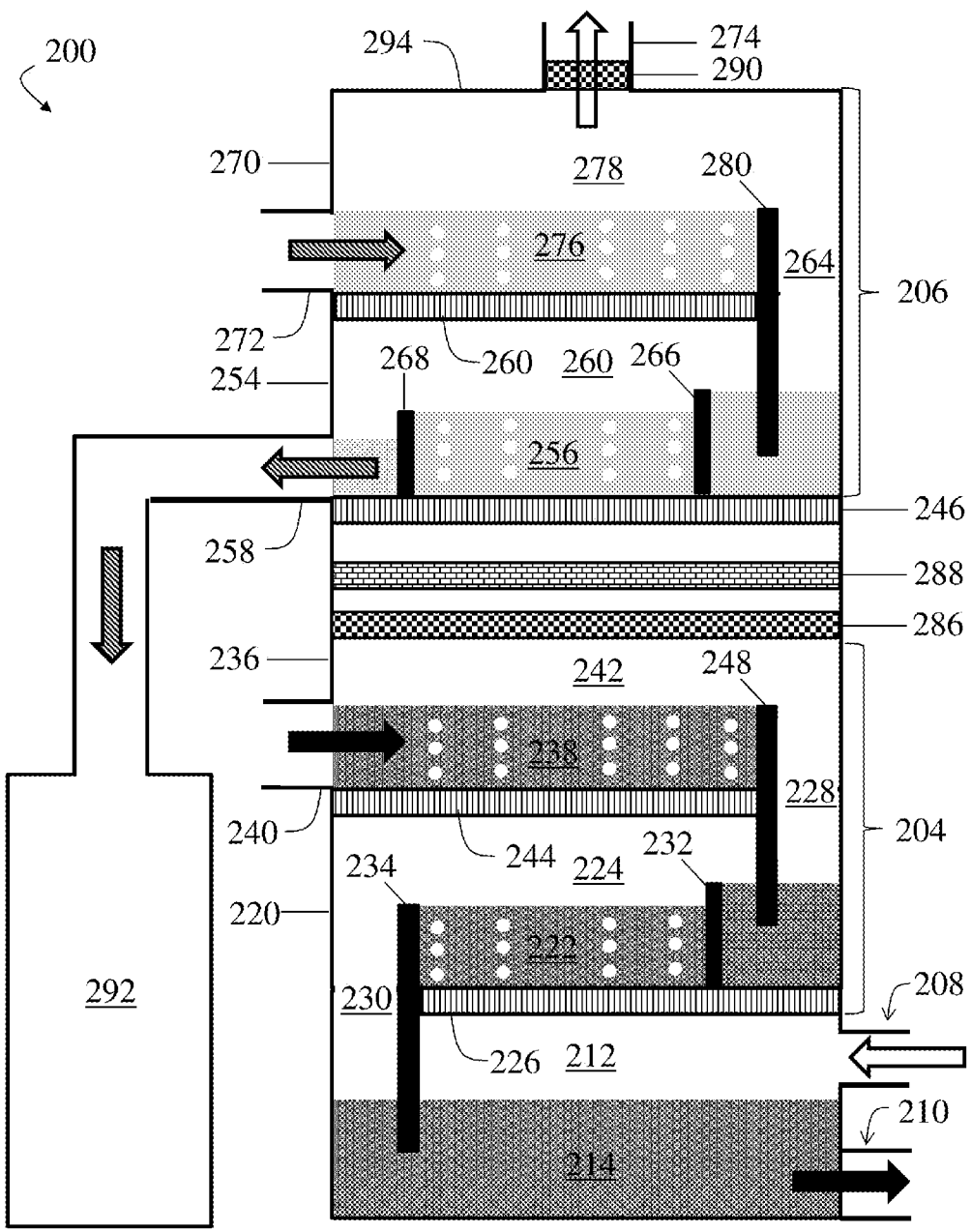
FIG. 2E shows, according to some embodiments, a schematic illustration of an exemplary desalination system comprising a vessel comprising a multi-stage humidification region, a multi-stage dehumidification region, two droplet eliminators, a liquid collector, and an external sump.

In some embodiments, the combined HDH apparatus (e.g., combined bubble column apparatus) comprises an external liquid sump. In some cases, the presence of an external liquid sump may advantageously reduce the weight of the dehumidification region and/or lower the center of mass of the combined HDH apparatus. As shown in FIG. 2E, combined bubble column apparatus 200 comprises external liquid sump 292, which is in fluid communication with dehumidification region liquid outlet 258.

While certain embodiments described above have been directed to a combined HDH apparatus (e.g., a combined bubble column apparatus) comprising a dehumidification region arranged vertically above a humidification region, with each of the humidification and dehumidification regions comprising a plurality of vertically arranged stages, the combined HDH apparatus may have any suitable structure or arrangement. For example, a humidification region and dehumidification region may be arranged vertically (e.g., the dehumidification region positioned above or below the humidification region) or horizontally (e.g., the dehumidification region positioned to the right or left of the humidification region) within a vessel of a combined HDH apparatus. In some cases, the humidification region and/or dehumidification region of the combined HDH apparatus comprise a plurality of stages that are vertically arranged or horizontally arranged. In certain embodiments, a combined HDH apparatus comprises a vessel that comprises a vertically arranged humidification region (e.g., comprising a plurality of horizontally or vertically arranged stages) and dehumidification region (e.g., comprising a plurality of horizontally or vertically arranged stages). In some embodiments, a combined HDH apparatus comprises a vessel that comprises a horizontally arranged humidification region (e.g., comprising a plurality of horizontally or vertically arranged stages) and dehumidification region (e.g., comprising a plurality of horizontally or vertically arranged stages).

Figure 3A:
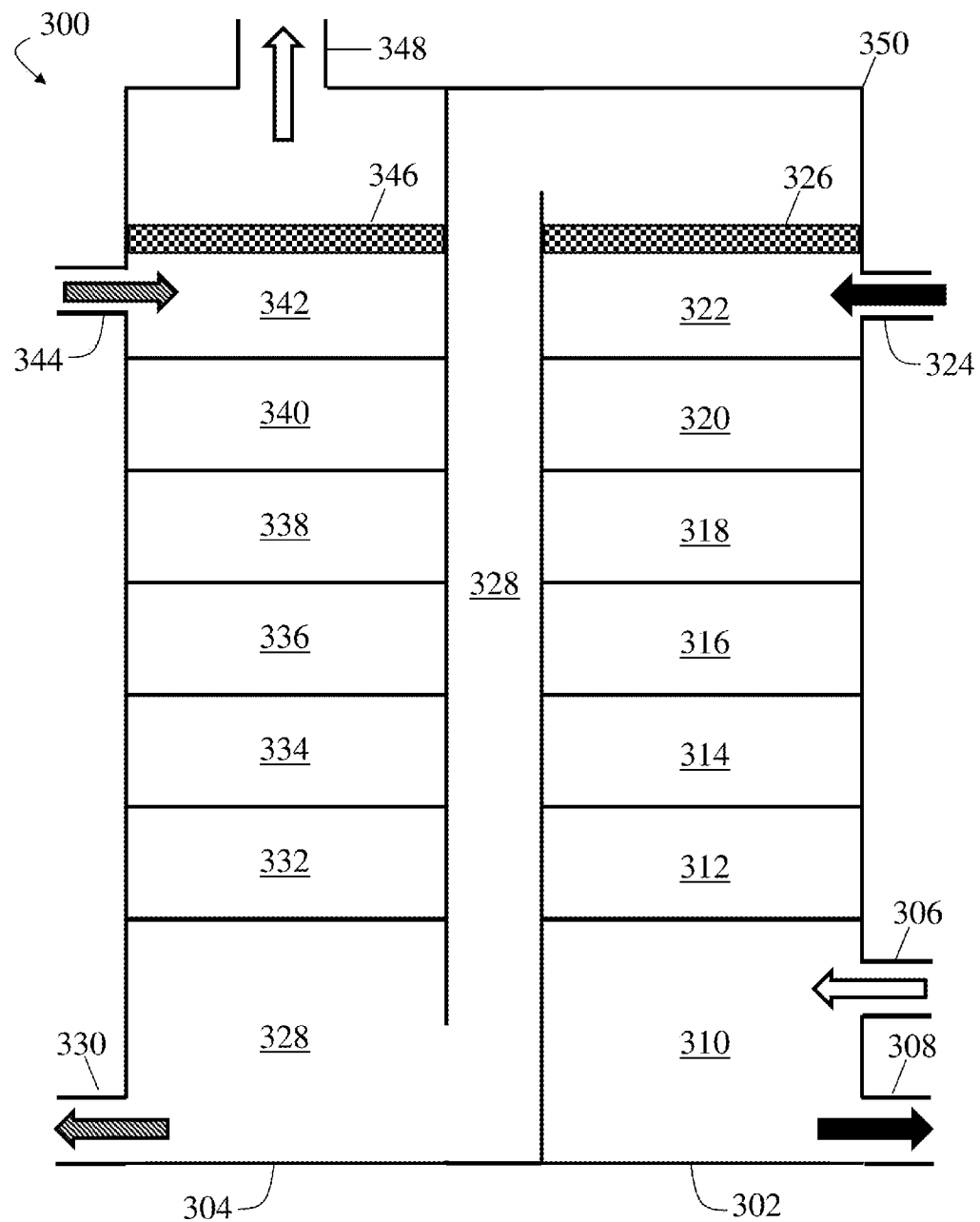
FIG. 3A shows a schematic illustration of an exemplary desalination system comprising a vessel comprising a humidification region comprising a plurality of vertically-arranged stages positioned horizontally adjacent to a dehumidification region comprising a plurality of vertically-arranged stages, according to some embodiments.

FIG. 3A shows a schematic illustration of an exemplary combined HDH apparatus (e.g., combined bubble column apparatus) comprising a vessel comprising a humidification region positioned side-by-side with a dehumidification region, according to some embodiments. In FIG. 3A, apparatus 300 comprises vessel 350 comprising humidification region 302 and dehumidification region 304 positioned to the left of humidification region 302. Humidification region 302 and dehumidification region 304 each comprise a plurality of vertically arranged stages. As shown in FIG. 3A, humidification region 302 comprises gas distribution chamber 310, first stage 312 positioned above gas distribution chamber 310, second stage 314 positioned above first stage 312, third stage 316 positioned above second stage 314, fourth stage 318 positioned above third stage 316, fifth stage 320 positioned above fourth stage 318, and sixth stage 322 positioned above fifth stage 320. Gas distribution chamber 310, which may be positioned at the bottom of humidification region 302, may be in fluid communication with apparatus gas inlet 306, humidification region liquid outlet 308, and/or first stage 312 (e.g., through a bubble generator). In some cases, gas distribution chamber 310 comprises a gas distribution region and a liquid sump volume. Sixth stage 322, which may be positioned at the top of humidification region 302, may be in fluid communication with humidification region liquid inlet 324. In addition, sixth stage 322 may be in fluid communication with gas conduit 328 connecting humidification region 302 and dehumidification region 304. In some cases, droplet eliminator 326 may be positioned between sixth stage 322 and gas conduit 328 to prevent liquid droplets from entering gas conduit 328.

Figure 3B:
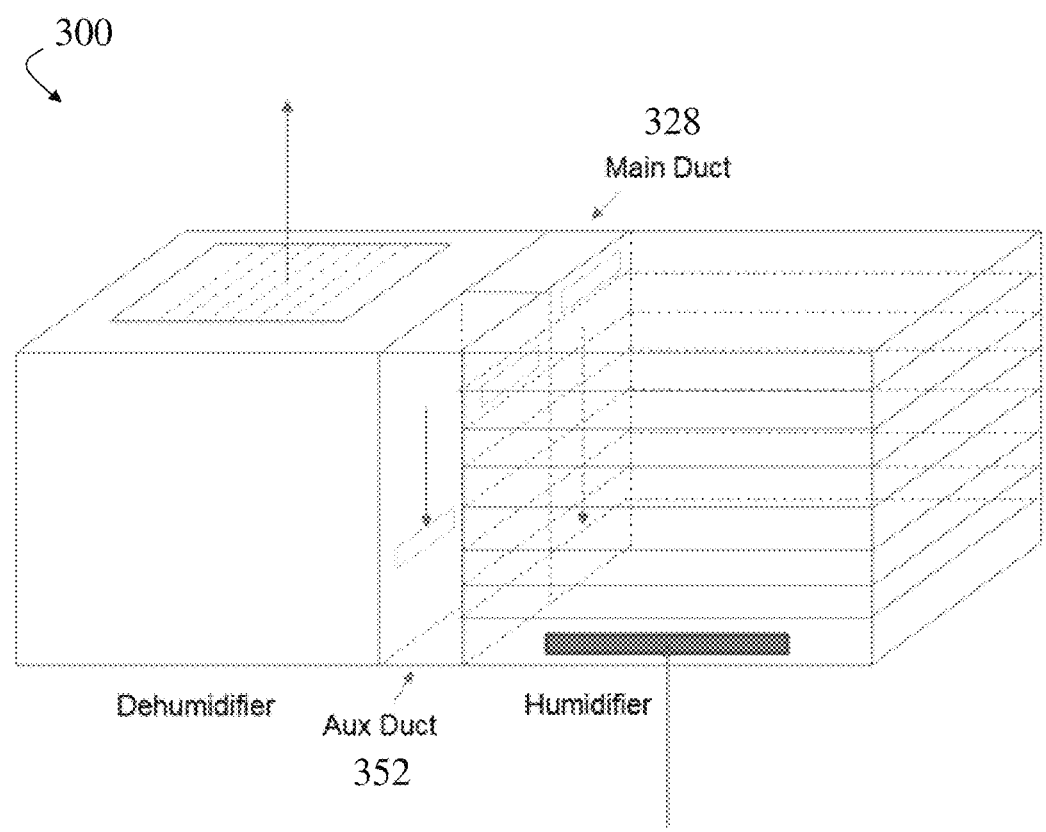
FIG. 3B shows a schematic illustration of an exemplary desalination system comprising a vessel comprising a humidification region and a dehumidification region, a main internal gas conduit fluidically connected to a main gas outlet of the humidification region and a main gas inlet of the dehumidification region, and an auxiliary internal gas conduit fluidically connected to an intermediate gas outlet of the humidification region and an intermediate gas inlet of the dehumidification region, according to some embodiments.

Gas conduit 328 may fluidically connect sixth stage 322 of humidification region 302 with gas distribution chamber 328 of dehumidification region 304. Gas conduit 328 may be seen more clearly in FIG. 3B, which shows a schematic illustration of exemplary combined HDH apparatus 300. FIG. 3B additionally illustrates optional auxiliary gas conduit 352, which may fluidically connect an intermediate stage of humidification region 302 (e.g., any one of stages 314-320) and an intermediate stage of dehumidification region 304 (e.g., any one of stages 334-340).

As shown in FIG. 3A, dehumidification region 304 comprises gas distribution chamber 328, first stage 332 positioned above gas distribution chamber 328, second stage 334 positioned above first stage 332, third stage 336 positioned above second stage 334, fourth stage 338 positioned above third stage 336, fifth stage 340 positioned above fourth stage 338, and sixth stage 342 positioned above fifth stage 340. Gas distribution chamber 328, which may be positioned at the bottom of dehumidification region 304, may be in fluid communication with dehumidification region liquid outlet 330 and/or first stage 332 (e.g., through a bubble generator). In some cases, gas distribution chamber 328 comprises a gas distribution region and a liquid sump volume. In FIG. 3A, sixth stage 342, which is positioned at the top of dehumidification region 304, is in fluid communication with dehumidification region liquid inlet 344 and apparatus gas outlet 348. In some cases, droplet eliminator 346 may be positioned between sixth stage 342 and gas outlet 348 to prevent entrainment of liquid droplets from sixth stage 342.

In operation, a gas (e.g., a non-condensable gas) may enter combined HDH apparatus 300 through apparatus gas inlet 306. The gas may travel sequentially through each of stages 312, 314, 316, 318, 320, and 322 of humidification region 302. Each stage of humidification region 302 may comprise a liquid layer comprising a condensable fluid in liquid phase and one or more contaminants (e.g., dissolved salts). As the gas flows through each stage of humidification region 302 and comes into contact with each of the liquid layers, the gas may become increasingly heated and humidified. The heated, humidified gas may then flow through droplet eliminator 326, into gas conduit 328. The heated, humidified gas may flow through gas conduit 328 to gas distribution chamber 328 of dehumidification region 304. The heated, humidified gas may subsequently flow through each of stages 332, 334, 336, 338, 340, and 342 of dehumidification region 304. Each stage of dehumidification region 304 may comprise a liquid layer comprising the condensable fluid in liquid phase. As the heated, humidified gas flows through each stage of dehumidification region 304, the heated, humidified gas may become increasingly cooled and dehumidified. The cooled, dehumidified gas may then exit vessel 350 of combined HDH apparatus 300 through apparatus gas outlet 348.

In some embodiments, two liquid streams may flow through combined HDH apparatus 300 in directions substantially opposite to the direction of the gas stream (e.g., counter-flow to the gas stream). In humidification region 302, a first liquid stream comprising a condensable fluid in liquid phase and one or more contaminants (e.g., salt-containing water) may enter sixth stage 322 of humidification region 302 (e.g., the uppermost stage of humidification region 302) through humidification region liquid inlet 324. The first liquid stream may then flow sequentially through each of stages 322, 320, 318, 316, 314, and 312 of humidification region 302. As the first liquid stream flows through each stage, the first liquid stream may encounter gas bubbles having a temperature lower than the temperature of the first liquid stream. Heat and/or mass may be transferred from the first liquid stream to the gas bubbles, resulting in a cooled first liquid stream. After flowing through each of the stages of humidification region 302, the cooled first liquid stream may flow to gas distribution chamber 310 and exit vessel 350 of apparatus 300 through humidification region liquid outlet 308.

In dehumidification region 304, a second liquid stream comprising the condensable fluid in liquid phase (e.g., substantially pure water) may enter sixth stage 342 of dehumidification region 304 through dehumidification region liquid inlet 344. The second liquid stream may then flow sequentially through each of stages 342, 340, 338, 336, 334, and 332 of dehumidification region 304. As the second liquid stream flows through each stage, the second liquid stream may encounter gas bubbles having a higher temperature than the temperature of the second liquid stream. Heat and/or mass may be transferred from the gas bubbles to the second liquid stream, resulting in a heated second liquid stream. After flowing through each of the stages of dehumidification region 304, the heated second liquid stream may flow to gas distribution chamber 328 and exit apparatus 300 through dehumidification region liquid outlet 330.

In some embodiments, a combined HDH apparatus (e.g., a combined bubble column apparatus) comprises a horizontally arranged humidification region and dehumidification region (e.g., positioned horizontally adjacent to each other). In certain cases, the horizontally arranged humidification and dehumidification regions each comprise a plurality of horizontally arranged stages. According to some embodiments, an apparatus comprising a horizontally arranged humidification region comprising a plurality of horizontally arranged stages and dehumidification region comprising a plurality of horizontally arranged stages advantageously has a lower height than an apparatus having other configurations (e.g., a vertically arranged humidification region and dehumidification region, a horizontally arranged humidification and dehumidification region where at least one of the humidification and dehumidification regions comprises a plurality of vertically arranged stages). In some embodiments, an apparatus comprising a horizontally arranged humidification region comprising a plurality of horizontally arranged stages and a dehumidification region comprising a plurality of horizontally arranged stages advantageously has a relatively small footprint. As used herein, a footprint generally refers to the surface area of a bottom surface of an apparatus (e.g., the surface in contact with the ground).

Figure 4:
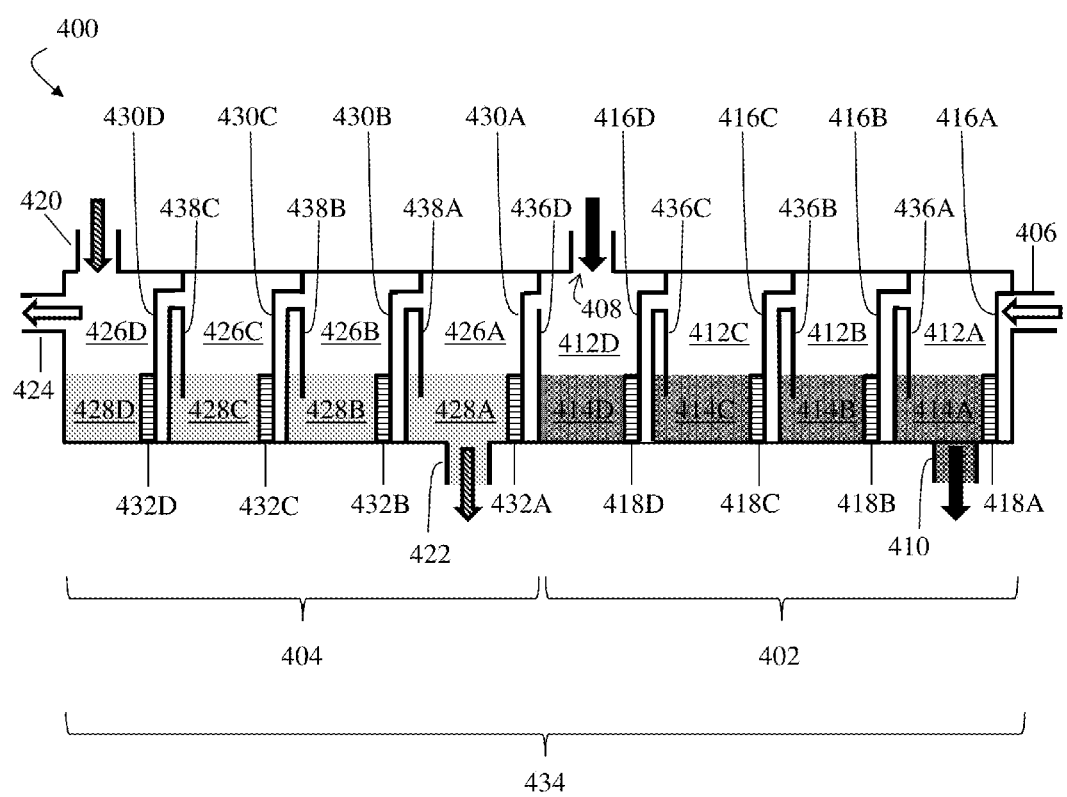
FIG. 4 shows, according to some embodiments, a schematic illustration of an exemplary desalination system comprising a vessel comprising a humidification region comprising a plurality of horizontally-arranged stages positioned horizontally adjacent to a dehumidification region comprising a plurality of horizontally-arranged stages.

FIG. 4 shows, according to some embodiments, a schematic cross-sectional illustration of an exemplary combined bubble column apparatus comprising a vessel comprising a humidification region positioned side-by-side with a dehumidification region, where both the humidification and dehumidification regions comprise horizontally arranged stages. In FIG. 4, combined bubble column apparatus 400 comprises vessel 434 comprising humidification region 402 and dehumidification region 404, which is positioned to the left of humidification region 402. As shown in FIG. 4, humidification region 402 comprises apparatus gas inlet 406, humidification region liquid inlet 408, and humidification region liquid outlet 410. In addition, humidification region 402 comprises a plurality of horizontally arranged stages 412A-D. Each of stages 412A-D comprises a chamber comprising a liquid layer (e.g., one of liquid layers 414A-D) and a vapor distribution region above the liquid layer. Additionally, each of stages 412A-D further comprises a gas conduit (e.g., one of gas conduits 416A-D), and a bubble generator fluidically connected to the gas conduit (e.g., one of bubble generators 418A-D). As shown in FIG. 4, at least a portion of the bubble generator of each stage is positioned below a top surface of the liquid layer of the stage, such that a gas flowing through the bubble generator generates gas bubbles that flow through the liquid layer of the stage. In a particular, non-limiting example, bubble generator 418A extends from a top surface of liquid layer 414A to a bottom surface of stage 412A. In certain embodiments, one or more bubble generators are positioned such that they extend across a bottom surface of a liquid layer of a stage (e.g., such that the gas flows beneath the one or more bubble generators and gas bubbles flow upwards through the liquid layers). FIG. 4 further shows that stages 412A-D are separated by a plurality of baffles 436A-C. In some embodiments, at least a portion of the baffles comprise a first end in contact with a top surface of a stage of humidification region 402 and a second end submerged in a liquid layer of the stage. In some cases, one or more gas conduits traverse one or more baffles. For example, in FIG. 4, each of gas conduits 416B-D traverses (e.g., passes through) one of baffles 436A-C (e.g., gas conduit 416B traverses baffle 436A, gas conduit 416C traverses baffle 436B, gas conduit 416D traverses baffle 436C). The baffles thus may prevent a gas flowing through humidification region 402 from bypassing gas conduits 416A-D and bubble generators 418A-D. In FIG. 4, baffle 436D, which is traversed by gas conduit 430A, separates humidification region 402 from dehumidification region 404.

In FIG. 4, dehumidification region 404 comprises dehumidification region liquid inlet 420, dehumidification region liquid outlet 422, and apparatus gas outlet 424. In addition, dehumidification region 404 comprises a plurality of horizontally arranged stages 426A-D. Each of stages 426A-D comprises a chamber comprising a liquid layer (e.g., one of liquid layers 428A-D) and a vapor distribution region above the liquid layer. Each of stages 426A-D also comprises a gas conduit (e.g., one of gas conduits 430A-D) and a bubble generator fluidically connected to the gas conduit (e.g., one of bubble generators 432A-D). As in stages 412A-D, in each of stages 426A-D, at least a portion of the bubble generator of the stage is positioned below a top surface of the liquid layer of the stage. In certain embodiments, one or more bubble generators are positioned such that they extend across a bottom surface of a liquid layer of a stage (e.g., such that the gas flows beneath the one or more bubble generators and gas bubbles flow upwards through the liquid layers). As shown in FIG. 4, stages 426A-D are separated by a plurality of baffles 438A-C. In some embodiments, at least a portion of the baffles comprise a first end in contact with a top surface of a stage of dehumidification region 404 and a second end submerged in a liquid layer of the stage (e.g., the baffle may extend at least from a top surface of a stage to a top surface of the liquid layer of the stage). In some cases, one or more gas conduits traverse one or more baffles. For example, in FIG. 4, each of gas conduits 430B-D traverses one of baffles 438A-C (e.g., gas conduit 430B traverses baffle 438A, gas conduit 430C traverses baffle 438B, gas conduit 430D traverses baffle 438C). Baffles 438A-C of dehumidification region 404 thus may prevent a gas flowing through dehumidification region 404 from bypassing gas conduits 430A-D and bubble generators 432A-D.

In operation, a stream comprising a gas (e.g., a non-condensable gas) may flow through apparatus 400 in a first direction, and one or more liquid streams may flow through apparatus 400 in a second, substantially opposite direction. For example, as shown in FIG. 4, a gas stream may flow from right to left through apparatus 400, while a first liquid stream comprising a condensable fluid in liquid phase and one or more contaminants (e.g., salt-containing water) may flow from left to right through humidification region 402 and a second liquid stream comprising the condensable fluid in liquid phase (e.g., substantially pure water) may flow from left to right through dehumidification region 404. In FIG. 4, the gas stream enters vessel 434 of apparatus 400 through apparatus gas inlet 406. The gas stream may enter first stage 412A of humidification region 402, flowing through gas conduit 416A to bubble generator 418A and forming a plurality of gas bubbles. The gas bubbles may subsequently travel through liquid layer 414A, which may have a higher temperature than the gas bubbles. In liquid layer 414A, heat and mass may be transferred from liquid layer 414A to the gas bubbles to produce heated, at least partially humidified gas bubbles. After traveling through liquid layer 414A, the gas bubbles may recombine in the vapor distribution region of first stage 412A positioned above liquid layer 414, substantially evenly distributing throughout the vapor distribution region. The heated, at least partially humidified gas stream may then enter second stage 412B, flowing through gas conduit 416B to bubble generator 418B. The gas stream may continue to flow from right to left through humidification region 402, becoming increasingly heated and humidified as it flows through each stage of humidification region 402.

After flowing through each of stages 412A-D of humidification region 402, the heated, humidified gas stream may enter first stage 426A of dehumidification region 404, flowing through gas conduit 430A to bubble generator 432A. Bubbles of the heated, humidified gas may be formed and may travel through liquid layer 428A, which may have a lower temperature than the heated, humidified gas bubbles. In liquid layer 428A, heat and mass may be transferred from the heated, humidified gas bubbles to liquid layer 428A. The cooled, at least partially dehumidified gas bubbles may then recombine in the vapor distribution region of first stage 426A, and the cooled, at least partially dehumidified gas stream may flow through gas conduit 430B to bubble generator 432B of second stage 426B. The cooled, at least partially dehumidified gas stream may continue to flow from right to left through dehumidification region 404, becoming increasingly cooled and dehumidified as it flows through each stage of dehumidification region 404.

While the gas stream flows from right to left through apparatus 400, the first liquid stream comprising a condensable fluid in liquid phase and one or more contaminants (e.g., salt-containing water) may flow from left to right through humidification region 402. As shown in FIG. 4, the first liquid stream may enter humidification region 402 through humidification region liquid inlet 408, forming at least a portion of liquid layer 414D of fourth stage 412D. In fourth stage 412D, heat and mass may be transferred from the first liquid stream in liquid layer 414D to bubbles of the gas stream formed by bubble generator 418D, and the first liquid stream may be cooled. In addition, due to condensable fluid (e.g., water vapor) being transferred from the first liquid stream to the bubbles of the gas stream, the first liquid stream may become more concentrated (e.g., the concentration of one or more contaminants may increase). As the first liquid stream flows through each of stages 412C, 412B, and 412A of humidification region 402, the temperature of the first liquid stream may decrease, and the concentration of one or more contaminants in the stream may increase. The cooled, concentrated liquid stream may then exit vessel 434 of apparatus 400 through humidification region liquid outlet 410.

The second liquid stream comprising the condensable fluid in liquid phase (e.g., substantially pure water) may also flow through vessel 434 of apparatus 400, flowing from left to right through dehumidification region 404. In FIG. 4, the second liquid stream enters dehumidification region 404 through dehumidification region water inlet 420, forming at least a portion of liquid layer 428D of fourth stage 426D. In fourth stage 426D, heat and mass may be transferred from heated, humidified gas bubbles to the second liquid stream. Accordingly, as the second liquid stream flows through each of stages 426D, 426C, 426B, and 426A of dehumidification region 404, the temperature of the second liquid stream may increase, and the volume of the second liquid stream may also increase. The heated second liquid stream may then exit vessel 434 of apparatus 400 through dehumidification region liquid outlet 422.

Although certain embodiments of the combined HDH apparatus (e.g., combined bubble column apparatus) described above comprise a humidification region positioned to the right of a dehumidification region, with a gas stream flowing from right to left and a plurality of liquid streams flowing from left to right, it should be recognized that other configurations and other flow directions are also possible. For example, in an apparatus comprising a horizontally arranged humidification region and dehumidification region, the humidification region may be positioned to the right of the dehumidification region. In some cases, a gas stream may flow from left to right, and one or more liquid streams may flow from right to left.

According to some embodiments, the combined HDH apparatus (e.g., combined bubble column apparatus) is substantially continuously operated and/or configured to facilitate substantially continuous operation. As used herein, a continuously-operated HDH apparatus (e.g., bubble column apparatus) refers to an apparatus in which a liquid feed stream is fed to the apparatus at the same rate that a desalinated liquid stream is produced by the apparatus. In some cases, one or more liquid streams may be in substantially continuous motion. For example, for bubble column HDH systems, a liquid feed stream (e.g., a salt-containing water stream) may be fed to the combined bubble column apparatus, substantially continuously flow through one or more stages of the humidification region and/or dehumidification region of the apparatus, and result in a desalinated liquid stream (e.g., a substantially pure water stream) subsequently being discharged from the apparatus. In some cases, a continuously-operated apparatus may be associated with certain advantages, including, but not limited to, increased uptime and/or enhanced energy performance.

In some embodiments, the combined HDH apparatus (e.g., combined bubble column apparatus) is substantially transiently operated and/or configured to facilitate substantially transient operation (e.g., batch processing). As used herein, a transiently-operated HDH apparatus refers to an apparatus in which an amount of liquid (e.g., salt-containing water) is introduced into the apparatus and remains in the apparatus until a certain condition (e.g., a certain salinity, a certain density) is reached. Upon satisfaction of the condition, the liquid is discharged from the apparatus. In certain cases, transient operation may allow cleaning operations to be interspersed with production operations. For example, transient operation may be advantageous for systems comprising filter presses, bioreactors, and/or other systems that may require periodic cleaning. In some cases, transient operation may advantageously facilitate processing of highly viscous liquids (e.g., sugar-containing feedstock) that may be difficult to pump.

Figure 5:
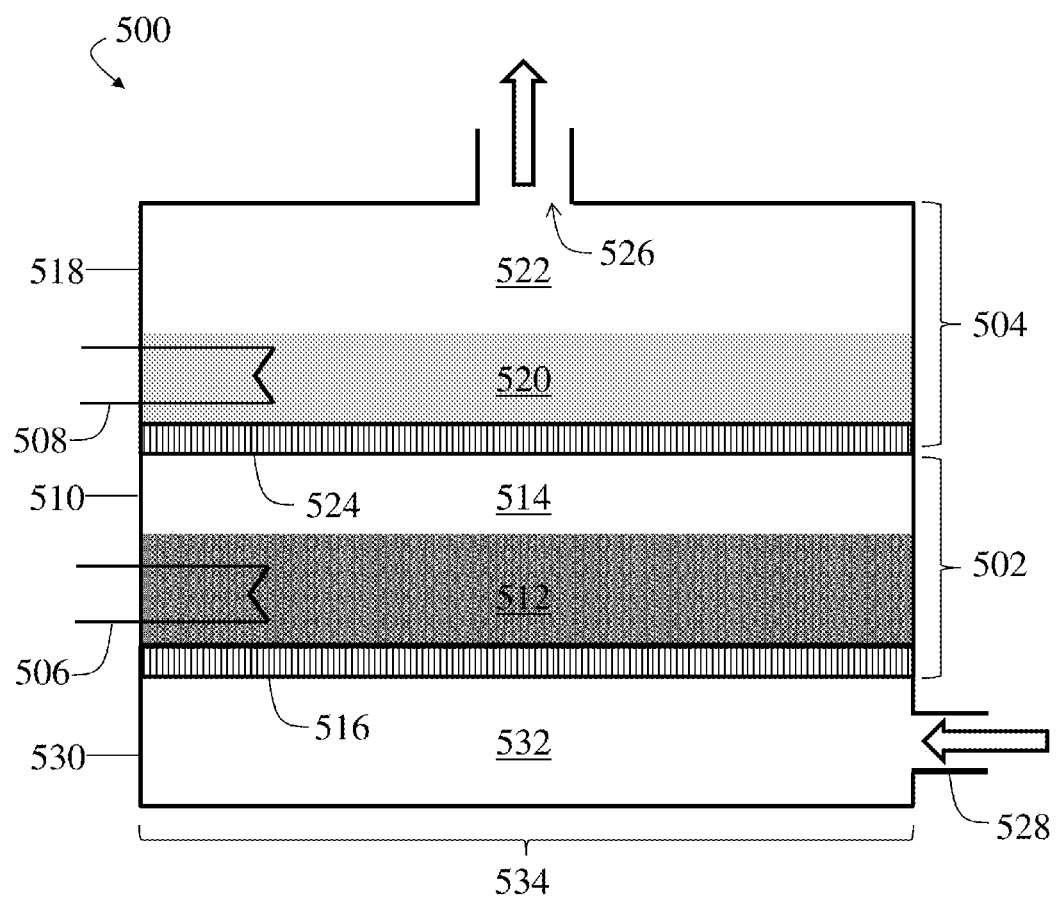
FIG. 5 shows a schematic illustration of an exemplary desalination system configured for batch processing, according to some embodiments.

FIG. 5 shows a schematic illustration of an exemplary bubble column apparatus configured for transient operation, according to some embodiments. In FIG. 5, combined bubble column apparatus 500 comprises vessel 534 comprising humidification region 502 and dehumidification region 504. Humidification region 502 comprises humidification chamber 510, which is partially occupied by liquid layer 512. In some embodiments, vapor distribution region 514 occupies at least a portion of humidification chamber 510 that is not occupied by liquid layer 512. According to some embodiments, liquid layer 512 comprises a condensable fluid in liquid phase and one or more contaminants (e.g., salt-containing water). In some cases, liquid layer 512 is in contact (e.g., direct contact) with heating element 506. Heating element 506 may be any type of device configured to transfer heat to a liquid, such as the liquid of liquid layer 512. Non-limiting examples of suitable heating elements include an electric heater (e.g., an electric immersion heater), a heat exchanger (e.g., any type of heat exchanger described herein), and/or a heat pump. In certain embodiments, the heating element is a heat exchanger fluidically connected to a heat source. Examples of suitable heat sources include, but are not limited to, a hot water boiler (e.g., a gas-fired hot water boiler), waste heat from an industrial process (e.g., power generation), solar energy, and/or a cooling element of one or more dehumidification regions. Dehumidification region 504, which is fluidically connected to humidification region 502 through bubble generator 524 and to apparatus gas outlet 526, comprises dehumidification chamber 518, which is partially occupied by liquid layer 520. In some embodiments, vapor distribution region 522 occupies at least a portion of dehumidification chamber 518 that is not occupied by liquid layer 520. In some cases, liquid layer 520 comprises a condensable fluid in liquid phase (e.g., substantially pure water). Liquid layer 520 may be in contact (e.g., direct contact) with cooling element 508. Cooling element 508 may be any type of device configured to remove heat from a liquid, such as the liquid of liquid layer 520. Non-limiting examples of suitable cooling elements include an electric chiller, a heat exchanger (e.g., any heat exchanger described herein), and/or a heat pump. In certain embodiments, the cooling element is a heat exchanger fluidically connected to a cold source. Examples of suitable cold sources include, but are not limited to, air (e.g., for an air-cooled heat exchanger), temperature stratification in a body of water, and/or a ground-coupled heat exchanger (e.g., with or without a heat pump). As shown in FIG. 5, vessel 534 of apparatus 500 further comprises gas distribution chamber 530, which is fluidically connected to apparatus gas inlet 528 and is also fluidically connected to humidification region 502 through bubble generator 516. Gas distribution chamber 530 comprises gas distribution region 532 (e.g., the space within chamber 530 throughout which a gas may be distributed). In certain embodiments, apparatus gas outlet 526 is fluidically connected to apparatus gas inlet 528 through a gas conduit (e.g., duct) (not shown in FIG. 5). According to certain embodiments, a single device may act as both a heating element (e.g., heating element 506) of a humidification region and a cooling element (e.g., cooling element 508) of a dehumidification region. For example, in some cases, a heat pump may act as both a heating element and a cooling element. In a particular, non-limiting example, both the heating element and the cooling element are heat exchangers. In some cases, an intermediate fluid may transfer heat between the heating element and the cooling element.

In operation, an amount of liquid comprising the condensable fluid in liquid phase and one or more contaminants (e.g., salt-containing water) may be introduced into humidification region 502 of combined bubble column apparatus 500, forming liquid layer 512. In some cases, an amount of the condensable fluid in liquid phase (e.g., substantially pure water) may also be introduced into dehumidification region 504 of apparatus 500, forming liquid layer 520.

A gas (e.g., a non-condensable gas) may then enter apparatus 500 through apparatus gas inlet 528. The gas may flow through gas distribution chamber 530, where the gas may be substantially homogeneously distributed throughout gas distribution region 532 of chamber 530, along the bottom surface of bubble generator 516. The gas may flow through bubble generator 516, generating bubbles that travel through liquid layer 512. As the gas bubbles flow through liquid layer 512, heat and mass may be transferred from liquid layer 512 to the gas bubbles through an evaporation process, producing heated, humidified gas bubbles. Heating element 506, which is in contact (e.g., direct contact) with liquid layer 512, may replace thermal energy that is lost from liquid layer 512 in the form of latent and sensible heat. The heated, humidified gas bubbles may recombine in vapor distribution region 514 of humidification chamber 510 and flow through bubble generator 524, generating heated, humidified gas bubbles that travel through liquid layer 520 in dehumidification region 504. As the heated, humidified gas bubbles travel through liquid layer 520 in dehumidification region 504, heat and mass (e.g., condensable fluid in liquid phase) may be transferred from the heated, humidified gas bubbles to liquid layer 520, which has a lower temperature than the gas bubbles, through a condensation process. Cooling element 508, which is in contact (e.g., direct contact) with liquid layer 520, may remove thermal energy from liquid layer 520 to prevent or mitigate an increase in the temperature of liquid layer 520. The bubbles of the at least partially dehumidified gas may recombine in vapor distribution region 522 of chamber 518 of dehumidification region 504 and exit vessel 534 of apparatus 500 through gas outlet 526.

The gas may continue to flow through vessel 534 of apparatus 500, transferring amounts of condensable fluid from liquid layer 512 of humidification region 502 to liquid layer 520 of dehumidification region 504, until a certain condition is reached (e.g., the liquid of liquid layer 512 reaches a certain salinity and/or density, liquid layer 520 reaches a certain volume, etc.). In some cases, substantially no liquid is added to or removed from liquid layer 512 and/or 520 (other than through the gas stream) until the condition is satisfied. In certain embodiments, at least a portion of liquid layer 520 is removed from apparatus 500 prior to satisfaction of the condition (e.g., to prevent the volume of liquid layer 520 from exceeding the volume of chamber 518). Upon satisfaction of the condition (e.g., termination of the batch process), the liquid of liquid layer 512 and/or the liquid of liquid layer 520 may be discharged from apparatus 500.

In some embodiments, one or more stages of a humidification region and/or dehumidification region of a combined HDH apparatus (e.g., a combined bubble column apparatus) have certain advantageous characteristics. Some of these characteristics may relate to the liquid layers of one or more stages of the humidification region and/or dehumidification region. For example, in some cases, one or more stages may comprise liquid layers having relatively low heights.

As noted above, one or more stages of a humidification region or dehumidification region may comprise a liquid layer. In some cases, the composition of a liquid layer in a stage of the humidification region may be different from the composition of a liquid layer in a stage of the dehumidification region. For example, in the humidification region, the liquid layer may comprise a liquid comprising a condensable fluid in liquid phase and one or more contaminants (e.g., dissolved salts). In some embodiments, the liquid layer of the humidification stage comprises salt-containing water (e.g., brine). In some embodiments, the liquid layer of the humidification stage comprises seawater, brackish water, water produced form an oil and/or gas extraction process, flowback water, and/or wastewater (e.g., industrial wastewater). In the dehumidification region, the liquid layer may comprise the condensable fluid in liquid phase (e.g., water). In certain embodiments, the liquid layer of the dehumidification stage comprises the condensable fluid in liquid phase in substantially purified form (e.g., having a relatively low level of contaminants). According to some embodiments, the liquid layer of the dehumidification stage comprises substantially pure water.

In some embodiments, the height of the liquid layer in one or more stages of the humidification region and/or dehumidification region is relatively low during operation of the combined HDH apparatus (e.g., substantially continuous operation and/or substantially transient operation). In some cases, the height of the liquid layer within a stage can be measured vertically from the surface of the bubble generator that contacts the liquid layer to the top surface of the liquid layer.

Having a relatively low liquid layer height in at least one stage may, in some embodiments, advantageously result in a relatively low pressure drop between the inlet and outlet of an individual stage. Without wishing to be bound by a particular theory, the pressure drop across a given stage of the humidification region or dehumidification region may be due, at least in part, to the hydrostatic head of the liquid in the stage that the gas has to overcome. Therefore, the height of the liquid layer in a stage may be advantageously kept low to reduce the pressure drop across that stage.

In addition, a relatively low liquid layer height may enhance heat and/or mass transfer. Without wishing to be bound by a particular theory, in both the humidification region and the dehumidification region, the theoretical maximum amount of heat and/or mass transfer may occur under conditions where the gas reaches the same temperature as the liquid and the amount of vapor in the gas is exactly at the saturation concentration. The total area available via the gas-liquid interface at the bubble surfaces and the residence time of the bubble in the liquid, which is determined by the liquid layer height in each stage (although above a minimum liquid layer height the performance is unaffected), may determine how close the heat and/or mass transfer gets to the aforementioned theoretical maximum. Therefore, it may be advantageous to maintain the liquid layer height at the minimum required to operate the system without affecting performance. In some cases, the liquid layer height is maintained at a height lower than the minimum height to reduce the energy associated with moving air through the system. Although hydrostatic head generally varies linearly with respect to liquid layer height, heat and/or mass transfer efficiency may vary exponentially. It has been discovered in the context of this invention that conditions in a bubble column humidification region and/or dehumidification region may approach the maximum amount of heat and/or mass transfer at a liquid layer height of about 1-2 inches.

In some embodiments, during operation of the combined HDH apparatus (e.g., substantially continuous operation and/or substantially transient operation), the liquid layer within at least one stage of the humidification region and/or dehumidification region has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the combined HDH apparatus, the liquid layer within at least one stage of the humidification region and/or dehumidification region has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m. In some embodiments, during operation of the combined HDH apparatus (e.g., substantially continuous operation and/or substantially transient operation), the liquid layer within each stage of the humidification region and/or dehumidification region has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the combined HDH apparatus, the liquid layer within each stage of the humidification region and/or dehumidification region has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In certain embodiments, the ratio of the height of the liquid layer in a stage of the humidification region or dehumidification region to the length of the stage may be relatively low. The length of the stage generally refers to the largest internal cross-sectional dimension of the stage. In some embodiments, the ratio of the height of the liquid layer within at least one stage of the humidification region and/or dehumidification region during operation of the combined HDH apparatus (e.g., substantially continuous operation and/or substantially transient operation) to the length of the at least one stage is about 1.0 or less, about 0.8 or less, about 0.6 or less, about 0.5 or less, about 0.4 or less, about 0.2 or less, about 0.18 or less, about 0.16 or less, about 0.15 or less, about 0.14 or less, about 0.12 or less, about 0.1 or less, about 0.08 or less, about 0.06 or less, about 0.05 or less, about 0.04 or less, about 0.02 or less, about 0.01 or less, or, in some cases, about 0.005 or less. In some embodiments, the ratio of the height of the liquid layer within at least one stage of the humidification region and/or dehumidification region during operation of the combined HDH apparatus to the length of the at least one stage is in the range of about 0.005 to about 1.0, about 0.005 to about 0.8, about 0.005 to about 0.6, about 0.005 to about 0.5, about 0.005 to about 0.4, about 0.005 to about 0.2, about 0.005 to about 0.18, about 0.005 to about 0.16, about 0.005 to about 0.15, about 0.005 to about 0.14, about 0.005 to about 0.12, about 0.005 to about 0.1, about 0.005 to about 0.08, about 0.005 to about 0.06, about 0.005 to about 0.05, about 0.005 to about 0.04, about 0.005 to about 0.02, or about 0.005 to about 0.01. In some embodiments, the ratio of the height of the liquid layer within each stage of the humidification region and/or dehumidification region during operation of the combined HDH apparatus (e.g., substantially continuous operation and/or substantially transient operation) to the length of each corresponding stage is about 1.0 or less, about 0.8 or less, about 0.6 or less, about 0.5 or less, about 0.4 or less, about 0.2 or less, about 0.18 or less, about 0.16 or less, about 0.15 or less, about 0.14 or less, about 0.12 or less, about 0.1 or less, about 0.08 or less, about 0.06 or less, about 0.05 or less, about 0.04 or less, about 0.02 or less, about 0.01 or less, or, in some cases, about 0.005 or less. In certain embodiments, the ratio of the height of the liquid layer within each stage of the humidification region and/or dehumidification region during operation of the combined HDH apparatus to the length of each corresponding stage is in the range of about 0.005 to about 1.0, about 0.005 to about 0.8, about 0.005 to about 0.6, about 0.005 to about 0.5, about 0.005 to about 0.4, about 0.005 to about 0.2, about 0.005 to about 0.18, about 0.005 to about 0.16, about 0.005 to about 0.15, about 0.005 to about 0.14, about 0.005 to about 0.12, about 0.005 to about 0.1, about 0.005 to about 0.08, about 0.005 to about 0.06, about 0.005 to about 0.05, about 0.005 to about 0.04, about 0.005 to about 0.02, or about 0.005 to about 0.01.

In some embodiments, the height of an individual stage within the humidification region and/or dehumidification region (e.g., measured vertically from the bubble generator positioned at the bottom of the stage to the top of the chamber within the stage) may be relatively low. As noted above, reducing the height of one or more stages may potentially reduce costs and/or potentially increase heat and mass transfer within the system. In some embodiments, the height of at least one stage of the humidification region and/or dehumidification region is about 0.5 m or less, about 0.4 m or less, about 0.3 m or less, about 0.2 m or less, about 0.1 m or less, or, in some cases, about 0.05 m or less. In certain cases, the height of at least one stage of the humidification region and/or dehumidification region is in the range of about 0 m to about 0.5 m, about 0 m to about 0.4 m, about 0 m to about 0.3 m, about 0 m to about 0.2 m, about 0 m to about 0.1 m, about 0 m to about 0.05 m, about 0.05 m to about 0.5 m, about 0.05 m to about 0.4 m, about 0.05 m to about 0.3 m, about 0.05 m to about 0.2 m, or about 0.05 m to about 0.1 m. In some embodiments, the height of each stage of the humidification region and/or dehumidification region is about 0.5 m or less, about 0.4 m or less, about 0.3 m or less, about 0.2 m or less, about 0.1 m or less, or, in some cases, about 0.05 m or less. In certain cases, the height of each stage of the humidification region and/or dehumidification region is in the range of about 0 m to about 0.5 m, about 0 m to about 0.4 m, about 0 m to about 0.3 m, about 0 m to about 0.2 m, about 0 m to about 0.1 m, about 0 m to about 0.05 m, about 0.05 m to about 0.5 m, about 0.05 m to about 0.4 m, about 0.05 m to about 0.3 m, about 0.05 m to about 0.2 m, or about 0.05 m to about 0.1 m.

In some embodiments, the pressure drop across a stage (i.e. the difference between inlet gas pressure and outlet gas pressure) for at least one stage is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, or about 1 kPa or less. In certain cases, the pressure drop across at least one stage is in the range of about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. In some embodiments, the pressure drop across at least one stage of the humidification region and/or dehumidification region is substantially zero. In certain cases, the pressure drop across each stage of the humidification region and/or dehumidification region is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, or about 1 kPa or less. In certain embodiments, the pressure drop across each stage of the humidification region and/or dehumidification region is in the range of about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. According to certain embodiments, the pressure drop across each stage of the humidification region and/or dehumidification region is substantially zero.

The stage of a humidification region or dehumidification region of a combined HDH apparatus (e.g., a combined bubble column apparatus) may have any shape suitable for a particular application. In some embodiments, at least one stage of a humidification region and/or dehumidification region has a cross-sectional shape that is substantially circular, substantially elliptical, substantially square, substantially rectangular, substantially triangular, or irregularly shaped. In some embodiments, at least one stage of a humidification region and/or dehumidification region has a relatively large aspect ratio. As used herein, the aspect ratio of a stage refers to the ratio of the length of the stage to the width of the stage. The length of the stage may refer to the largest internal cross-sectional dimension of the stage (e.g., in a plane perpendicular to a vertical axis of the stage), and the width of the stage may refer to the largest cross-sectional dimension of the stage (e.g., in a plane perpendicular to a vertical axis of the stage) measured perpendicular to the length.

In some embodiments, at least one stage of a humidification region and/or dehumidification region of a combined HDH apparatus (e.g., a combined bubble column apparatus) has an aspect ratio of at least about 1.5, at least about 2, at least about 5, at least about 10, at least about 15, or at least about 20. In some embodiments, at least one stage of a humidification region and/or dehumidification region has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20. In some embodiments, each stage of a humidification region and/or dehumidification region of a combined HDH apparatus has an aspect ratio of at least about 1.5, at least about 2, at least about 5, at least about 10, at least about 15, or at least about 20. In some embodiments, each stage of a humidification region and/or dehumidification region of a combined HDH apparatus has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20.

In some embodiments, one or more weirs in one or more stages of a humidification region and/or dehumidification region of a combined HDH apparatus (e.g., a combined bubble column apparatus) are positioned within a chamber of the stage so as to control or direct flow of a liquid (e.g., within one stage and/or between two or more stages).

In some embodiments, the maximum height of a liquid layer in one or more stages of a humidification region and/or dehumidification region may be set by one or more weirs. As used herein, a weir refers to a structure that obstructs liquid flow in a stage. In some cases, a weir may be positioned adjacent or surrounding a region of the chamber where liquid may flow out of the chamber, for example, into a different chamber below. For example, if a weir is positioned upstream of a liquid outlet, any additional liquid that would cause the height of a liquid layer to exceed the height of the weir would flow over the weir and exit the stage through the liquid outlet.

In some embodiments, one or more weirs create a pool of liquid surrounding an outlet of a liquid conduit between two stages. In some embodiments, a weir is positioned adjacent or surrounding a region of the stage that receives a stream of liquid from, for example, a different chamber above the region or adjacent to the region. For example, a first stage may be positioned vertically below a second stage, and the liquid outlet of the second stage may be a downcomer that feeds into the first stage. A weir may be positioned immediately downstream of the downcomer, such that the weir either encircles the downcomer or extends all the way to the walls of the chamber to create a pool in which the outlet of the downcomer is submerged. The pool may prevent air from entering the downcomer. In some cases, the height of the pool is greater than the height of the liquid layer in the first stage (e.g., the height of the weir is greater than the height of the liquid layer in the first stage). Otherwise, the hydrostatic head for air sparging through the liquid layer in the first stage would be greater than the hydrostatic head required for air to flow up the downcomer. Accordingly, a pool height greater than the height of the liquid layer in the first stage may advantageously prevent air from flowing up the downcomer. In some embodiments, as additional liquid is introduced into the pool and the height of the liquid in the pool exceeds the height of the weir, excess liquid may flow over the top of the weir (e.g., into the liquid layer of the first stage). In certain embodiments, the distance (e.g., vertical distance) between the top of a weir creating a pool encircling a downcomer and the bottom of an outlet of the downcomer is greater than the height of the liquid layer in the second stage. In some cases, this may advantageously prevent back flow through the downcomer.

In some cases, a weir may be positioned within a chamber so as to not contact one or more walls of the chamber. In some cases, a weir may be positioned within a chamber so as to contact one or more walls of the chamber.

The one or more weirs may be selected to have a height that is less than the height of the chamber. In some embodiments, the height of the weirs may determine the maximum height for a liquid layer in the chamber. For example, if a liquid layer residing in a first chamber reaches a height that exceeds the height of a weir positioned along a bottom surface of the chamber, then at least a portion of the excess liquid may flow over the weir. In some cases, the excess liquid may flow into a second, adjacent chamber, e.g., a chamber positioned below the first chamber. In some embodiments, at least one weir in a chamber has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, at least one weir in a chamber has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m. In some embodiments, each weir in a chamber has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, each weir in a chamber has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In some embodiments, one or more weirs may be positioned to promote the flow of a liquid across the length of the chamber in a substantially linear path. For example, the chamber may be selected to have a cross-sectional shape having a length that is greater than its width (e.g., a substantially rectangular cross-section), such that the weirs promote flow of liquid along the length of the chamber. In some cases, it may be desirable to promote such cross flow across a chamber to maximize the interaction, and therefore heat and/or mass transfer, between the liquid phase and the vapor phase of a condensable fluid.

The HDH apparatuses (e.g., bubble column apparatuses) described herein may further include one or more components positioned to facilitate, direct, or otherwise affect flow of a fluid within the apparatus. In some embodiments, at least one chamber of at least one stage of a combined HDH apparatus may include one or more baffles positioned to direct flow of a fluid, such as a stream of the condensable fluid in liquid phase (e.g., water). In certain cases, each chamber of the combined HDH apparatus may comprise one or more baffles. Suitable baffles for use in embodiments described herein include plate-like articles having, for example, a substantially rectangular shape. Baffles may also be referred to as barriers, dams, or the like.

The baffle, or combination of baffles, may be arranged in various configurations so as to direct the flow of a liquid within the chamber. In some cases, the baffle(s) can be arranged such that liquid travels in a substantially linear path from one end of the chamber to the other end of the chamber (e.g., along the length of a chamber having a substantially rectangular cross-section). In some cases, the baffle(s) can be arranged such that liquid travels in a non-linear path across a chamber, such as a path having one or more bends or turns within the chamber. That is, the liquid may travel a distance within the chamber that is longer than the length of the chamber. In some embodiments, one or more baffles may be positioned along a bottom surface of at least one chamber within a combined HDH apparatus, thereby affecting the flow of liquid that enters the chamber.

In some embodiments, a baffle may be positioned in a manner so as to direct flow of a liquid within a single chamber, e.g., along a bottom surface of a chamber in either a linear or non-linear manner. In some embodiments, one or more baffles may be positioned substantially parallel to the transverse sides (i.e., width) of a chamber having a substantially rectangular cross-sectional shape, i.e., may be a transverse baffle. In some embodiments, one or more baffles may be positioned substantially parallel to the longitudinal sides (i.e., length) of a chamber having a substantially rectangular cross-sectional shape, i.e., may be a longitudinal baffle. In such configurations, one or more longitudinal baffles may direct the flow of liquid along a substantially non-linear path.

In some embodiments, one or more baffles may be positioned in a manner so as to direct flow of a liquid within a single chamber along a path that may promote efficiency of heat and/or mass transfer. For example, a chamber may comprise a liquid entering through a liquid inlet at a first temperature and a gas entering through a bubble generator at a second, different temperature. In certain cases, heat and mass transfer between the liquid and the gas may be increased when the first temperature approaches the second temperature. One factor that may affect the ability of the first temperature to approach the second temperature may be the amount of time the liquid spends flowing through the chamber.

In some cases, it may be advantageous for portions of the liquid flowing through the chamber to spend substantially equal amounts of time flowing through the chamber. For example, heat and mass transfer may undesirably be reduced under conditions where a first portion of the liquid spends a shorter amount of time in the chamber and a second portion of the liquid spends a longer amount of time in the chamber. Under such conditions, the temperature of a mixture of the first portion and the second portion may be further from the second temperature of the gas than if both the first portion and the second portion had spent a substantially equal amount of time in the chamber. Accordingly, in some embodiments, one or more baffles may be positioned in the chamber to facilitate liquid flow such that portions of the liquid flowing through the chamber spend substantially equal amounts of time flowing through the chamber. For example, one or more baffles within the chamber may spatially separate liquid located at the inlet (e.g., liquid likely to have spent a shorter amount of time in the chamber) from liquid located at the outlet (e.g., liquid likely to have spent a longer amount of time in the chamber). In some cases, one or more baffles within the chamber may facilitate liquid flow along flow paths having substantially the same length. For example, the one or more baffles may prevent a first portion of liquid from travelling along a substantially shorter path from the inlet of the chamber to the outlet of the chamber (e.g., along the width of a chamber having a rectangular cross section) and a second portion of liquid from travelling along a substantially longer path from the inlet of the chamber to the outlet of the chamber (e.g., along the length of a chamber having a rectangular cross section).

In some cases, it may be advantageous to increase the amount of time a liquid spends flowing through a chamber. Accordingly, in certain embodiments, one or more baffles may be positioned within a single chamber to facilitate liquid flow along a flow path having a relatively high aspect ratio (e.g., the ratio of the average length of the flow path to the average width of the flow path). For example, in some cases, one or more baffles may be positioned such that liquid flowing through the chamber follows a flow path having an aspect ratio of at least about 1.5, at least about 2, at least about 5, at least about 10, at least about 20, at least about 50, at least about 75, at least about 100, or more. In some embodiments, liquid flowing through the chamber follows a flow path having an aspect ratio in the range of about 1.5 to about 5, about 1.5 to about 10, about 1.5 to about 20, about 1.5 to about 50, about 1.5 to about 75, about 1.5 to about 100, about 5 to about 10, about 5 to about 20, about 5 to about 50, about 5 to about 75, about 5 to about 100, about 10 to about 20, about 10 to about 50, about 10 to about 75, about 10 to about 100, or about 50 to about 100.

Figure 6A:
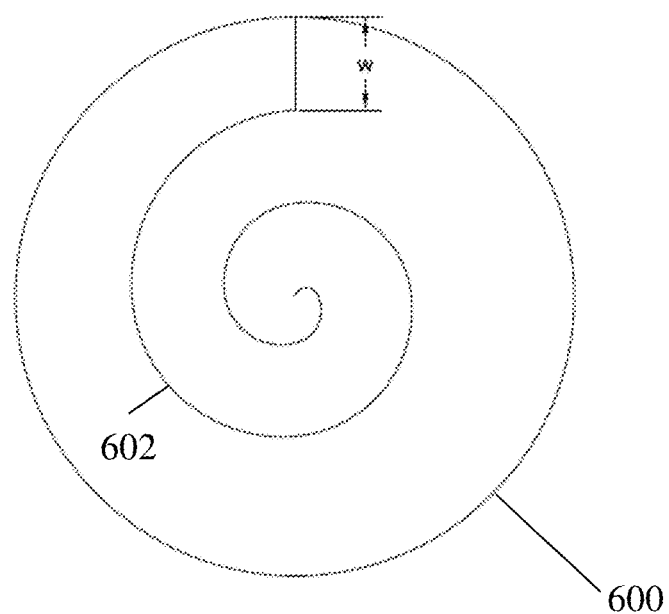
FIG. 6A shows, according to some embodiments, a schematic illustration of an exemplary baffle.
Figure 6B:
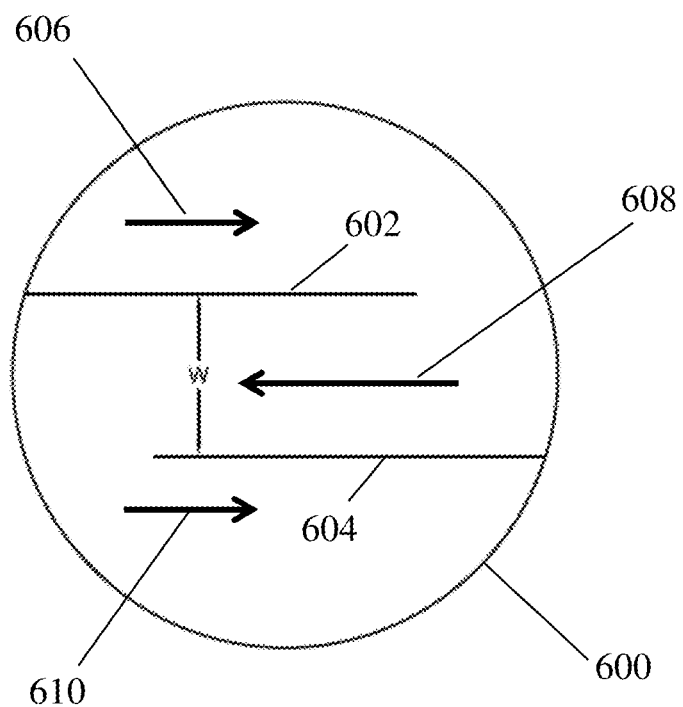
FIG. 6B shows, according to some embodiments, a schematic illustration of an exemplary weaving baffle.

In some cases, the aspect ratio of a liquid flow path through a chamber may be larger than the aspect ratio of the chamber. In certain cases, the presence of baffles to increase the aspect ratio of a liquid flow path may facilitate the use of an apparatus having a relatively low aspect ratio (e.g., about 1), such as an apparatus having a substantially circular cross section. For example, FIG. 6A shows, according to some embodiments, a schematic illustration of an exemplary chamber 600 having a substantially circular cross section (e.g., bottom surface) and a spiral baffle 602, according to some embodiments. In operation, liquid may enter chamber 600 through a liquid inlet (not shown) positioned at or near the center of the substantially circular cross section. The liquid may then flow along spiral baffle 602 and exit chamber 600 through a liquid outlet (not shown) positioned at the upper edge of the substantially circular cross section. While the substantially circular cross section of chamber 600 has an aspect ratio of about 1, the aspect ratio of the liquid flow path is substantially greater than 1 (e.g., approximately 4.5). As an additional example, FIG. 6B shows, according to some embodiments, a schematic illustration of an exemplary chamber 600 having a substantially circular cross section (e.g., bottom surface) and comprising a first baffle 602 and a second baffle 604. In operation, liquid may enter chamber 600 through a liquid inlet (not shown) located in the upper left portion of the substantially circular cross section. The liquid may first flow in the direction of arrow 606. The liquid may then flow around baffle 602 and flow in the opposite direction, in the direction of arrow 608. The liquid may then flow around baffle 604 and flow in the direction of arrow 610 and subsequently exit chamber 600 through a liquid outlet (not shown) located in the lower right portion of the substantially circular cross section. While the aspect ratio of the circular cross section of chamber 600 is about 1, the aspect ratio of the liquid flow path through chamber 600 is substantially greater than 1.

In some embodiments, the baffle is a longitudinal baffle. For example, a longitudinal baffle may extend along the length of a stage, from a first end to a second, opposing end. In some embodiments, there may be a gap between the longitudinal baffle and the first end and/or the second end of the stage, such that a liquid may flow around the longitudinal baffle (e.g., in a serpentine path). In some embodiments, a stage may comprise more than one longitudinal baffle. In some embodiments, at least one longitudinal baffle, at least two longitudinal baffles, at least three longitudinal baffles, at least four longitudinal baffles, at least five longitudinal baffles, at least ten longitudinal baffles, or more, are arranged within the chamber. In some embodiments, the chamber includes 1-10 longitudinal baffles, 1-5 longitudinal baffles, or, 1-3 longitudinal baffles.

In some embodiments, the baffle is a transverse baffle (e.g., a horizontal baffle). In some cases, at least one transverse baffle, at least two transverse baffles, at least three transverse baffles, at least four transverse baffles, at least five transverse baffles, at least ten transverse baffles, or more, are arranged within the chamber. In some embodiments, the chamber includes 1-10 transverse baffles, 1-5 transverse baffles, or, 1-3 transverse baffles.

The combined HDH apparatus (e.g., combined bubble column apparatus) may comprise a vessel having any shape suitable for a particular application. In some embodiments, the vessel of the combined HDH apparatus has a cross section that is substantially circular, substantially elliptical, substantially square, substantially rectangular, substantially triangular, or irregularly shaped. It has been recognized that it may be advantageous, in certain cases, for the vessel of a combined HDH apparatus to have a substantially circular cross section. In some cases, a vessel having a substantially circular cross section (e.g., a substantially cylindrical vessel) may be easier to manufacture than a vessel having a cross section of a different shape (e.g., a substantially rectangular cross section). For example, for a substantially cylindrical vessel of a combined HDH apparatus having a certain diameter (e.g., about 0.6 m or less), prefabricated pipes and/or tubes may be used to form the walls of the vessel of the HDH apparatus. In addition, a substantially cylindrical vessel of a combined HDH apparatus may be manufactured from a sheet material (e.g., stainless steel) by bending the sheet and welding a single seam. In contrast, a vessel of a combined HDH apparatus having a cross section of a different shape may have more than one welded seam (e.g., a combined HDH apparatus having a substantially rectangular cross section may have four welded seams). Further, a vessel of a combined HDH apparatus having a substantially circular cross section may require less material to fabricate than a combined HDH apparatus having a cross section of a different shape (e.g., a substantially rectangular cross section). In certain embodiments, the vessel of the combined HDH apparatus has a substantially parallelepiped shape, a substantially rectangular prismatic shape, a substantially cylindrical shape, a substantially pyramidal shape, and/or an irregular shape. In some cases, it may be advantageous for a vessel of a combined HDH apparatus (e.g., a combined bubble column apparatus) to have a relatively high aspect ratio. For example, in some cases, it may be advantageous for a vessel of a combined HDH apparatus to have a substantially rectangular cross section.

The vessel of the combined HDH apparatus (e.g., combined bubble column apparatus) may have any size suitable for a particular application. In some embodiments, the maximum cross-sectional dimension of the vessel of the combined HDH apparatus is about 10 m or less, about 5 m or less, about 2 m or less, about 1 m or less, about 0.5 m or less, or about 0.1 m or less. In some cases, the vessel of the combined HDH apparatus has a maximum cross-sectional dimension ranging from about 0.01 m to about 10 m, about 0.01 m to about 5 m, about 0.01 m to about 1 m, about 0.5 m to about 10 m, about 0.5 m to about 5 m, about 0.5 m to about 1 m, about 1 m to about 5 m, or about 1 m to about 10 m.

The exterior of the combined HDH apparatus (e.g., combined bubble column apparatus) may comprise any suitable material. In certain embodiments, the vessel of the combined HDH apparatus comprises stainless steel, aluminum, and/or a plastic (e.g., polyvinyl chloride, polyethylene, polycarbonate). In some embodiments, it may be advantageous to minimize heat loss from the vessel of the combined HDH apparatus to the environment. In some cases, the exterior and/or the interior of the vessel of the apparatus may comprise a thermally insulating material. For example, the vessel of the apparatus may be at least partially coated, covered, or wrapped with a thermally insulating material. Non-limiting examples of suitable thermally insulating materials include elastomeric foam, fiberglass, ceramic fiber mineral wool, glass mineral wool, phenolic foam, polyisocyanurate, polystyrene, and polyurethane.

In certain cases, it may be advantageous for a combined HDH apparatus (e.g., a combined bubble column apparatus) to have a relatively low height and/or a relatively small footprint. For example, a relatively low height and/or relatively small footprint may advantageously facilitate shipping (e.g., because the apparatus may fit on existing truck beds and/or in standard shipping containers) and/or installation of the apparatus, particularly for systems located at remote sites. In contrast, conventional HDH systems typically are relatively tall and/or have a relatively large footprint. For example, conventional HDH systems often comprise packed bed humidifiers, which are often relatively tall (e.g., at least about 20 m tall) in order to produce a sufficient amount of relatively pure water. Due to the sizes of existing shipping trailers (e.g., truck beds) and shipping containers, and due to certain highway restrictions (e.g., height of bridges and/or overpasses), such humidifiers generally need to be shipped to a deployment site in pieces and assembled at the deployment site. The need to assemble the humidifier and/or dehumidifier at the deployment site, which is often remote, may increase time and monetary costs associated with deployment of the conventional HDH systems. In addition, the relatively large size of the humidifier and/or dehumidifier may be necessitate additional expenses. For example, a humidifier and/or dehumidifier that is relatively tall and/or has a relatively large footprint may require construction of a relatively large cement foundation, assembly of a substantial and complicated pipe rack, and/or lightning protection. Additionally, a humidifier and/or dehumidifier that is relatively tall and/or has a relatively large footprint may be difficult to move to different sites without substantial additional expense.

According to some embodiments, the combined HDH apparatus (e.g., combined bubble column apparatus) has a relatively low height. For example, in some embodiments, the combined HDH apparatus comprises a vessel having a relatively low height. The height of a vessel may refer to the maximum vertical distance between a first end (e.g., a top end) and a second end (e.g., a bottom end) of the vessel. Referring to FIG. 1A, vessel 150 of apparatus 100 has a height $H_v$. In some cases, the vessel of the combined HDH apparatus has a height of about 5 m or less, about 4 m or less, about 3.5 m or less, about 3 m or less, about 2 m or less, about 1 m or less, or, in some cases, about 0.5 m or less. In certain cases, the vessel of the combined HDH apparatus has a height in the range of about 1 m to about 5 m, about 1 m to about 4 m, about 1 m to about 3.5 m, about 1 m to about 3 m, or about 1 m to about 2 m. In some cases, a combined HDH apparatus having a relatively low height (e.g., about 5 m or less) may be shipped pre-assembled and in an operational orientation (e.g., upright) to a deployment site via a shipping trailer or shipping container. Such an apparatus may, in some cases, require minimal time and/or money to deploy in the field.

In some embodiments, the vessel of the combined HDH apparatus (e.g., combined bubble column apparatus) has a relatively small footprint (e.g., surface area of a bottom surface of the vessel when in an operational orientation). In certain embodiments, the vessel of the combined HDH apparatus has a footprint of about 100 m² or less, about 75 m² or less, about 50 m² or less, about 20 m² or less, about 10 m² or less, about 5 m² or less, about 2 m² or less, or about 1 m² or less. In some cases, the vessel of the combined HDH apparatus has a footprint in the range of about 10 m² to about 100 m², about 10 m² to about 75 m², about 10 m² to about 50 m², about 10 m² to about 20 m², about 1 m² to about 100 m², about 1 m² to about 75 m², about 1 m² to about 50 m², about 1 m² to about 20 m², about 1 m² to about 10 m², or about 1 m² to about 5 m².

In some embodiments, the vessel of the combined HDH apparatus has a relatively high maximum cross-sectional aspect ratio. As used herein, the cross-sectional aspect ratio of a vessel refers to the ratio of the length of the vessel to the width of the vessel when in an operational orientation. The length of the vessel refers to the largest cross-sectional dimension of the vessel measured in a plane perpendicular to a primary axis of the vessel, where the primary axis (e.g., a vertical axis, a horizontal axis) of the vessel runs parallel to the largest dimension of the vessel. The width of the vessel refers to the largest cross-sectional dimension of the vessel measured perpendicular to the length in the plane perpendicular to the primary axis of the vessel. In some cases, the cross-sectional aspect ratio may vary along the primary axis. The maximum cross-sectional aspect ratio refers to the largest value of the cross-sectional aspect ratios. In some embodiments, the vessel of the combined HDH apparatus has a maximum cross-sectional aspect ratio of at least about 1.5, at least about 2, at least about 5, at least about 10, at least about 15, or at least about 20. In some embodiments, the vessel of the combined HDH apparatus has a maximum cross-sectional aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20.

Figure 7A:
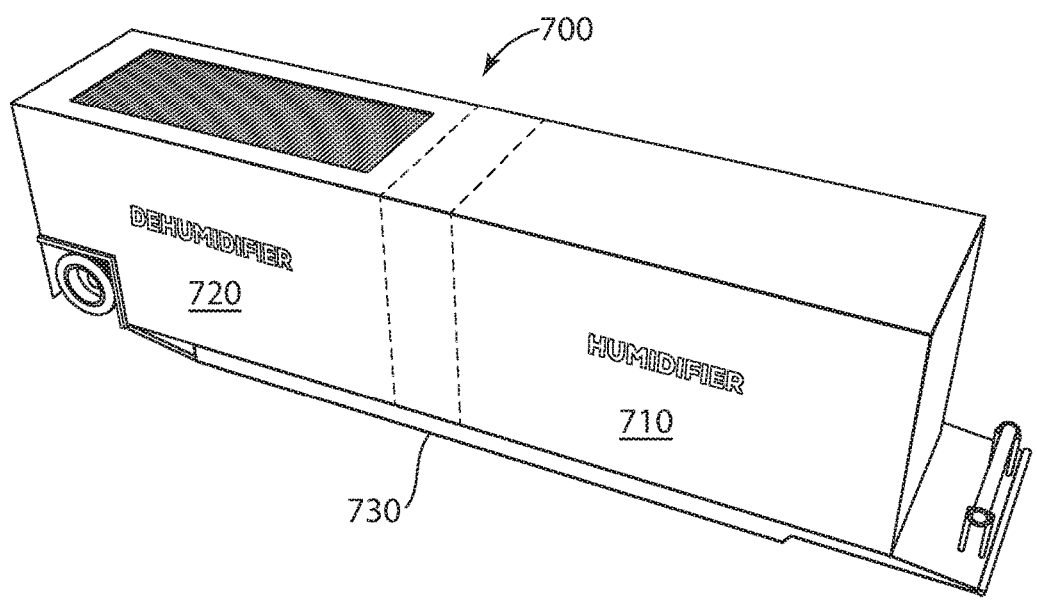
FIGS. 7A-C show schematic illustrations of an exemplary combined HDH apparatus comprising an integrated wheel base, according to some embodiments.
Figure 7B:
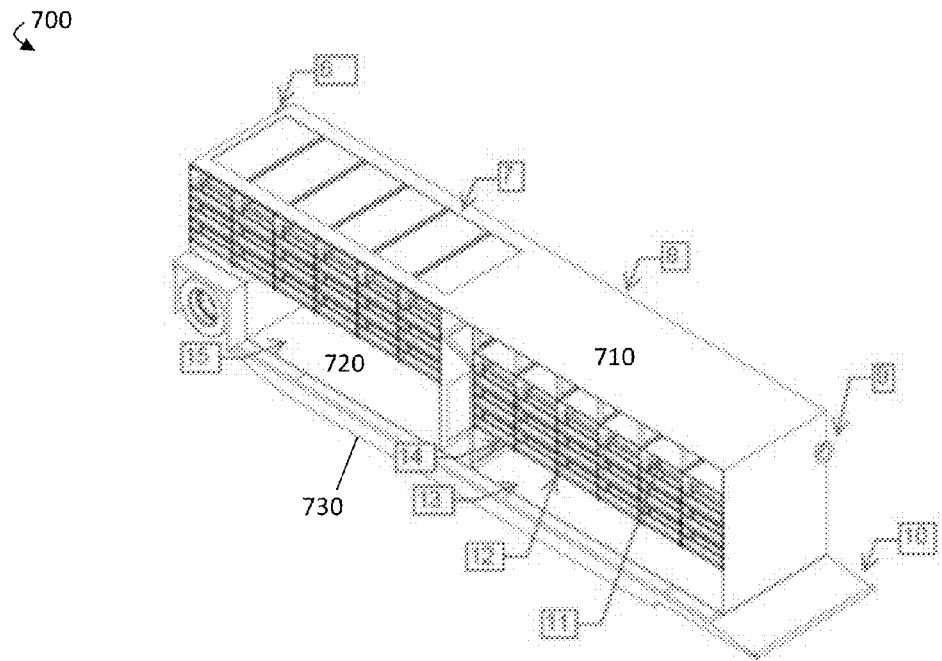
Figure 7C:
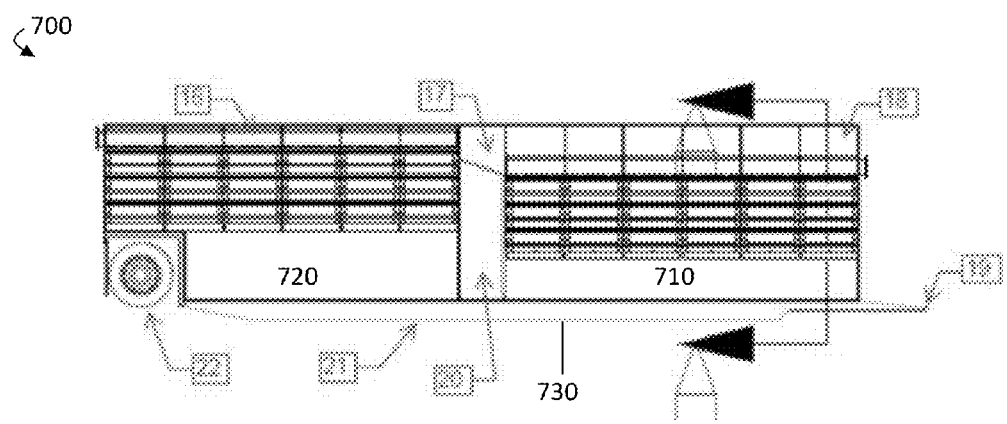

In some embodiments, the combined HDH apparatus further comprises additional features facilitating transport of the apparatus. In certain embodiments, for example, the combined HDH apparatus comprises an integrated wheel base. For example, FIG. 7A is a schematic illustration of an exemplary combined HDH apparatus 700 comprising a vessel comprising humidification region 710 and dehumidification region 720 and integrated wheel base 730, which comprises two wheels and has a self-leveling edge (e.g., a leveling edge configured to place the bulk of the weight of the apparatus on the main frame of the apparatus rather than on the wheels). Exemplary combined HDH apparatus 700 may be directly connected to a tractor unit (not shown in FIG. 7) and may avoid the need for a separate shipping trailer. When not connected to a tractor unit (e.g., when resting on the ground), the self-leveling edge of integrated wheel base 730 may ensure that most of the weight of the apparatus falls on the main frame of the apparatus and not on the wheels. Additional views of exemplary combined HDH apparatus 700 are shown in FIGS. 7B and 7C.

In certain embodiments, a combined HDH apparatus comprises one or more integrated wheels (e.g., wheels directly integrated with the apparatus). In embodiments in which the combined HDH apparatus comprises two or more integrated wheels, the combined HDH apparatus may further comprise one or more axles, each axle connecting two or more wheels (e.g., two or more integrated wheels). In some embodiments, a combined HDH apparatus comprising one or more integrated wheels and/or one or more axles may be directly connected to a tractor unit.

Figure 8A:
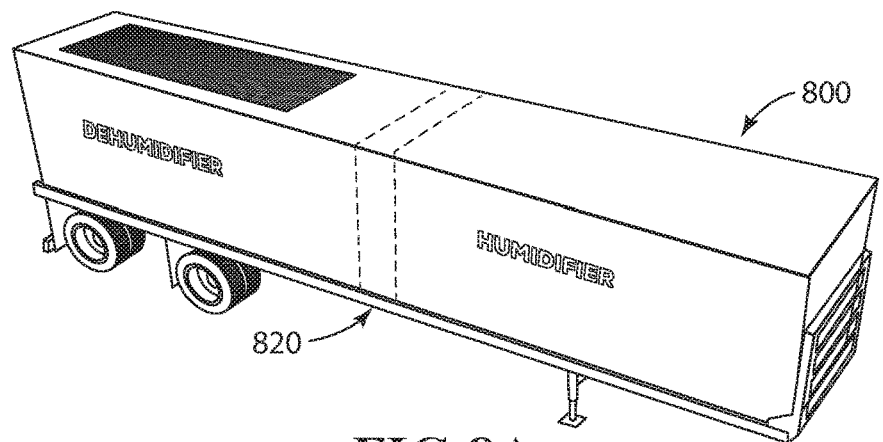
FIG. 8A shows, according to some embodiments, a schematic illustration of an exemplary combined HDH apparatus positioned on a flatbed shipping trailer.
Figure 8B:
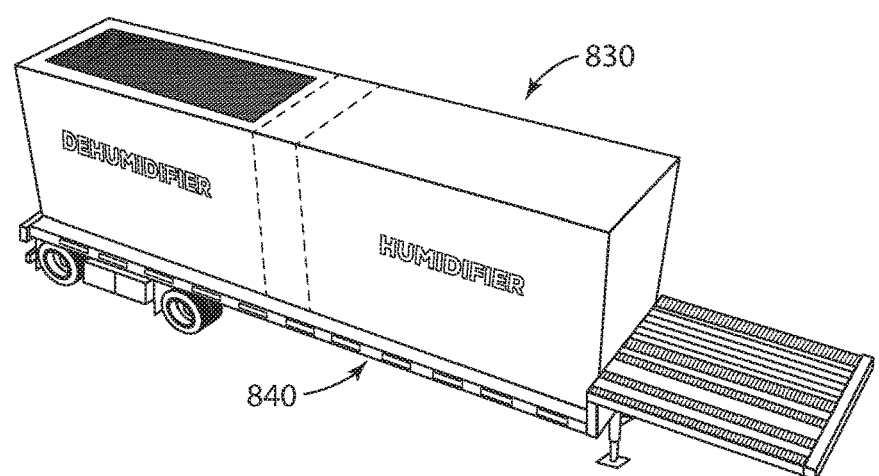
FIG. 8B shows, according to some embodiments, a schematic illustration of an exemplary combined HDH apparatus positioned on a stepdeck shipping trailer.
Figure 8C:
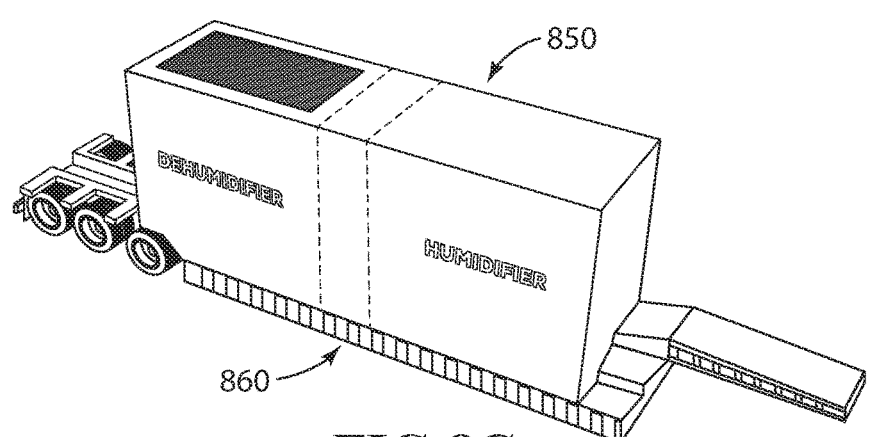
FIG. 8C shows, according to some embodiments, a schematic illustration of an exemplary combined HDH apparatus positioned on a lowboy shipping trailer.

According to some embodiments, the desalination system further comprises a shipping trailer. In some embodiments, the vessel of the combined HDH apparatus is positioned on the shipping trailer. The shipping trailer may be any type of shipping trailer known in the art. Examples of suitable types of shipping trailers include, but are not limited to, flatbed trailers, extendable flatbed trailers, stepdeck trailers (also referred to as dropdeck trailers), extendable stepdeck trailers (also referred to as extendable dropdeck trailers), two axle spread stepdeck trailers, lowboy trailers, and extendable lowboy trailers. FIG. 8A shows a schematic illustration of an exemplary system comprising a combined HDH apparatus 800 and a flatbed trailer 820. FIG. 8B shows a schematic illustration of an exemplary system comprising a combined HDH apparatus 830 and a stepdeck trailer 840. FIG. 8C shows a schematic illustration of an exemplary system comprising a combined HDH apparatus 850 and a lowboy trailer 860. Each type of shipping trailer may have a certain amount of available shipping area (e.g., the area that may be occupied by cargo). In some cases, the available shipping area of a flatbed trailer may be larger than the available shipping area of a stepdeck trailer or a lowboy trailer. In certain cases, therefore, the largest combined HDH apparatus that may be transported on a flatbed trailer may be larger and have a higher capacity (e.g., have a higher evaporation rate and/or condensation rate) than the largest combined HDH apparatus that may be transported on a stepdeck trailer or a lowboy trailer.

In some embodiments, the combined HDH apparatus is configured to fit within the dimensions of the shipping trailer. In certain embodiments, the shipping trailer has a length of about 40 feet, about 48 feet, about 53 feet, or about 70 feet. In certain embodiments, the shipping trailer has a width of about 8 feet, 6 inches. In some cases, the combined HDH apparatus is configured to occupy a relatively large percentage of the available shipping area of the shipping trailer. In certain embodiments, the combined HDH apparatus has a footprint that occupies at least about 20%, at least about 30%, at least about 40%, at least about 50%, at least about 60%, at least about 80%, at least about 90%, at least about 95%, or about 100% of the shipping area of the shipping trailer. In some embodiments, the combined HDH apparatus has a footprint that occupies about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping area of the shipping trailer. In certain embodiments, the combined HDH apparatus is contoured (e.g., around a wheel well of the shipping trailer) to occupy a larger percentage of the shipping area of the shipping trailer.

According to some embodiments, the desalination system further comprises a shipping container. In some embodiments, the vessel(s) of the combined HDH apparatus is(are) positioned in the shipping container. The shipping container may be any type of shipping container known in the art. In some embodiments, the shipping container is a 5' container (ISO designation 1F, 4' 9.5"×8'×8', also called "Quadcon"), a 6.5' container (ISO designation 1E, 6' 5.5"×8'×8', also called "Tricon"), a 10' container (ISO designation 1D, 9' 9.75"×8'×8', also called "Bicon"), a 20' standard container (ISO designation 1CC, 19' 10.5"×8'×8' 6"), a 20' container (ISO designation 1C, 19' 10.5"×8'×8'), a 30' high cube container (ISO Designation 1BBB, 29' 11.25"×8'×9' 6"), a 30' standard container (ISO designation 1BB, 29' 11.25"×8'×8' 6"), a 30' container (ISO designation 1B, 29' 11.25"×8'×8'), a 40' high cube container (ISO designation 1AAA, 40'×8'×9' 6"), a 40' standard container (ISO designation 1AA, 40'×8'×8' 6"), a 40' container (ISO designation 1A, 40'×8'×8'), a 45' high cube container (45'×8'×9' 6"), a 45' standard container (45'×8'×8' 6"), a 48' high cube container (48'×8' 6"×9' 6"), a 53' container (53'×8' 6"×9' 6"), and/or a European pallet wide container (e.g., having an internal width of 2.44 m). The shipping container may be an intermodal shipping container. In certain embodiments, the shipping container has a nominal length of 20 feet, 40 feet, 45 feet, 48 feet, or 53 feet. In some embodiments, the shipping container has a length of 4 ft. 9.5 in., 6 ft. 5.5 in., 9 ft. 9.75 in., 19 ft. 10.5 in., 29 ft. 11.25 in., 40 ft., 45 ft., 48 ft., or 53 ft. In certain embodiments, the shipping container has a width of about 8 feet or 8 feet 6 inches. In certain embodiments, the shipping container has a height of 8 feet, 8 feet 6 inches, or 9 feet 6 inches.

In some embodiments, the combined HDH apparatus is configured to fit within the dimensions of the shipping container. In some cases, the combined HDH apparatus is configured to occupy a relatively large percentage of the available shipping area of the shipping container. In certain embodiments, the combined HDH apparatus has a footprint that occupies at least about 20%, at least about 30%, at least about 40%, at least about 50%, at least about 60%, at least about 80%, at least about 90%, at least about 95%, or about 100% of the shipping area of the shipping container. In some embodiments, the combined HDH apparatus has a footprint that occupies about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping area of the shipping container.

In some embodiments, the combined HDH apparatus is configured to occupy a relatively large percentage of the available shipping volume (e.g., the volume that may be occupied by cargo) of the shipping container. In certain embodiments, the combined HDH apparatus occupies at least about 20%, at least about 30%, at least about 40%, at least about 50%, at least about 60%, at least about 80%, at least about 90%, at least about 95%, or about 100% of the shipping volume of the shipping container. In some embodiments, the combined HDH apparatus occupies about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping volume of the shipping container.

While the features described above have been discussed in the context of combined HDH apparatuses comprising a vessel comprising a humidification region and a dehumidification region, in alternative embodiments, at least some or all of the described features (e.g., shape, aspect ratio, presence of weirs and/or baffles, etc.) may also be applied to the design criteria for humidifiers and/or dehumidifiers, individually, as well as overall HDH systems comprising a coupled but physically separate humidifier (e.g., bubble column humidifier) and dehumidifier (e.g., bubble column condenser). In certain embodiments, an HDH apparatus may comprise a first vessel comprising a humidifier (e.g., bubble column humidifier) and a second, separate vessel comprising a dehumidifier (e.g., bubble column condenser).

In some embodiments, the humidifier (e.g., bubble column humidifier) and/or dehumidifier (e.g., bubble column condenser) have a relatively low height and/or relatively small footprint, which may advantageously facilitate shipping and/or installation of the humidifier and/or dehumidifier. In some embodiments, the humidifier (e.g., bubble column humidifier) and/or dehumidifier (e.g., bubble column condenser) have a height of about 5 m or less, about 4 m or less, about 3.5 m or less, about 3 m or less, about 2 m or less, about 1 m or less, or, in some cases, about 0.5 m or less. In certain cases, the humidifier and/or dehumidifier have a height in the range of about 1 m to about 5 m, about 1 m to about 4 m, about 1 m to about 3.5 m, about 1 m to about 3 m, or about 1 m to about 2 m. In some cases, a humidifier or dehumidifier having a relatively low height (e.g., about 5 m or less) may be shipped pre-assembled (e.g., upright) to a deployment site via a shipping trailer or shipping container.

In some embodiments, the humidifier (e.g., bubble column humidifier) and/or dehumidifier (e.g., bubble column condenser) have a relatively small footprint (e.g., surface area of a bottom surface of the humidifier or dehumidifier). In certain embodiments, the humidifier and/or dehumidifier have a footprint of about 100 m$^2$ or less, about 75 m$^2$ or less, about 50 m$^2$ or less, about 20 m$^2$ or less, about 10 m$^2$ or less, about 5 m$^2$ or less, about 2 m$^2$ or less, or about 1 m$^2$ or less. In some cases, the humidifier and/or dehumidifier have a footprint in the range of about 10 m$^2$ to about 100 m$^2$, about 10 m$^2$ to about 75 m$^2$, about 10 m$^2$ to about 50 m$^2$, about 10 m$^2$ to about 20 m$^2$, about 1 m$^2$ to about 100 m$^2$, about 1 m$^2$ to about 75 m$^2$, about 1 m$^2$ to about 50 m$^2$, about 1 m$^2$ to about 20 m$^2$, about 1 m$^2$ to about 10 m$^2$, or about 1 m$^2$ to about 5 m$^2$.

In some embodiments, the humidifier (e.g., bubble column humidifier) and/or dehumidifier (e.g., bubble column condenser) have a relatively high maximum cross-sectional aspect ratio. In some embodiments, the humidifier and/or dehumidifier have a maximum cross-sectional aspect ratio of at least about 1.5, at least about 2, at least about 5, at least about 10, at least about 15, or at least about 20. In certain cases, the humidifier and/or dehumidifier have a maximum cross-sectional aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20.

In some embodiments, the humidifier (e.g., bubble column humidifier) is configured to have a relatively high evaporation rate. In certain cases, for example, the humidifier has an evaporation rate of at least about 50 barrels/day, at least about 100 barrels/day, at least about 200 barrels/day, at least about 500 barrels/day, at least about 1,000 barrels a day, at least about 1,500 barrels/day, at least about 2,000 barrels/day, at least about 3,000 barrels/day, at least about 4,000 barrels/day, or at least about 5,000 barrels/day. In some embodiments, the humidifier has an evaporation rate of about 50 barrels/day to about 500 barrels/day, about 50 barrels/day to about 1,000 barrels/day, about 50 barrels/day to about 1,500 barrels/day, about 50 barrels/day to about 2,000 barrels/day, about 50 barrels/day to about 3,000 barrels/day, about 50 barrels/day to about 4,000 barrels/day, about 50 barrels/day to about 5,000 barrels/day, about 100 barrels/day to about 500 barrels/day, about 100 barrels/day to about 1,000 barrels/day, about 100 barrels/day to about 1,500 barrels/day, about 100 barrels/day to about 2,000 barrels/day, about 100 barrels/day to about 3,000 barrels/day, about 100 barrels/day to about 4,000 barrels/day, about 100 barrels/day to about 5,000 barrels/day, about 200 barrels/day to about 1,000 barrels/day, about 200 barrels/day to about 1,500 barrels/day, about 200 barrels/day to about 2,000 barrels/day, about 200 barrels/day to about 3,000 barrels/day, about 200 barrels/day to about 4,000 barrels/day, about 200 barrels/day to about 5,000 barrels/day, about 500 barrels/day to about 1,000 barrels/day, about 500 barrels/day to about 1,500 barrels/day, about 500 barrels/day to about 2,000 barrels/day, about 500 barrels/day to about 3,000 barrels/day, about 500 barrels/day to about 4,000 barrels/day, about 500 barrels/day to about 5,000 barrels/day, about 1,000 barrels/day to about 2,000 barrels/day, about 1,000 barrels/day to about 3,000 barrels/day, about 1,000 barrels/day to about 4,000 barrels/day, about 1,000 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day. The evaporation rate of the humidifier may be obtained by measuring the total liquid output volume of the humidifier over a time period (e.g., one day) and subtracting the total liquid input volume of the humidifier over the same time period.

In some embodiments, the dehumidifier (e.g., bubble column condenser) is configured to have a relatively high condensation rate. In certain cases, for example, the dehumidifier has a condensation rate of at least about 50 barrels/day, at least about 100 barrels/day, at least about 200 barrels/day, at least about 500 barrels/day, at least about 1,000 barrels a day, at least about 1,500 barrels/day, at least about 2,000 barrels/day, at least about 3,000 barrels/day, at least about 4,000 barrels/day, or at least about 5,000 barrels/day. In some embodiments, the dehumidifier has a condensation rate of about 50 barrels/day to about 500 barrels/day, about 50 barrels/day to about 1,000 barrels/day, about 50 barrels/day to about 1,500 barrels/day, about 50 barrels/day to about 2,000 barrels/day, about 50 barrels/day to about 3,000 barrels/day, about 50 barrels/day to about 4,000 barrels/day, about 50 barrels/day to about 5,000 barrels/day, about 100 barrels/day to about 500 barrels/day, about 100 barrels/day to about 1,000 barrels/day, about 100 barrels/day to about 1,500 barrels/day, about 100 barrels/day to about 2,000 barrels/day, about 100 barrels/day to about 3,000 barrels/day, about 100 barrels/day to about 4,000 barrels/day, about 100 barrels/day to about 5,000 barrels/day, about 200 barrels/day to about 1,000 barrels/day, about 200 barrels/day to about 1,500 barrels/day, about 200 barrels/day to about 2,000 barrels/day, about 200 barrels/day to about 3,000 barrels/day, about 200 barrels/day to about 4,000 barrels/day, about 200 barrels/day to about 5,000 barrels/day, about 500 barrels/day to about 1,000 barrels/day, about 500 barrels/day to about 1,500 barrels/day, about 500 barrels/day to about 2,000 barrels/day, about 500 barrels/day to about 3,000 barrels/day, about 500 barrels/day to about 4,000 barrels/day, about 500 barrels/day to about 5,000 barrels/day, about 1,000 barrels/day to about 2,000 barrels/day, about 1,000 barrels/day to about 3,000 barrels/day, about 1,000 barrels/day to about 4,000 barrels/day, about 1,000 barrels/day to about 5,000 barrels/day, about 2,000 barrels/day to about 5,000 barrels/day, about 3,000 barrels/day to about 5,000 barrels/day, or about 4,000 barrels/day to about 5,000 barrels/day. The condensation rate of the dehumidifier may be obtained by measuring the total liquid output volume of the dehumidifier over a time period (e.g., one day) and subtracting the total liquid input volume of the dehumidifier over the same time period.

In some embodiments, the humidifier (e.g., bubble column humidifier) and/or dehumidifier (e.g., bubble column condenser) further comprise additional features facilitating transport of the units to an installation site. In certain embodiments, for example, the humidifier and/or dehumidifier comprise an integrated wheel base. In some embodiments, the humidifier, dehumidifier, and/or integrated wheel base may comprise a self-leveling edge (e.g., a leveling edge configured to place the bulk of the weight of the humidifier and/or dehumidifier on the main frame of the humidifier and/or dehumidifier and not on the wheels). In alternative embodiments, the humidifier and/or dehumidifier comprise one or more integrated wheels. In embodiments in which the humidifier and/or dehumidifier comprise two or more integrated wheels, the humidifier and/or dehumidifier may further comprise one or more axles, each axle connecting two or more wheels (e.g., two or more integrated wheels). The presence of the integrated wheel base and/or the one or more integrated wheels may advantageously allow the humidifier and/or dehumidifier to be transported without additional transport support (e.g., a shipping trailer). For example, in some cases, the humidifier and/or dehumidifier may be directly connected to a tractor unit.

In some embodiments, the desalination system further comprises one or more shipping trailers. In some embodiments, the humidifier (e.g., bubble column humidifier) and dehumidifier (e.g., bubble column condenser) are positioned on a single shipping trailer (e.g., a double unit shipping trailer). The shipping trailer may be any shipping trailer known in the art. Examples of suitable shipping trailers include, but are not limited to, flatbed trailers, extendable flatbed trailers, stepdeck trailers (also referred to as dropdeck trailers), extendable stepdeck trailers (also referred to as extendable dropdeck trailers), two axle spread stepdeck trailers, lowboy trailers, and extendable lowboy trailers. In some cases, positioning the humidifier and dehumidifier on a single trailer may reduce the assembly required at a deployment site and may thereby reduce the time and monetary costs associated with deployment of the humidifier and dehumidifier.

Figure 9A:
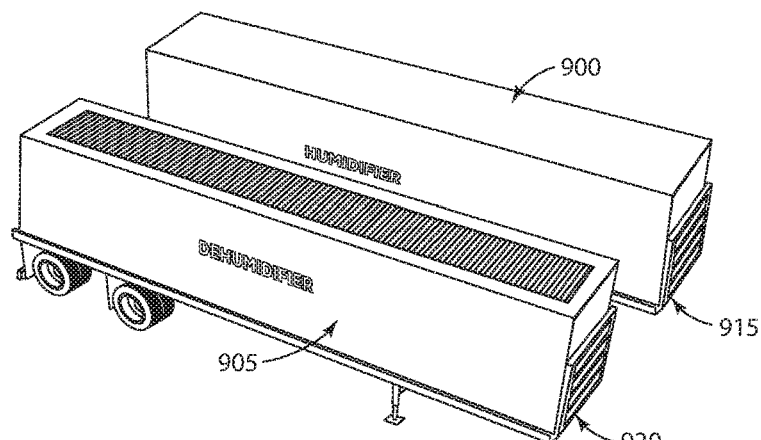
FIG. 9A shows a schematic illustration of an exemplary system comprising a humidifier positioned on a first flatbed shipping trailer and a dehumidifier positioned on a second flatbed shipping trailer, according to some embodiments.
Figure 9B:
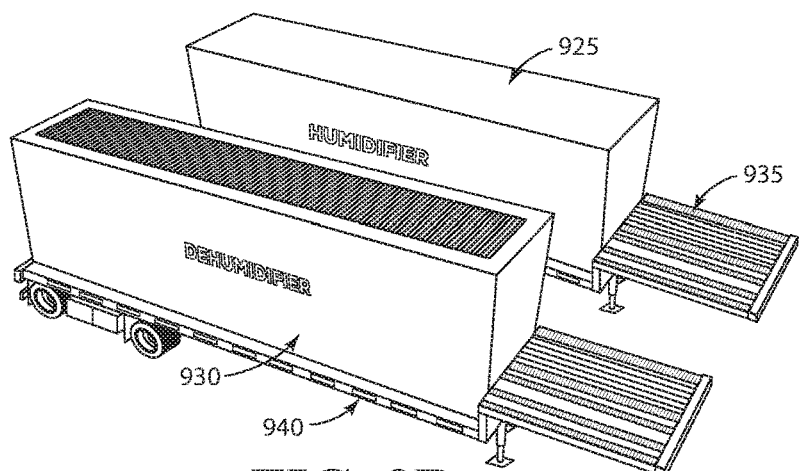
FIG. 9B shows a schematic illustration of an exemplary system comprising a humidifier positioned on a first stepdeck shipping trailer and a dehumidifier positioned on a second stepdeck shipping trailer, according to some embodiments.
Figure 9C:
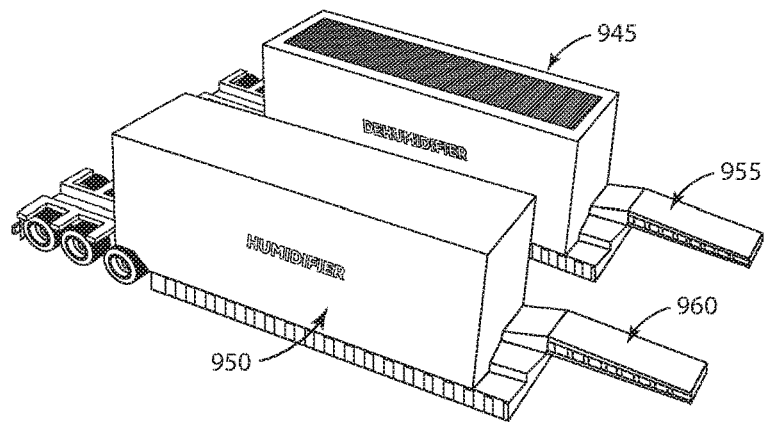
FIG. 9C shows a schematic illustration of an exemplary system comprising a humidifier positioned on a first lowboy shipping trailer and a dehumidifier positioned on a second lowboy shipping trailer, according to some embodiments.

In some cases, the desalination system comprises two shipping trailers. In certain embodiments, for example, a humidifier (e.g., bubble column humidifier) may be positioned on a first shipping trailer, and a dehumidifier (e.g., bubble column condenser) may be positioned on a second shipping trailer. The first shipping trailer and second shipping trailer may independently be any type of suitable shipping trailer. Non-limiting examples of suitable shipping trailers include flatbed trailers, extendable flatbed trailers, stepdeck trailers (also referred to as dropdeck trailers), extendable stepdeck trailers (also referred to as extendable dropdeck trailers), two axle spread stepdeck trailers, lowboy trailers, and extendable lowboy trailers. FIG. 9A shows a schematic illustration of an exemplary system comprising a humidifier 900 on a flatbed shipping trailer 915 and a dehumidifier 905 on a flatbed shipping trailer 920. FIG. 9B shows a schematic illustration of an exemplary system comprising a humidifier 925 on a stepdeck trailer 935 and a dehumidifier 930 on a stepdeck trailer 940. FIG. 9C shows a schematic illustration of an exemplary system comprising a humidifier 945 on a lowboy trailer 955 and a dehumidifier 950 on a lowboy trailer 960. It should be noted that although FIGS. 9A-C show the humidifier and dehumidifier of a system being transported on the same type of shipping trailer, the humidifier and dehumidifier of a system may also be transported on different types of shipping trailers (e.g., a flatbed trailer and a stepdeck trailer).

In some embodiments, the humidifier (e.g., bubble column humidifier) and/or dehumidifier (e.g., bubble column condenser) are configured to fit within the dimensions of the one or more shipping trailers. In certain embodiments, each of the one or more shipping trailers has a length of about 48 feet or about 53 feet. In certain embodiments, each of the one or more shipping trailers has a width of about 8 feet, 6 inches. In some embodiments, the humidifier and/or dehumidifier are configured to occupy a relatively large percentage of the available shipping area of one or more shipping trailers. In certain embodiments, the humidifier and/or dehumidifier have a footprint that occupies at least about 20%, at least about 30%, at least about 40%, at least about 50%, at least about 60%, at least about 80%, at least about 90%, at least about 95%, or about 100% of the shipping area of the one or more shipping trailers. In some embodiments, the humidifier and/or dehumidifier have a footprint that occupies about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping area of the one or more shipping trailers. In certain embodiments, the humidifier and/or dehumidifier are contoured (e.g., around a wheel well of the shipping trailer) to occupy a larger percentage of the shipping area of the one or more shipping trailers.

According to some embodiments, the desalination system further comprises one or more shipping containers. In some embodiments, the humidifier (e.g., bubble column humidifier) and dehumidifier (e.g., bubble column condenser) may be positioned in a single shipping container. The shipping container may be any type of shipping container known in the art. In certain cases, for example, the shipping container may be an intermodal shipping container.

In some embodiments, the desalination system comprises two shipping containers. In certain embodiments, for example, a humidifier (e.g., a bubble column humidifier) is positioned in a first shipping container, and a dehumidifier (e.g., a bubble column condenser) is positioned in a second shipping container. The first shipping container and second shipping container may independently be any type of shipping container known in the art. In certain embodiments, the first shipping container and/or second shipping container are intermodal shipping containers.

The shipping container(s) may be any type of shipping container known in the art. In some embodiments, the one or more shipping containers are a 5' container (ISO designation 1F, 4' 9.5"×8'×8', also called "Quadcon"), a 6.5' container (ISO designation 1E, 6' 5.5"×8'×8', also called "Tricon"), a 10' container (ISO designation 1D, 9' 9.75"×8'×8', also called "Bicon"), a 20' standard container (ISO designation 1CC, 19' 10.5"×8'×8' 6"), a 20' container (ISO designation 1C, 19' 10.5"×8'×8'), a 30' high cube container (ISO Designation 1BBB, 29' 11.25"×8'×9' 6"), a 30' standard container (ISO designation 1BB, 29' 11.25"×8'×8' 6"), a 30' container (ISO designation 1B, 29' 11.25"×8'×8'), a 40' high cube container (ISO designation 1AAA, 40'×8'×9' 6"), a 40' standard container (ISO designation 1AA, 40'×8'×8' 6"), a 40' container (ISO designation 1A, 40'×8'×8'), a 45' high cube container (45'×8'×9' 6"), a 45' standard container (45'× 8'×8' 6"), a 48' high cube container (48'×8' 6"×9' 6"), a 53' container (53'×8' 6"×9' 6"), and/or a European pallet wide container (e.g., having an internal width of 2.44 m).

In some embodiments, the humidifier (e.g., bubble column humidifier) and/or dehumidifier (e.g., bubble column condenser) are configured to fit within the dimensions of the one or more shipping containers. In certain embodiments, the one or more shipping containers have a length of 4 ft. 9.5 in., 6 ft. 5.5 in., 9 ft. 9.75 in., 19 ft. 10.5 in., 29 ft. 11.25 in., 40 ft., 45 ft., 48 ft., or 53 ft. In certain embodiments, the one or more shipping containers have a width of about 8 feet or 8 feet 6 inches. In certain embodiments, the one or more shipping containers have a height of 8 feet, 8 feet 6 inches, or 9 feet 6 inches.

In some embodiments, the humidifier (e.g., bubble column humidifier) and/or dehumidifier (e.g., bubble column condenser) are configured to occupy a relatively large percentage of the available shipping area of the one or more shipping containers. In certain embodiments, the humidifier and/or dehumidifier have a footprint that occupies at least about 20%, at least about 30%, at least about 40%, at least about 50%, at least about 60%, at least about 80%, at least about 90%, at least about 95%, or about 100% of the shipping area of the one or more shipping containers. In some embodiments, the humidifier and/or dehumidifier have a footprint that occupies about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping area of the one or more shipping containers.

In some embodiments, the humidifier and/or dehumidifier are configured to occupy a relatively large percentage of the available shipping volume of the one or more shipping containers. In certain embodiments, the humidifier and/or dehumidifier occupy at least about 20%, at least about 30%, at least about 40%, at least about 50%, at least about 60%, at least about 80%, at least about 90%, at least about 95%, or about 100% of the shipping volume of the one or more shipping containers. In some embodiments, the humidifier and/or dehumidifier about 20% to about 50%, about 20% to about 60%, about 20% to about 70%, about 20% to about 80%, about 20% to about 90%, about 20% to about 100%, about 50% to about 60%, about 50% to about 70%, about 50% to about 80%, about 50% to about 90%, about 50% to about 100%, about 60% to about 100%, about 70% to about 100%, about 80% to about 100%, or about 90% to about 100% of the shipping volume of the one or more shipping containers.

Some aspects are directed to a desalination system comprising a combined HDH apparatus (e.g., a combined bubble column apparatus) fluidically connected to one or more additional devices. For example, in some embodiments, a desalination system comprises a combined HDH apparatus, as described herein, in fluid communication with a heat exchanger. In certain cases, the heat exchanger facilitates transfer of heat from a fluid stream flowing through a dehumidification region of the combined HDH apparatus (e.g., a dehumidification region liquid outlet stream) to a fluid stream flowing through a humidification region of the combined HDH apparatus (e.g., a humidification region liquid inlet stream). For example, the heat exchanger may advantageously allow energy to be recovered from a dehumidification region liquid outlet stream and used to pre-heat a humidification region liquid inlet stream prior to entry of the humidification region liquid inlet stream into the humidification region of an exemplary combined HDH apparatus. This may, for example, avoid the need for an additional heating device to heat the humidification region liquid inlet stream. Alternatively, if a heating device is used, the presence of a heat exchanger to recover energy from the dehumidification region liquid outlet stream may reduce the amount of heat required to be applied to the humidification region liquid inlet stream. The system can be configured such that the cooled dehumidification region liquid outlet stream can be returned to the dehumidification region through a liquid inlet and be re-used as a liquid to form liquid layers in the stage(s) of the dehumidification region. In this manner, the temperature of the liquid layers within the dehumidification region of the combined HDH apparatus can be regulated such that, in each stage, the temperature of the liquid layer is maintained at a temperature lower than the temperature of the gas.

In some embodiments, the heat exchanger is an external heat exchanger (e.g., external to the vessel of the combined HDH apparatus). In some cases, an external heat exchanger may be associated with certain advantages. For example, the use of an external heat exchanger with a combined HDH apparatus may advantageously allow the apparatus to have reduced dimensions and/or reduced liquid layer heights within one or more stages of a humidification region and/or dehumidification region of the apparatus. In some embodiments, the heat exchanger is an internal heat exchanger. For example, the internal heat exchanger may comprise a tube coil located within a dehumidification region of a combined bubble column apparatus. The tube coil may be positioned such that at least a portion of the tube coil is in thermal contact with a liquid layer within a stage of the dehumidification region. For example, in a dehumidification region (e.g., bubble column dehumidification region) comprising a plurality of stages, each stage comprising a liquid layer, the tube coil may be positioned such that each liquid layer is in thermal contact with at least a portion of the tube coil. In some cases, a coolant (e.g., a humidification region liquid inlet stream) may flow through the internal heat exchanger (e.g., the tube coil), and heat may be transferred from the liquid layer(s) of the dehumidification region to the coolant.

Figure 10A:
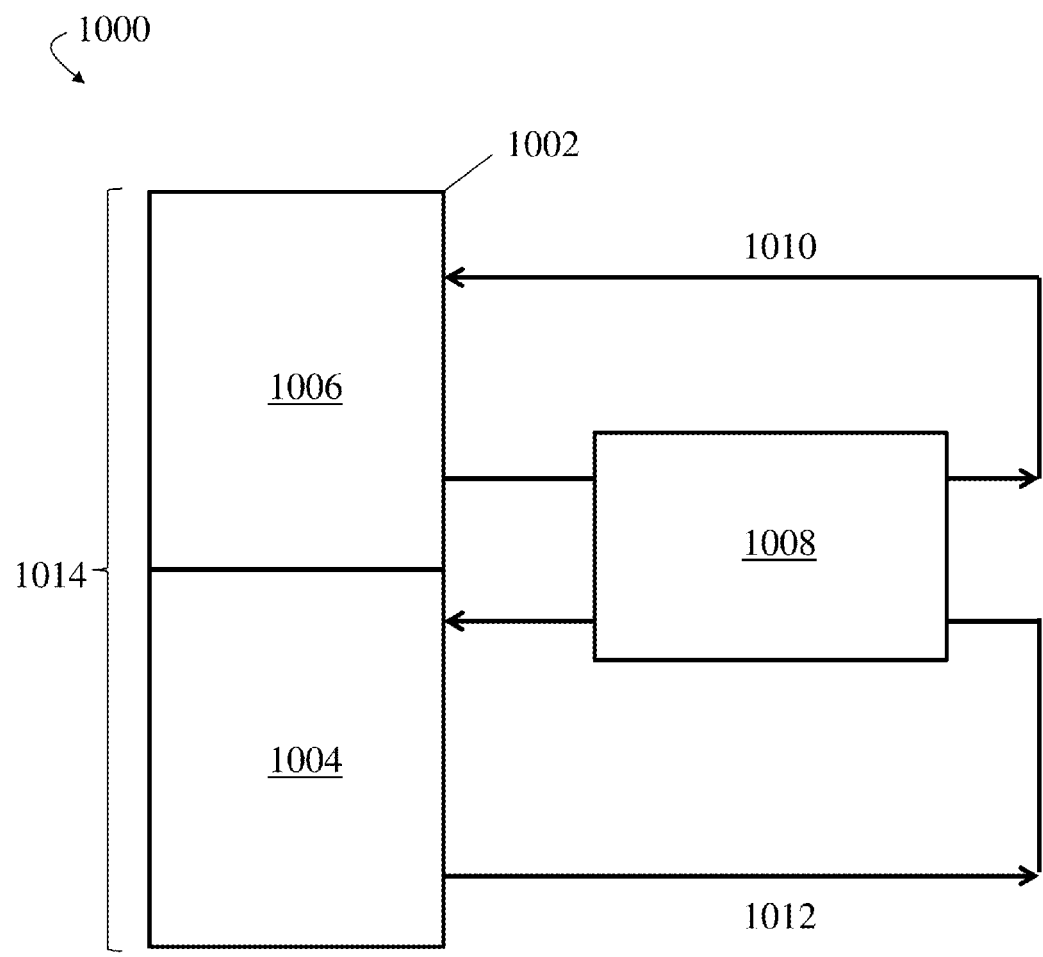
FIG. 10A shows a schematic diagram of an exemplary desalination system comprising a combined HDH apparatus and an external heat exchanger, according to some embodiments.

FIG. 10A shows a schematic diagram of an exemplary embodiment of desalination system 1000 comprising combined HDH (e.g. bubble column) apparatus 1002 and external heat exchanger 1008. Combined HDH apparatus 1002 may comprise vessel 1014 comprising humidification region 1004 and dehumidification region 1006. As shown in FIG. 10A, dehumidification region 1006 is fluidically connected to external heat exchanger 1008 through liquid conduit 1010. In some cases, humidification region 1004 is fluidically connected to external heat exchanger 1008 through liquid conduit 1012. It should be noted that in certain embodiments, humidification region 1004 is not connected to external heat exchanger 1008, and an external cooling fluid may flow through heat exchanger 1008 instead.

In operation, a dehumidification region liquid outlet stream containing an amount of absorbed heat may exit dehumidification region 1006 via conduit 1010 at a temperature $T_1$ and enter external heat exchanger 1008, flowing in a first direction. A humidification region liquid outlet stream may exit humidification region 1004 via conduit 1012 at a temperature $T_2$ and enter external heat exchanger 1008, flowing in a second direction that is substantially opposite to the first direction (e.g., counter-flow). Heat may be transferred from the dehumidification region liquid stream to the humidification region liquid stream within heat exchanger 1008. The dehumidification region liquid stream may then exit heat exchanger 1008 at a temperature $T_3$, where $T_3$ is less than $T_1$, and the humidification region liquid stream may exit heat exchanger 1008 at a temperature $T_4$, where $T_4$ is greater than $T_2$. In some cases, the humidification region liquid stream and dehumidification region liquid stream may flow in substantially parallel directions through heat exchanger 1008. In other embodiments, the humidification region liquid stream and dehumidification region liquid stream may flow in substantially non-parallel directions (e.g., opposite) directions through heat exchanger 1008.

As noted above, in some embodiments, humidification region 1004 is not fluidically connected to heat exchanger 1008. In addition, although FIG. 10A shows liquid conduit 1012 fluidically connecting an outlet of humidification region 1004, heat exchanger 1008, and an inlet of humidification region 1004, such that a stream exits humidification region 1004, flows through heat exchanger 1008, and returns to humidification region 1004, in some cases, system 1000 is instead configured such that heat exchanger 1008 is fluidically connected to a source of a liquid comprising one or more contaminants (not shown). In some cases, liquid exiting humidification region 1004 does not flow through heat exchanger 1008.

Any heat exchanger known in the art may be used. Examples of suitable heat exchangers include, but are not limited to, plate-and-frame heat exchangers, shell-and-tube heat exchangers, tube-and-tube heat exchangers, plate heat exchangers, plate-and-shell heat exchangers, spiral heat exchangers, and the like. In a particular embodiment, the heat exchanger is a plate-and-frame heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). The first fluid stream may comprise, in certain cases, a fluid stream that flows through a dehumidification region (e.g., a dehumidification region liquid stream). In some embodiments, the second fluid stream may comprise a coolant. The first fluid stream and/or the second fluid stream may comprise a liquid. In some embodiments, the heat exchanger may be a liquid-to-liquid heat exchanger. In some cases, more than two fluid streams may flow through the heat exchanger.

The coolant may be any fluid capable of absorbing and transferring heat. Typically, the coolant is a liquid. The coolant may, in some embodiments, include water. In certain cases, the coolant may include salt-containing water. For example, in a humidification-dehumidification system, the coolant stream in the heat exchanger may be used to preheat salt-containing water prior to entry into a humidification region (e.g., the coolant stream may comprise the humidification region liquid inlet stream).

In some embodiments, the heat exchanger may exhibit relatively high heat transfer rates. In some embodiments, the heat exchanger may have a heat transfer coefficient of at least about 150 W/(m² K), at least about 200 W/(m² K), at least about 500 W/(m² K), at least about 1000 W/(m² K), at least about 2000 W/(m² K), at least about 3000 W/(m² K), at least about 4000 W/(m² K), at least about 5000 W/(m² K), at least about 6000 W/(m² K), at least about 7000 W/(m² K), at least about 8000 W/(m² K), at least about 9000 W/(m² K), or at least about 10,000 W/(m² K). In some embodiments, the heat exchanger may have a heat transfer coefficient in the range of at least about 150 W/(m² K) to at least about 5000 W/(m² K), at least about 200 W/(m² K) to about 5000 W/(m² K), at least about 500 W/(m² K) to about 5000 W/(m² K), at least about 1000 W/(m² K) to about 5000 W/(m² K), at least about 2000 W/(m² K) to about 5000 W/(m² K), at least about 3000 W/(m² K) to about 5000 W/(m² K), at least about 4000 W/(m² K) to about 5000 W/(m² K), about 150 W/(m² K) to about 10,000 W/(m² K), about 200 W/(m² K) to about 10,000 W/(m² K), about 500 W/(m² K) to about 10,000 W/(m² K), about 1000 W/(m² K) to about 10,000 W/(m² K), about 2000 W/(m² K) to about 10,000 W/(m² K), about 3000 W/(m² K) to about 10,000 W/(m² K), about 4000 W/(m² K) to about 10,000 W/(m² K), about 5000 W/(m² K) to about 10,000 W/(m² K), about 6000 W/(m² K) to about 10,000 W/(m² K), about 7000 W/(m² K) to about 10,000 W/(m² K), about 8000 W/(m² K) to about 10,000 W/(m² K), or about 9000 W/(m² K) to about 10,000 W/(m² K).

In some embodiments, the heat exchanger may increase the temperature of one or more fluid streams (e.g., the humidification region liquid inlet stream) flowing through the heat exchanger and/or decrease the temperature of one or more fluid streams (e.g., the dehumidification region liquid outlet stream) flowing through the heat exchanger. For example, the difference between the temperature of a fluid entering the heat exchanger and the fluid exiting the heat exchanger may be at least about 5° C., at least about 10° C., at least about 15° C., at least about 20° C., at least about 30° C., at least about 40° C., at least about 50° C., at least about 60° C., at least about 70° C., at least about 80° C., at least about 90° C., or at least about 100° C. In some embodiments, the difference between the temperature of a fluid entering the heat exchanger and the fluid exiting the heat exchanger may be in the range of about 5° C. to about 20° C., about 5° C. to about 30° C., about 5° C. to about 50° C., about 5° C. to about 60° C., about 5° C. to about 90° C., about 5° C. to about 100° C., about 10° C. to about 30° C., about 10° C. to about 60° C., about 10° C. to about 90° C., about 10° C. to about 100° C., about 20° C. to about 60° C., about 20° C. to about 90° C., about 20° C. to about 100° C., about 30° C. to about 60° C., about 30° C. to about 90° C., about 30° C. to about 100° C., about 60° C. to about 90° C., about 60° C. to about 100° C., or about 80° C. to about 100° C.

In some embodiments, an optional external heating device may be arranged in fluid communication with the combined HDH apparatus (e.g., combined bubble column apparatus) and/or the external heat exchanger. In certain cases, the heating device may be arranged such that, in operation, a liquid stream (e.g., a heat exchanger outlet stream, a humidification region liquid inlet stream) is heated in the heating device prior to entering the humidification region of the combined HDH apparatus. In some embodiments, the heating device may be arranged such that a dehumidification region liquid outlet stream is heated in the heating device prior to entering the heat exchanger. Such an arrangement may advantageously increase the amount of heat transferred from the dehumidification region liquid outlet stream to another fluid stream flowing through the heat exchanger (e.g., a humidification region liquid inlet stream).

The heating device may be any device that is capable of transferring heat to a fluid stream. In some cases, the heating device is a heat exchanger. Any heat exchanger known in the art may be used. Examples of suitable heat exchangers include, but are not limited to, plate-and-frame heat exchangers, shell-and-tube heat exchangers, tube-and-tube heat exchangers, plate heat exchangers, plate-and-shell heat exchangers, and the like. In a particular embodiment, the heat exchanger is a plate-and-frame heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter flow), or substantially perpendicular directions (e.g., cross flow). The first fluid stream and/or the second fluid stream may comprise a liquid. In some embodiments, the heating device is a liquid-to-liquid heat exchanger. The first fluid stream may, in some cases, comprise a fluid stream that flows through a humidification region (e.g., a humidification region liquid inlet stream) and/or a fluid stream that flows through a dehumidification region (e.g., a dehumidification region liquid outlet stream). The second fluid stream may, in some cases, comprise a heating fluid. The heating fluid may be any fluid capable of absorbing and transferring heat. In some embodiments, the heating fluid comprises water (e.g., hot, pressurized water). In certain embodiments, heat may be transferred from the second fluid stream (e.g., the heating fluid) to the first stream (e.g., the humidification region liquid inlet stream, the dehumidification liquid outlet stream) in the heat exchanger. In some cases, more than two fluid streams may flow through the heat exchanger.

In some embodiments, the heating device is a heat collection device. The heat collection device may be configured to store and/or utilize thermal energy (e.g., in the form of combustion of natural gas, solar energy, waste heat from a power plant, or waste heat from combusted exhaust). In certain cases, the heating device is configured to convert electrical energy to thermal energy. For example, the heating device may be an electric heater.

The heating device may, in some cases, increase the temperature of one or more fluid streams (e.g., humidification region liquid inlet stream, dehumidification region liquid outlet stream) flowing through the heating device. For example, the difference between the temperature of a fluid entering the heating device and the fluid exiting the heating device may be at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the difference between the temperature of a fluid entering the heating device and the fluid exiting the heating device may be in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 30° C. to about 60° C., about 30° C. to about 90° C., or about 60° C. to about 90° C. In some cases, the temperature of a fluid stream (e.g., humidification region liquid inlet stream, dehumidification region liquid outlet stream) being heated in the heating device remains below the boiling point of the fluid stream.

In some embodiments, a desalination system may comprise two or more heating devices. For example, in some embodiments, a first heating device further heats a humidification region liquid inlet stream after the stream has flowed through a heat exchanger. In some embodiments, a second heating device heats a dehumidification region liquid outlet stream prior to the stream flowing through the heat exchanger. In some embodiments, the second heating device heats the humidification region liquid inlet stream and the first heating device heats the dehumidification region liquid outlet stream. In some embodiments, a single heating device may function as the first heating device and second heating device and heat both the humidification region liquid input stream and the dehumidification region liquid outlet stream. Further, there may be any number of heating devices present in the desalination system.

In some embodiments, an optional external cooling device may be arranged in fluid communication with the combined HDH apparatus (e.g., combined bubble column apparatus) and/or the external heat exchanger. In certain cases, the cooling device may be arranged such that, in operation, a heat exchanger outlet stream (e.g., a cooled dehumidification region liquid outlet stream) is further cooled in the cooling device prior to returning to the combined HDH apparatus (e.g., the dehumidification region of the combined HDH apparatus).

A cooling device generally refers to any device that is capable of removing heat from a fluid stream (e.g., a liquid stream, a gas stream). In some embodiments, the cooling device is a heat exchanger. The heat exchanger may be configured such that a first fluid stream and a second fluid stream flow through the heat exchanger. In some cases, the first fluid stream and the second fluid stream may flow in substantially the same direction (e.g., parallel flow), substantially opposite directions (e.g., counter-flow), or substantially perpendicular directions (e.g., cross flow). In some cases, heat is transferred from a first fluid stream to a second fluid stream. In certain embodiments, the cooling device is a liquid-to-gas heat exchanger. The first fluid stream may, in certain cases, comprise a fluid stream that is part of a loop of condenser liquid flowing between a condenser and a heat exchanger (e.g., a dehumidification region liquid outlet stream). The second fluid stream may, in some cases, comprise a coolant. The coolant may be any fluid capable of absorbing or transferring heat. In some embodiments, the coolant comprises a gas. The gas may, in some cases, comprise air (e.g., ambient air). Heat exchangers that comprise air as a coolant may generally be referred to as air-cooled heat exchangers. In some cases, more than two fluid streams flow through the cooling device. It should also be noted that the cooling device may, in some embodiments, be a dry cooler, a chiller, a radiator, or any other device capable of removing heat from a fluid stream.

The cooling device may, in some cases, decrease the temperature of a fluid stream (e.g., a heat exchanger outlet stream, a dehumidification region liquid outlet stream). In some embodiments, the cooling device decreases the temperature of the fluid stream by at least about 5° C., at least about 10° C., at least about 15° C., at least about 20° C., at least about 30° C., at least about 40° C., at least about 50° C., at least about 60° C., at least about 70° C., at least about 80° C., or, in some cases, at least about 90° C. In some embodiments, the cooling device decreases the temperature of the fluid stream by an amount in the range of about 5° C. to about 30° C., about 5° C. to about 60° C., about 5° C. to about 90° C., about 10° C. to about 30° C., about 10° C. to about 60° C., about 10° C. to about 90° C., about 20° C. to about 30° C., about 20° C. to about 60° C., about 20° C. to about 90° C., about 30° C. to about 60° C., about 30° C. to about 90° C., or about 60° C. to about 90° C.

Figure 10B:
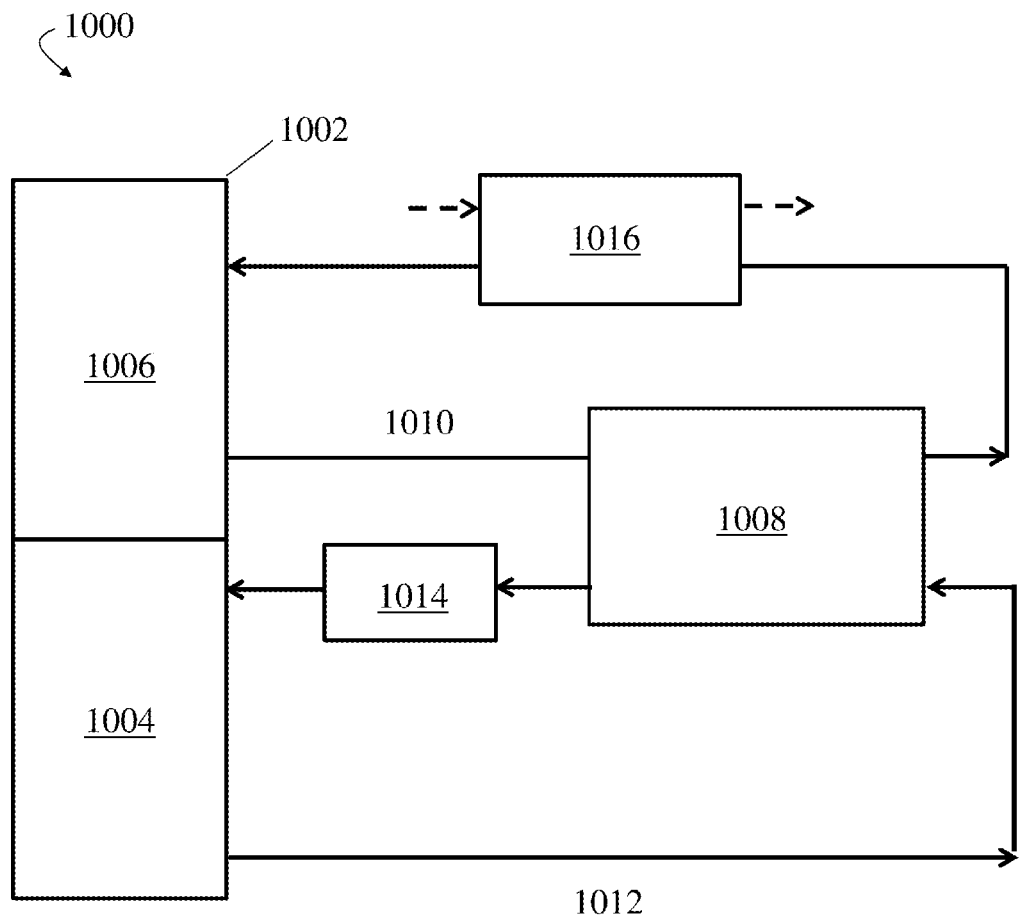
FIG. 10B shows a schematic diagram of an exemplary desalination system comprising a combined HDH apparatus, an external heat exchanger, an external cooling device, and an external heating device, according to some embodiments.

FIG.10B shows an exemplary embodiment of a system 1000 comprising a combined HDH (e.g. bubble column) apparatus 1002, an external heat exchanger 1008, an external heating device 1014, and an external cooling device 1016. Humidification region 1004, heat exchanger 1008, and heating device 1014 are arranged to be in fluid communication with each other through liquid conduit 1012. Dehumidification region 1006, heat exchanger 1008, and cooling device 1016 are arranged to be in fluid communication with each other through liquid conduit 1010.

In operation, in an exemplary embodiment, a humidification region liquid outlet stream may exit humidification region 1004 at a temperature $T_1$ and enter heat exchanger 1008, and a dehumidification region liquid outlet stream may exit dehumidification region 1006 at a temperature $T_2$ and also enter heat exchanger 1008. In some embodiments, the humidification region liquid outlet stream and the dehumidification region liquid outlet stream may flow through heat exchanger 1008 in substantially opposite directions (e.g., heat exchanger 1008 is a counter-flow heat exchanger). As the humidification region liquid outlet stream and dehumidification region liquid outlet stream flow through heat exchanger 1008, heat may be transferred from the dehumidification region liquid outlet stream to the humidification region liquid outlet stream, such that the temperature of the humidification region liquid outlet stream is increased to a temperature $T_3$ greater than temperature $T_1$, and the temperature of the dehumidification region liquid outlet stream is decreased to a temperature $T_4$ lower than temperature $T_2$. The heated humidification region liquid outlet stream may then exit heat exchanger 1008 and flow through heating device 1014 to be further heated, with the temperature of the stream increasing from temperature $T_3$ to a temperature $T_5$, which is greater than temperature $T_3$. The further heated humidification region liquid outlet stream may then be returned to humidification region 1004. Optionally, a first portion of the further heated humidification region liquid outlet stream may be returned to humidification region 1004, and a second portion may be discharged from the system and/or routed to another portion of the system. The cooled dehumidification region liquid outlet stream may exit heat exchanger 1008 and flow through cooling device 1016 to be further cooled, with the temperature of the stream decreasing from temperature $T_4$ to a temperature $T_6$, which is lower than temperature $T_4$. The further cooled dehumidification region liquid outlet stream may then be returned to dehumidification region 1006.

In some embodiments, the desalination system may be fluidically connected to one or more additional devices. For example, the desalination system may be fluidically connected to an optional pre-treatment system and/or an optional precipitation apparatus. In some cases, a pre-treatment system may be configured to remove one or more components from a liquid feed stream entering the desalination system. In some cases, a precipitation apparatus may be configured to precipitate one or more solid salts from a liquid output stream of the desalination system comprising one or more dissolved salts.

Figure 11:
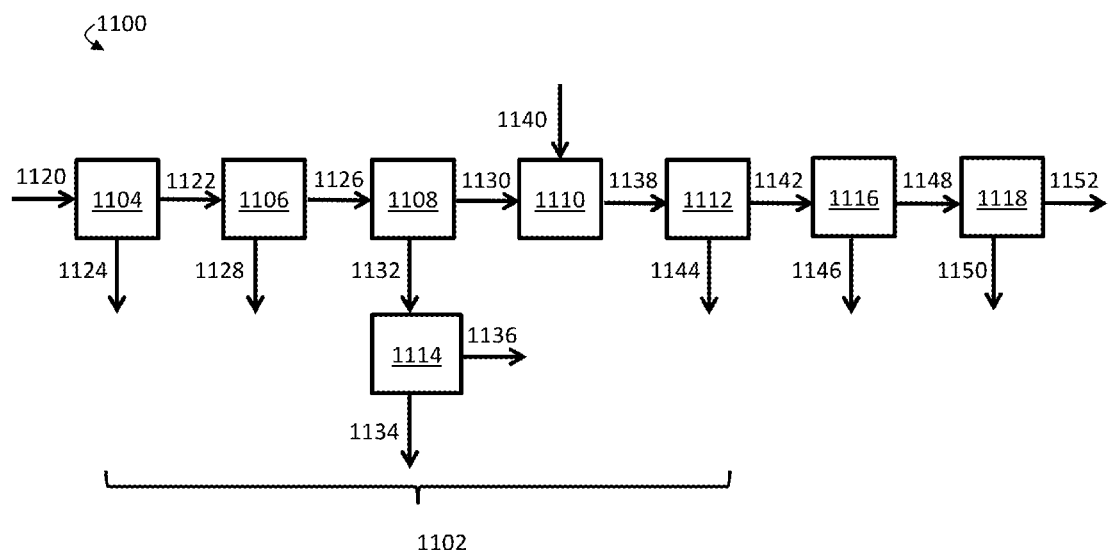
FIG. 11 shows a schematic diagram, according to some embodiments, of an exemplary system comprising a pretreatment system, a desalination system, and a precipitation apparatus.

FIG. 11 is a schematic diagram of exemplary system 1100, according to certain embodiments. In FIG. 11, system 1100 comprises optional pretreatment system 1102, desalination system 1116, and optional precipitation apparatus 1118. As shown in FIG. 11, pretreatment system 1102 comprises optional separation apparatus 1104 configured to remove at least a portion of a suspended and/or emulsified immiscible phase from a liquid stream, optional ion-removal apparatus 1106 configured to remove at least a portion of at least one scale-forming ion from a liquid stream, optional suspended solids removal apparatus 1108 configured to remove at least a portion of suspended solids from a liquid stream, optional pH adjustment apparatus 1110 configured to adjust (i.e. increase or decrease) or maintain/stabilize (e.g.

via buffering) the pH of a liquid stream, optional volatile organic material (VOM) removal apparatus 1112 configured to remove at least a portion of VOM from a liquid stream, and/or optional filtration apparatus 1114 configured to produce a substantially solid material. Each component of system 1100 may be fluidically connected to one or more other components of system 1100, either directly or indirectly. It should be noted that each of the components of system 1100 shown in FIG. 11 is optional, and a system may comprise any combination of the components shown in FIG. 11. In some embodiments, desalination system 1100 further comprises one or more feed tanks and/or one or more storage tanks (e.g., a tank to store substantially pure water) (not shown in FIG. 11).

In operation, liquid feed stream 1120 comprising a suspended and/or emulsified immiscible phase, a scale-forming ion, suspended solids, and/or a volatile organic material is flowed to separation apparatus 1104. Separation apparatus 1104 removes at least a portion of the suspended and/or emulsified immiscible phase to produce immiscible-phase-diminished stream 1122, which contains less of the immiscible phase than stream 1120. In certain embodiments, separation apparatus 1104 also produces immiscible-phase-enriched stream 1124, which contains more of the immiscible phase than stream 1120. Immiscible-phase-diminished stream 1122 is then made to flow to ion-removal apparatus 1106. Ion-removal apparatus 1106 removes at least a portion of at least one scale-forming ion from stream 1122 to produce ion-diminished stream 1126, which contains less of at least one scale-forming ion than immiscible-phase-diminished stream 1122. In certain embodiments, ion-removal apparatus 1106 also produces ion-enriched stream 1128, which contains more of at least one scale-forming ion than immiscible-phase-diminished stream 1122. Ion-diminished stream 1126 is then made to flow to suspended solids removal apparatus 1108. Suspended solids removal apparatus 1108 removes at least a portion of suspended solids from ion-diminished stream 1126 to produce suspended-solids-diminished stream 1130, which contains less suspended solids than ion-diminished stream 1126. Optionally, suspended solids removal apparatus 1108 may also produce suspended-solids-enriched stream 1132, which may be flowed to filtration apparatus 1114 to form solid stream 1134 and filtered liquid stream 1136. Suspended-solids-diminished stream 1130 is then made to flow to pH adjustment apparatus 1110. pH adjustment apparatus 1110 may, in certain cases, increase or decrease the pH of stream 1130 to produce stream 1138. In some cases, chemicals 1140 (e.g., one or more acids) may be added in pH adjustment apparatus 1110 to adjust (e.g., increase or decrease) or maintain/stabilize (e.g., via buffering) the pH of stream 1130. pH-adjusted stream 1138 is then made to flow to VOM removal apparatus 1112. VOM removal apparatus 1112 may remove at least a portion of VOM from pH-adjusted stream 1138 to produce VOM-diminished stream 1142. VOM removal apparatus 1112 may also produce VOM-enriched stream 1144. VOM-diminished stream 1142 is then made to flow to desalination system 1116, which may be configured to remove at least a portion of at least one dissolved salt from VOM-diminished stream 1142. In some cases, desalination system 1116 is configured to produce a substantially pure water stream 1146 and a concentrated brine stream 1148. In certain embodiments, at least a portion of substantially pure water stream 1146 is discharged from system 1100 and/or is recycled and returned to desalination system 1116. In certain cases, at least a portion of concentrated brine stream 1148 is made to flow to precipitation apparatus 1118. Precipitation apparatus 1118 may be configured such that at least a portion of the dissolved salt within concentrated brine stream 1148 is precipitated within precipitation apparatus 1118 to produce solid stream 1150 and water-containing stream 1152, which contains less dissolved salt than concentrated brine stream 1148.

In some cases, the precipitation apparatus comprises a vessel, such as a settling tank. The vessel may include an inlet through which at least a portion of a concentrated saline stream (e.g., a humidification region liquid outlet stream) produced by the desalination system is transported into the precipitation vessel. The precipitation vessel may also include at least one outlet. For example, the precipitation vessel may include an outlet through which a water-containing stream (containing a dissolved salt in an amount that is less than that contained in the inlet stream) is transported. In some embodiments, the precipitation vessel includes an outlet through which solid, precipitated salt is transported.

In some embodiments, the settling tank comprises a low shear mixer. The low shear mixer can be configured to keep the crystals that are formed mixed (e.g., homogeneously mixed) in the concentrated saline stream. According to certain embodiments, the vessel is sized such that there is sufficient residence time for crystals to form and grow. In certain embodiments, the precipitation apparatus comprises a vessel which provides at least 20 minutes of residence time for the concentrated saline stream. As one non-limiting example, the vessel comprises, according to certain embodiments, a 6000 gallon vessel, which can be used to provide 24 minutes of residence in a 500 U.S. barrel per day fresh water production system.

Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments, the precipitation apparatus comprises at least one vessel comprising a volume within which the concentrated saline stream is substantially quiescent. In some embodiments, the flow velocity of the fluid within the substantially quiescent volume is less than the flow velocity at which precipitation (e.g., crystallization) is inhibited. For example, the fluid within the substantially quiescent volume may have, in certain embodiments, a flow velocity of zero. In some embodiments, the fluid within the substantially quiescent volume may have a flow velocity that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a settling tank, where the solids can be allowed to settle. The remaining contents of the aqueous stream can be transported out of the settling tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In some embodiments, the precipitated salt from the precipitation apparatus is fed to a solids-handling apparatus. The solids-handling apparatus may be configured, in certain embodiments, to remove at least a portion of the water retained by the precipitated salt. In some such embodiments, the solids-handling apparatus is configured to produce a cake comprising at least a portion of the precipitated salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt.

It should be noted that while the combined HDH apparatuses described herein have generally been discussed in the context of desalination systems, the apparatuses may be used in other types of systems (e.g., other water treatment/ purification systems). For example, the combined HDH apparatuses may be used in separation processes to separate one or more components of an input liquid stream (e.g., a liquid mixture). In a particular, non-limiting embodiment, the combined HDH apparatuses may be used in distillation systems to distill certain liquids from liquid mixtures (e.g., ionic solutions). Examples of liquids that may be distilled from liquid mixtures using the combined HDH apparatuses described herein include, but are not limited to, ammonia, benzene, toluene, phenol, xylene, naphthalene, xylene, gasoline, methanol, ethanol, propanol, butanol, isopropyl alcohol, propylene glycol, hexane-n, heptane-n, octane-n, cyclohexane, acetic acid, formic acid, nitric acid, carbon tetrachloride, methyl acetate, and/or acetone.

Various of the components described herein can be "directly fluidically connected" to other components. As used herein, a direct fluid connection exists between a first component and a second component (and the two components are said to be "directly fluidically connected" to each other) when they are fluidically connected to each other and the composition of the fluid does not substantially change (i.e., no fluid component changes in relative abundance by more than 5% and no phase change occurs) as it is transported from the first component to the second component. As an illustrative example, a stream that connects first and second system components, and in which the pressure and temperature of the fluid is adjusted but the composition of the fluid is not altered, would be said to directly fluidically connect the first and second components. If, on the other hand, a separation step is performed and/or a chemical reaction is performed that substantially alters the composition of the stream contents during passage from the first component to the second component, the stream would not be said to directly fluidically connect the first and second components.

Other examples of HDH systems are described in U.S. Pat. No. 8,292,272, by Elsharqawy et al., issued Oct. 23, 2012, entitled "Water Separation Under Reduced Pressure"; U.S. Pat. No. 8,465,006, by Elsharqawy et al., issued Jun. 18, 2013, entitled "Separation of a Vaporizable Component Under Reduced Pressure"; U.S. Pat. No. 8,252,092, by Govindan et al., issued Aug. 28, 2012, entitled "Water Separation Under Varied Pressure"; U.S. Pat. No. 8,496,234, by Govindan et al., issued Jul. 30, 2013, entitled "Thermodynamic Balancing of Combined Heat and Mass Exchange Devices"; U.S. Pat. No. 8,523,985, by Govindan et al., issued Sep. 3, 2013, entitled "Bubble-Column Vapor Mixture Condenser"; U.S. Pat. No. 8,778,065, by Govindan et al., issued Jul. 15, 2014, entitled "Humidification-Dehumidification System Including a Bubble-Column Vapor Mixture Condenser"; U.S. Pat. No. 9,072,984, by Govindan et al., issued Jul. 7, 2015, entitled "Bubble-Column Vapor Mixture Condenser"; U.S. Patent Publication No. 2015/0129410, by Govindan et al., filed Sep. 12, 2014, entitled "Systems Including a Condensing Apparatus Such as a Bubble Column Condenser"; and International Patent Publication No. WO 2014/200829, by Govindan et al., filed Jun. 6, 2014, as International Patent Application No. PCT/US2014/041226, and entitled "Multi-Stage Bubble Column Humidifier," the contents of all of which are incorporated herein by reference in their entireties for all purposes.

Also disclosed are inventive methods of operating, controlling, and/or cleaning a desalination system comprising a plurality of desalination units (e.g., HDH desalination units). Certain embodiments, for example, relate to methods of detecting and removing scale from a desalination system comprising a plurality of desalination units (e.g., HDH desalination units). In some embodiments, at least some or all of the plurality of desalination units are mobile HDH desalination units (e.g., HDH desalination units having a relatively low height and/or a relatively small foot print, as described above). In some cases, a desalination system comprising a plurality of mobile HDH desalination units may require less time and/or money to install at a deployment site than a desalination system comprising a single large-capacity desalination unit. For example, in certain cases, each mobile HDH desalination unit may be transported to a deployment site via a shipping trailer and/or shipping container and may require only connection(s) (e.g., fluidic, electronic, and/or electrical connections) to one or more other components (e.g., other mobile HDH desalination units, a central feed tank, a common heating fluid source, a power source) of the desalination system in order to operate. In contrast, a single large-capacity desalination unit may need to be shipped to a deployment site in pieces and may need to be assembled/constructed at the deployment site, which may increase the time and monetary costs associated with system deployment. In addition, a desalination system comprising a plurality of desalination units may advantageously have more operational flexibility than desalination system comprising a single large-capacity desalination unit. For example, in a desalination system comprising a plurality of desalination units, one or more desalination units may be taken offline (e.g., to be cleaned and/or repaired) while one or more desalination units continue to operate, thereby allowing substantially continuous operation of the desalination system (and, therefore, production of desalinated water). In contrast, in a desalination system comprising a single large-capacity desalination unit, cleaning and/or repair of the desalination unit may interrupt operation of the desalination system.

There may be challenges associated with identifying a particular desalination unit of a plurality of desalination units that is fouled (e.g., with scale) and should be cleaned (e.g., by flowing a de-scaling composition through at least a portion of the desalination unit). For example, as described in further detail below, it may be challenging to predict when scale will begin forming within a desalination unit. However, according to certain inventive methods described herein, a control system (e.g., an automated feedback control system) electronically connected to some or all of the plurality of desalination units may monitor one or more measurements (e.g., temperature and/or flow rate measurements) of the desalination units. In some cases, the control system may determine a certain value (e.g., an average value, a relative standard deviation) and may identify a fouled fluidic pathway within a desalination unit based on the value. In some cases, upon identification of a fouled fluidic pathway within a desalination unit, the control system may selectively direct the fouled fluidic pathway to be cleaned (e.g., by selectively flowing a de-scaling composition through the fouled fluidic pathway). In some cases, one or more desalination units that do not contain a fouled fluidic pathway may continue operation while one or more desalination units that contain a fouled fluidic pathway are cleaned.

In some instances, scale can form on one or more surfaces of a desalination unit during a desalination process. Generally, scale formation involves the deposition of solid salts ("scale") from a fluid stream onto a surface that is not transported along with the fluid stream. For example, the deposition of solid salts from a fluid stream flowing through a heat exchanger on a wall of the heat exchanger would be considered scale formation. On the other hand, formation of solid salts on suspended solids that are transported into and out of the heat exchanger during operation of the heat exchanger would not be considered scale formation.

Scale formed within a desalination unit may be any type of scale. In some embodiments, the scale formed within a desalination unit comprises a salt comprising at least one of $Mg^{2+}$, $Ca^{2+}$, $Sr^{2+}$, and/or $Ba^{2+}$. In certain embodiments, the scale that is formed within the desalination unit comprises a salt comprising a carbonate anion ($CO_3^{2-}$), bicarbonate anion ($HCO_3^-$), sulfate anion ($SO_4^{2-}$), bisulfate anion ($HSO_4^-$), dissolved silica (e.g., $SiO_2(OH)_2^{2-}$, $SiO(OH)^{3-}$, $(SiO_3^{2-})_n$, and the like), and/or hydroxide ion ($OH^-$). In some embodiments, the scale that is formed in the desalination unit is a salt comprising at least one of $Mg^{2+}$, $Ca^{2+}$, $Sr^{2+}$, and/or $Ba^{2+}$, and at least one of carbonate anions ($CO_3^{2-}$), bicarbonate anions ($HCO_3^-$), sulfate anions ($SO_4^{2-}$), bisulfate anions ($HSO_4^-$), dissolved silica (e.g., $SiO_2(OH)_2^{2-}$, $SiO(OH)^{3-}$, $(SiO_3^{2-})_n$. In certain embodiments, the scale that is formed in the desalination unit comprises a salt comprising strontium (e.g., $Sr^{2+}$), such as strontium sulfate. In some embodiments, the scale formed within a desalination unit is "hard scale," which, as used herein, refers to precipitated sulfates and precipitated divalent cations such as calcium, magnesium, barium, and strontium. In some embodiments, the scale formed within a desalination unit is "soft scale," which, as used herein, refers to crystalline carbonate salts and/or hydroxide salts.

Scale may form on any surface of a desalination unit. Generally, any surface of the desalination unit that contacts the salt-containing fluid stream during the desalination process is potentially susceptible to scale formation. In some cases, scale may be more likely to form on surfaces of heat exchangers than on surfaces of other components of a desalination unit. For example, in certain instances, elevated surface temperatures and/or comparatively rough surfaces of heat exchangers may make heat exchanger surfaces particularly vulnerable to scale formation. Since scale is often thermally insulating, the formation and build-up of scale on heat exchanger surfaces can result in a substantially detrimental impact on the efficiency of the desalination unit relative to the impact of scale formation on other surfaces, such as surfaces within the humidifier. Thus, reducing the amount of scale present on the surfaces of the heat exchanger(s) of the desalination unit is generally desirable.

Scale formation may be facilitated by a variety of factors, including, but not limited to, temperature variation, flow rate variation, surface roughness, and the presence of co-precipitates. Given the range of factors that may facilitate scale formation, scale may begin to form at different times in different desalination units, even if the desalination units are substantially identical in structure and are operated under substantially identical conditions. Accordingly, it may be challenging to determine when a particular desalination unit of a multi-unit desalination system should undergo a de-scaling process. However, within the context of this invention, certain detection and control methods that may allow identification of desalination units in which scale has begun forming, such that one or more de-scaling compositions may be flowed through those desalination units to at least partially remove scale, have been developed and are described below. In certain embodiments, the temperature and/or flow rate of each heating fluid stream flowing through the plurality of desalination units is measured, and an average temperature and/or flow rate of the heating fluid streams flowing through the plurality of desalination units is calculated. In certain cases, a higher than average temperature and/or a lower than average flow rate in a particular desalination unit may indicate that scale has begun forming in that particular desalination unit, and a de-scaling composition is then selectively flowed through at least a portion of that desalination unit.

Figure 12:
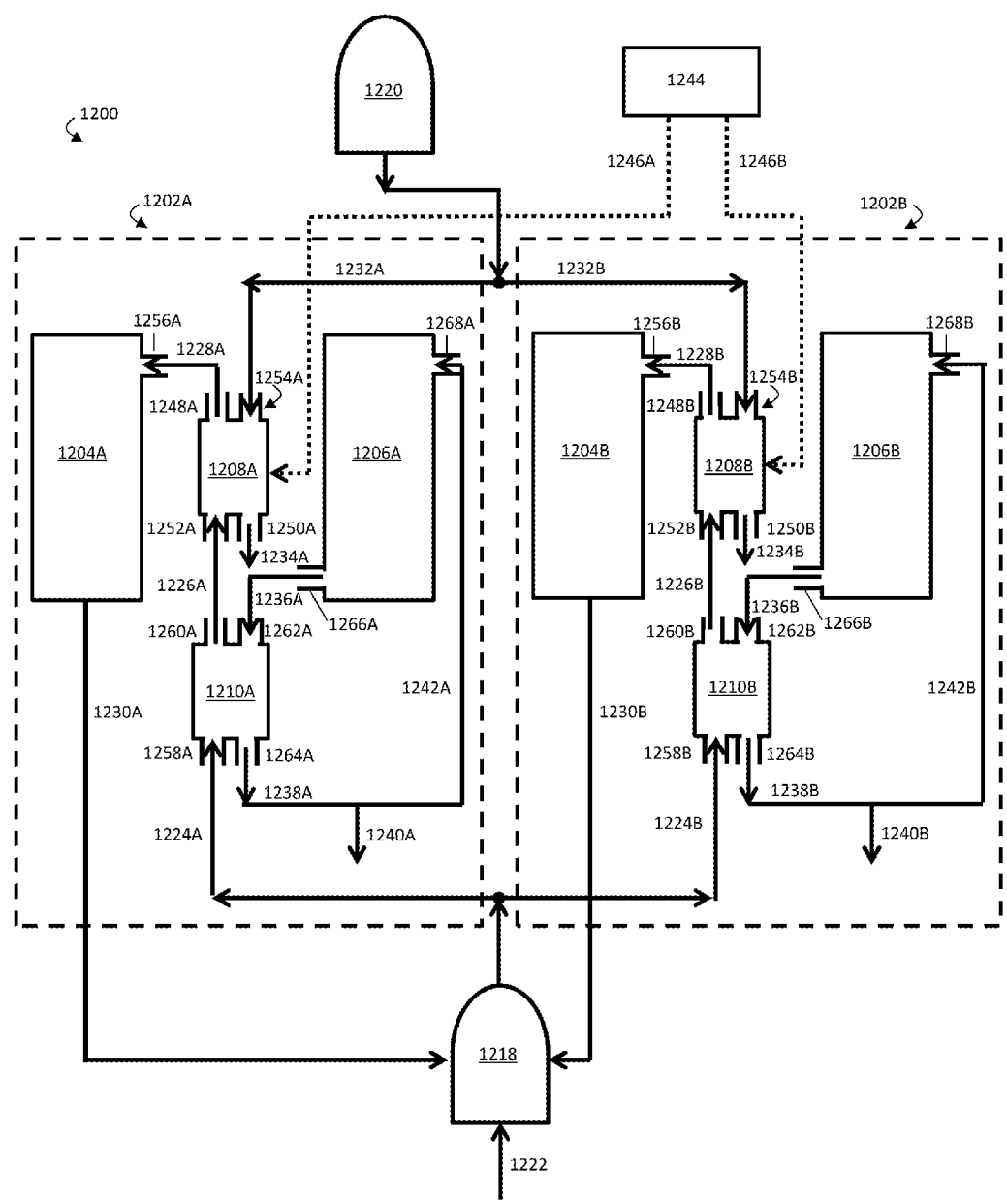
FIG. 12 shows, according to some embodiments, a schematic diagram of an exemplary desalination system comprising a central feed tank, a common heating fluid source, and two HDH desalination units, each HDH desalination unit comprising a humidifier, a dehumidifier, a first heat exchanger, and a second heat exchanger.

In some embodiments, a method of removing scale comprises providing a plurality of desalination units. For example, FIG. 12 is a schematic diagram of an exemplary desalination system 122 comprising a plurality of desalination units. As shown in FIG. 12, exemplary desalination system 1200 comprises first desalination unit 1202A and second desalination unit 1202B. Although 2 exemplary desalination units are illustrated in FIG. 12, it should be understood that a desalination system may comprise any number of additional desalination units. In some embodiments, the plurality of desalination units comprises at least 2 desalination units, at least 3 desalination units, at least 4 desalination units, at least 5 desalination units, at least 10 desalination units, at least 20 desalination units, at least 50 desalination units, or at least 100 desalination units. In some embodiments, the plurality of desalination units comprises between 2 and 100 desalination units, between 3 and 100 desalination units, between 4 and 100 desalination units, between 5 and 100 desalination units, between 10 and 100 desalination units, between 20 and 100 desalination units, or between 50 and 100 desalination units.

The desalination units of the plurality of desalination units may independently be any type of suitable desalination unit. Examples of suitable types of desalination units include, but are not limited to, HDH desalination units, mechanical vapor compression units, multi-effect distillation units, multi-stage flash units, vacuum distillation units, and directional solvent extraction units. In some embodiments, two or more (or all) of the plurality of desalination units are HDH desalination units (e.g., desalination units comprising a humidifier and a dehumidifier). In certain cases, two or more (or all) of the HDH desalination units are mobile HDH desalination units. In certain embodiments, the humidifier (e.g., bubble column humidifier) and dehumidifier (e.g., bubble column condenser) are housed within a single vessel, forming a combined HDH apparatus (e.g., an integrated HDH desalination unit). In certain cases, the vessel has a relatively low height and/or a relatively small footprint. In certain embodiments, the humidifier (e.g., bubble column humidifier) is housed within a first vessel and the dehumidifier (e.g., bubble column condenser) is housed within a second, separate vessel. In certain cases, the first vessel and/or second vessel have a relatively low height and/or a relatively small footprint.

In FIG. 12, first desalination unit 1202A comprises humidifier 1204A, and second desalination unit 1202B comprises humidifier 1204B. The humidifier of each HDH desalination unit of a desalination system may independently be any type of suitable humidifier. Non-limiting examples of suitable humidifiers include bubble column humidifiers and packed bed humidifiers.

In FIG. 12, first desalination unit 1202A further comprises dehumidifier 1206A fluidically connected to humidifier 1204A (fluidic connection not shown in FIG. 12), and second desalination unit 1202B further comprises dehumidifier 1206B fluidically connected to humidifier 1204B (fluidic connection not shown in FIG. 12). The dehumidifier of each HDH desalination unit may independently be any type of suitable dehumidifier. Non-limiting examples of suitable dehumidifiers include bubble column condensers, surface condensers, spray towers, and packed bed towers.

In some embodiments, the two or more HDH desalination units of the plurality of desalination units are heat exchanger-containing desalination units, each heat exchanger-containing desalination unit further comprising a first heat exchanger. For example, in FIG. 12, first desalination unit 1202A further comprises first heat exchanger 1208A, and second desalination unit 1202B further comprises first heat exchanger 1208B. In some embodiments, the first heat exchanger of a desalination unit comprises a first fluidic pathway having an inlet and an outlet and a second fluidic pathway having an inlet and an outlet, and the first heat exchanger is configured to transfer heat between a first fluid stream flowing through the first fluidic pathway and a second fluid stream flowing through the second fluidic pathway.

In certain embodiments, the first fluid stream flowing through the first heat exchanger is a salt-containing water stream. In some cases, the salt-containing water stream comprises seawater, brackish water, flowback water, water produced from an oil or gas extraction process, and/or wastewater. Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or chemical process).

In certain embodiments, the second fluid stream flowing through the first heat exchanger is a heating fluid stream. The heating fluid may be any fluid capable of absorbing and transferring heat. Examples of suitable heating fluids include, but are not limited to, water, air, saturated/superheated steam, synthetic organic-based non-aqueous fluids, glycol, brines, and/or mineral oils.

In some embodiments, the first heat exchanger of a heat exchanger-containing desalination unit is fluidically connected (e.g., directly fluidically connected) to the humidifier of the heat exchanger-containing desalination unit. In certain embodiments, a liquid outlet of the first heat exchanger (e.g., a liquid outlet of the first fluidic pathway) is fluidically connected to a liquid inlet of the humidifier (e.g., a main humidifier liquid inlet). In FIG. 12, for example, liquid outlet 1248A of the first fluidic pathway of first heat exchanger 1208A of first desalination unit 1202A is directly fluidically connected to main humidifier liquid inlet 1256A of humidifier 1204A of first desalination unit 1202A. FIG. 12 also shows liquid outlet 1248B of the first fluidic pathway of first heat exchanger 1208B of second desalination unit 1202B as being directly fluidically connected to main humidifier liquid inlet 1256B of humidifier 1204B of second desalination unit 1202B.

In some embodiments, the first heat exchanger of a heat exchanger-containing desalination unit is further fluidically connected (e.g., directly fluidically connected) to a source of a first fluid stream (e.g., a salt-containing water stream). The source of the first fluid stream may be a common source for all the heat exchanger-containing desalination units of a system. In some cases, for example, the first heat exchanger (e.g., the first fluidic pathway of the first heat exchanger) of each heat exchanger-containing desalination unit is fluidically connected to a common salt-containing water source (e.g., a central feed tank). In FIG. 12, central feed tank 1218, which is configured to receive influent liquid stream 1222, is fluidically connected to first desalination unit 1202A and second desalination unit 1202B. In particular, liquid inlet 1252A of the first fluidic pathway of first heat exchanger 1208A of first desalination unit 1202A and liquid inlet 1252B of the first fluidic pathway of first heat exchanger 1208B of second desalination unit 1202B are both fluidically connected to central feed tank 1218. In some cases, the presence of a central feed tank may allow the salinities of the salt-containing water streams entering the heat exchanger-containing desalination units to be substantially constant. Alternatively, each heat exchanger-containing desalination unit may be fluidically connected to a different salt-containing water source. For example, each heat exchanger-containing desalination unit may comprise its own sump that operates as a feed tank for the desalination unit.

In some embodiments, the first heat exchanger of a heat exchanger-containing desalination unit is further fluidically connected (e.g., directly fluidically connected) to a source of a second fluid stream (e.g., a heating fluid stream). The source of the second fluid stream may be a common source for all the heat exchanger-containing desalination units of a system. In some cases, for example, the first heat exchanger (e.g., the second fluidic pathway of the first heat exchanger) of each heat exchanger-containing desalination units is fluidically connected to a common heating fluid source (e.g., a boiler). In FIG. 12, common heating fluid source 1220 is fluidically connected to first desalination unit 1202A and second desalination unit 1202B. In particular, liquid inlet 1254A of the second fluidic pathway of first heat exchanger 1208A of first desalination unit 1208A and liquid inlet 1254B of the second fluidic pathway of first heat exchanger 1208B of second desalination unit 1208B are both fluidically connected to common heating fluid source 1220. In some cases, the presence of a common heating fluid source may allow the temperatures of the heating fluid streams entering the heat exchanger-containing desalination units to be substantially constant. Alternatively, each heat exchanger-containing desalination unit may be fluidically connected to a different heating fluid source. For example, each heat exchanger-containing desalination units may comprise or be fluidically connected to a different boiler.

In some embodiments, some or all of the heat exchanger-containing desalination units further comprise at least a second heat exchanger fluidically connected to the first heat exchanger. For example, first desalination unit 1202A further comprises second heat exchanger 1210A. In some embodiments, the second heat exchanger of a desalination unit comprises a first fluidic pathway having an inlet and an outlet and a second fluidic pathway having an inlet and an outlet, and the second heat exchanger is configured to transfer heat between a first fluid stream flowing through the first fluidic pathway and a second fluid stream flowing through the second fluidic pathway. In some cases, the second heat exchanger may be referred to as an "energy recovery heat exchanger."

In some embodiments, the first fluid stream flowing through the second heat exchanger is a salt-containing water stream entering the humidifier. In some cases, the second heat exchanger (e.g., a liquid inlet of the first fluidic pathway of the second heat exchanger) is fluidically connected (e.g., directly fluidically connected) to a salt-containing water source (e.g., a central feed tank). In addition, the second heat exchanger may be fluidically connected (e.g., directly fluidically connected) to the first heat exchanger and/or the humidifier. For example, a liquid outlet of the second heat exchanger (e.g., a liquid outlet of the first fluidic pathway of the second heat exchanger) may be fluidically connected (e.g., directly fluidically connected) to a liquid inlet of the first heat exchanger (e.g., a liquid inlet of the first fluidic pathway of the first heat exchanger) and/or a liquid inlet of the humidifier (e.g., a main humidifier liquid inlet). In FIG. 12, for example, second heat exchanger 1210A of first desalination unit 1202A is directly fluidically connected to first heat exchanger 1208A and central feed tank 1218, and second heat exchanger 1210B of second desalination unit 1202B is directly fluidically connected to first heat exchanger 1208B and central feed tank 1218. In particular, in first desalination unit 1202A, liquid inlet 1258A of the first fluidic pathway of second heat exchanger 1210A is fluidically connected to central feed tank 1218, and liquid outlet 1260A of the first fluidic pathway of second heat exchanger 1210A is fluidically connected to liquid inlet 1252A of the first fluidic pathway of first heat exchanger 1208A. In second desalination unit 1202B, liquid inlet 1258B of the first fluidic pathway of second heat exchanger 1210B is fluidically connected to central feed tank 1218, and liquid outlet 1260B of the first fluidic pathway of second heat exchanger 1210B is fluidically connected to liquid inlet 1252B of the first fluidic pathway of first heat exchanger 1208B.

In some embodiments, the second fluid stream flowing through the second heat exchanger is a water stream exiting the dehumidifier. Accordingly, in some cases, the second heat exchanger is fluidically connected (e.g., directly fluidically connected) to the dehumidifier. For example, a liquid inlet (e.g., a liquid inlet of the second fluidic pathway) of the second heat exchanger may be fluidically connected (e.g., directly fluidically connected) to a liquid outlet of the dehumidifier (e.g., a main dehumidifier liquid outlet). In some cases, a liquid outlet (e.g., a liquid outlet of the second fluidic pathway) of the second heat exchanger may be fluidically connected (e.g., directly fluidically connected) to a liquid inlet of the dehumidifier (e.g., a main dehumidifier liquid inlet). In FIG. 12, for example, second heat exchanger 1210A of first desalination unit 1202A is fluidically connected to dehumidifier 1206A, and second heat exchanger 1210B of second desalination unit 1202B is fluidically connected to dehumidifier 1206B. In particular, in first desalination unit 1202A, liquid inlet 1262A of the second fluidic pathway of second heat exchanger 1210A is fluidically connected to main dehumidifier liquid outlet 1266A of dehumidifier 1206A, and liquid outlet 1264A of the second fluidic pathway of second heat exchanger 1210A is fluidically connected to main dehumidifier liquid inlet 1268A of dehumidifier 1206A. In second desalination unit 1202B, liquid inlet 1262B of the second fluidic pathway of second heat exchanger 1210B is fluidically connected to main dehumidifier liquid outlet 1266B of dehumidifier 1206B, and liquid outlet 1264B of the second fluidic pathway of second heat exchanger 1210B is fluidically connected to main dehumidifier liquid inlet 1268B of dehumidifier 1206B.

The first heat exchanger and second heat exchanger of a heat exchanger-containing desalination unit may be any type of heat exchanger known in the art. Examples of suitable heat exchangers include, but are not limited to, plate-and-frame heat exchangers, shell-and-tube heat exchangers, tube-and-tube heat exchangers, plate heat exchangers, plate-and-shell heat exchangers, spiral heat exchangers, and the like. In a particular embodiment, the first heat exchanger and/or second heat exchanger are plate-and-frame heat exchangers. In certain embodiments, the first heat exchanger and/or second heat exchanger are configured such that a first fluid stream and a second fluid stream flow through the first heat exchanger and/or second heat exchanger. In some cases, the first fluid stream and the second fluid stream may flow in substantially the same direction (e.g., parallel flow), substantially opposite directions (e.g., counter flow), or substantially perpendicular directions (e.g., cross flow). In some cases, more than two fluid streams may flow through the first heat exchanger and/or second heat exchanger. In an exemplary embodiment, the first heat exchanger and/or second heat exchanger are counter-flow plate-and-frame heat exchangers. In some cases, a counter-flow plate-and-frame heat exchanger may advantageously result in a small temperature difference between two fluid streams flowing through the heat exchanger. A non-limiting example of a suitable commercially available heat exchanger is Plate Concepts Modu-Flex Plate & Frame Product # MFL041D1PA150-115.

In some embodiments, the first fluid stream and/or second fluid stream flowing through the first heat exchanger and/or the second heat exchanger of a heat exchanger-containing desalination unit comprise a liquid. In some embodiments, the first heat exchanger and/or second heat exchanger are liquid-to-liquid heat exchangers (e.g., the first fluid stream and the second fluid stream comprise a liquid). In some embodiments, the first fluid stream and/or second fluid stream flowing through the first heat exchanger and/or the second heat exchanger comprise a gas (e.g., air or saturated/superheated steam). In certain cases, the first fluid stream and/or second fluid stream do not undergo a phase change (e.g., liquid to gas or vice versa) within the first heat exchanger and/or the second heat exchanger. In some cases, more than two fluid streams flow through the first heat exchanger and/or the second heat exchanger.

In some embodiments, a relatively large amount of heat may be transferred between the first fluid stream and the second fluid stream flowing through the first heat exchanger or the second heat exchanger of a heat exchanger-containing desalination unit and/or a relatively large temperature difference driving force may exist or be established between the first fluid stream and the second fluid stream flowing through the first heat exchanger or the second heat exchanger. For example, the difference between the temperature of a fluid stream entering the first or second heat exchanger and the fluid stream exiting the first or second heat exchanger may be at least about 5° C., at least about 10° C., at least about 15° C., at least about 20° C., at least about 30° C., at least about 40° C., at least about 50° C., at least about 60° C., at least about 70° C., at least about 80° C., or at least about 90° C. In some embodiments, the difference between the temperature of a fluid stream entering the first or second heat exchanger and the temperature of the fluid stream exiting the first or second heat exchanger is in the range of about 5° C. to about 20° C., about 5° C. to about 30° C., about 5° C. to about 50° C., about 5° C. to about 60° C., about 5° C. to about 90° C., about 10° C. to about 30° C., about 10° C. to about 60° C., about 10° C. to about 90° C., about 20° C. to about 60° C., about 20° C. to about 90° C., about 30° C. to about 60° C., about 30° C. to about 90° C., about 50° C. to about 90° C., about 60° C. to about 90° C., or about 70° C. to about 90° C.

In some embodiments, a desalination system comprising a plurality of desalination units further comprises a control system in electronic communication with the desalination units. For example, in certain embodiments, some or all of the first heat exchangers of the desalination units may be coupled to a controller configured to receive an input signal from at least one input device and to deliver an output signal, in response to the input signal, to at least one output device. According to some embodiments, the controller comprises a PID controller that operates according to a proportional-integral-derivative control loop. However, other control loop feedback mechanisms may be used, as would be understood by a person of ordinary skill in the art.

In certain embodiments, the controller (e.g., a PID controller) is coupled (e.g., electronically coupled) to at least one input device and/or at least one output device. In some cases, the at least one input device comprises a sensor configured to monitor a parameter (e.g., temperature, flow rate) associated with a component (e.g., a first heat exchanger) of a desalination unit. In some cases, the at least one input device is positioned within or in proximity to the component (e.g., first heat exchanger) of the desalination unit. The at least one input device may be configured to send an input signal (e.g., corresponding to a measurement taken by the at least one input device) to the controller, and the controller may be configured to receive the input signal. In some cases, the at least one input device regularly or continuously transmits an input signal to the controller. Non-limiting examples of suitable input devices include a dial thermometer, a thermocouple, a paddle wheel flow meter, a rotameter, an ultrasonic flow meter, and a mass flow meter.

In some embodiments, the controller, in response to an input signal received from the at least one input device, delivers an output signal to at least one output device (e.g., to direct operation of the at least one output device). In some cases, the at least one output device comprises a device that affects a parameter (e.g., flow rate) associated with a component (e.g., a first heat exchanger) of a desalination unit. In some embodiments, the at least one output device is in fluidic communication with the component (e.g., first heat exchanger) of the desalination unit. In some embodiments, the at least one output device is positioned within or in proximity to the component (e.g., first heat exchanger) of the desalination unit. In certain embodiments, the at least one output device can direct flow of a fluid stream (e.g., a first liquid stream, a second liquid stream) through the component (e.g., first heat exchanger) of the desalination unit. Non-limiting examples of suitable output devices include a pump, a valve, and/or a mass flow controller.

In FIG. 12, desalination system 1200 comprises control system 1244. As shown in FIG. 12, control system 1244 is electronically connected to first heat exchanger 1208A of first desalination unit 1202A via electronic connection 1246A, and control system 1244 is electronically connected to first heat exchanger 1208B of second desalination unit 1202B via electronic connection 1246B, In some embodiments, the method of removing scale comprises flowing a first fluid stream (e.g., a salt-containing water stream) through a first fluidic pathway of the first heat exchanger of each heat exchanger-containing desalination unit. In some cases, the method comprises flowing a salt-containing water stream from a common salt-containing water source (e.g., a central feed tank) to the first heat exchanger of each heat exchanger-containing desalination unit. For example, referring to FIG. 12, the method may comprise flowing a salt-containing water stream from central feed tank 1218 to liquid inlet 1252A of the first fluidic pathway of first heat exchanger 1208A of first desalination unit 1202A and to liquid inlet 1252B of the first fluidic pathway of first heat exchanger 1208B of second desalination unit 1202B.

In some embodiments, the method of removing scale comprises flowing a second fluid stream (e.g., a heating fluid stream) through a second fluidic pathway of the first heat exchanger of each heat exchanger-containing desalination unit. In some cases, the method comprises flowing a heating fluid stream from a common heating fluid source (e.g., a boiler) to the first heat exchanger of each heat exchanger-containing desalination unit. For example, referring to FIG. 12, the method may comprise flowing heating fluid stream 1232A from common heating fluid source 1220 to liquid inlet 1254A of the second fluidic pathway of first heat exchanger 1208A of first desalination unit 1202A and flowing heating fluid stream 1232B from common heating fluid source 1220 to liquid inlet 1254B of the second fluidic pathway of first heat exchanger 1208B of second desalination unit 1202B. In first heat exchanger 1208A of first desalination unit 1202A, heat may be transferred from heating fluid stream 1232A to salt-containing water stream 1226A (which may have been heated in second heat exchanger 1210A), thereby producing heated salt-containing water stream 1228A and cooled heating fluid stream 1234A. In first heat exchanger 1208B of second desalination unit 1202B, heat may be transferred from heating fluid stream 1232B to salt-containing water stream 1226B (which may have been heated in second heat exchanger 1210B), thereby producing heated salt-containing water stream 1228B and cooled heating fluid stream 1234B.

According to some embodiments, the method further comprises measuring a first temperature of at least two, some, or each of all the second fluid streams of the heat exchangers (e.g., heating fluid streams). In some embodiments, the first temperature of a second fluid stream (e.g., heating fluid stream) is measured downstream of the first heat exchanger. In certain cases, for example, the first temperature of a second fluid stream flowing through a heat exchanger-containing desalination unit is measured at a liquid outlet of the second fluidic pathway of the first heat exchanger of the heat exchanger-containing desalination unit. Referring to FIG. 12, the first temperature of heating fluid stream 1234A may be measured at liquid outlet 1250A of first heat exchanger 1208A of first desalination unit 1202A, and the first temperature of heating fluid stream 1234B may be measured at liquid outlet 1250B of first heat exchanger 1208A of second desalination unit 1202B. However, the first temperature of the second fluid stream may be measured at other locations downstream of the first heat exchanger.

In some cases, the first temperature of the second fluid stream (e.g., heating fluid stream) may be measured using an input device configured to send a signal to a control system.

The input device may be any suitable temperature measurement device known in the art. Non-limiting examples of suitable temperature measurement devices include dial thermometers and thermocouples. In some cases, the temperature of a fluid stream (e.g., the second fluid stream) may be relatively easy to monitor because the temperature displayed by a temperature measurement device (e.g., a dial thermometer, a thermocouple) may change relatively slowly. In certain cases, temperature measurements may be relatively resistant to minor fluctuations, and, accordingly, may be more reliable than other types of measurements.

In some cases, the method further comprises determining an average first temperature of at least two, some, or all the first temperatures of the second fluid streams measured in the measuring step. As used herein, the average first temperature of the second fluid streams refers to the number average of the first temperatures of the second fluid streams (e.g., the sum of the first temperatures of all the second fluid streams divided by the number of second fluid streams). In some embodiments, the step of determining the average first temperature is performed by the controller of a control system.

In some cases, the method further comprises identifying at least one fouled first fluidic pathway. In certain cases, scale formation within the first heat exchanger (e.g., the first fluidic pathway of the first heat exchanger) of a desalination unit may cause the first temperature of a second fluid stream (e.g., heating fluid stream) exiting the first heat exchanger to increase (e.g., due to the thermally insulating effects of scale). For example, the presence of scale within the first heat exchanger may result in less heat per volume of the second fluid stream (e.g., heating fluid stream) being transferred to the first fluid stream (e.g., salt-containing water stream) flowing through the first heat exchanger, thereby causing the temperature of the second fluid stream exiting the first heat exchanger to be greater than the temperature of a second fluid stream flowing through a first heat exchanger without scale. Accordingly, in some cases, a relatively high temperature of a second fluid stream exiting a first heat exchanger may be used to identify a fouled first fluidic pathway of a first heat exchanger. In some embodiments, a fouled first fluidic pathway of a first heat exchanger is characterized by a first temperature of a second fluid stream that differs from (e.g., is greater than) the average first temperature of the second fluid streams by at least about 5%, at least about 10%, at least about 20%, at least about 30%, at least about 40%, at least about 50%, at least about 75%, at least about 100%, at least about 125%, or at least about 150% on the Kelvin scale. In certain embodiments, a fouled first fluidic pathway of a first heat exchanger is characterized by a first temperature of a second fluid stream that differs from (e.g., is greater than) the average first temperature of the second fluid streams by an amount in the range of about 5% to about 150%, about 10% to about 150%, about 20% to about 150%, about 30% to about 150%, about 40% to about 150%, about 50% to about 150%, about 75% to about 150%, or about 100% to about 150% on the Kelvin scale. For example, this can be determined by taking the first temperature of each second fluid stream, converting to Kelvin if necessary, calculating the average first temperature of the second fluid streams in Kelvin, and calculating the percent difference between the first temperature in Kelvin of a second fluid stream and the average first temperature in Kelvin of the second fluid streams.

According to some embodiments, the method further comprises measuring a first temperature of each first fluid stream (e.g., salt-containing water stream). In some embodiments, the first temperature of a first fluid stream (e.g., salt-containing water stream) is measured downstream of the first heat exchanger. In certain cases, for example, the first temperature of a first fluid stream flowing through a heat exchanger-containing desalination unit is measured at a liquid outlet of the first fluidic pathway of the first heat exchanger. Referring to FIG. 12, the first temperature of heated salt-containing water stream 1228A may be measured at liquid outlet 1248A of the first fluidic pathway of first heat exchanger 1208A of first desalination unit 1202A, and the first temperature of heated salt-containing water stream 1228B may be measured at liquid outlet 1248B of the first fluidic pathway of first heat exchanger 1208B of second desalination unit 1202B. However, the first temperature of the first fluid stream may be measured at other locations downstream of the first heat exchanger. For example, in certain embodiments, the first temperature of a first fluid stream (e.g., salt-containing water stream) may be measured at a liquid inlet of the humidifier (e.g., liquid inlet 1256A or 1256B in FIG. 12) and/or at a point along a conduit between the first heat exchanger and the humidifier.

In some cases, the first temperature of the first fluid stream (e.g., salt-containing water stream) may be measured using an input device configured to send a signal to a control system. The input device may be any suitable temperature measurement device known in the art. Non-limiting examples of suitable temperature measurement devices include dial thermometers and thermocouples.

In some cases, the method further comprises determining an average first temperature of all the first temperatures of the first fluid streams. As used herein, the average first temperature of the first fluid streams refers to the number average of the first temperatures of the first fluid streams (e.g., the sum of the first temperatures of all the first fluid streams divided by the number of first fluid streams). In some embodiments, the step of determining the average first temperature is performed by the controller of a control system.

In some cases, the method further comprises identifying at least one fouled first fluidic pathway. In some cases, scale formation within the first heat exchanger of a desalination unit may cause the first temperature of a first fluid stream (e.g., a salt-containing water stream) exiting the first heat exchanger of the desalination unit to decrease (e.g., due to the thermally insulating effects of scale). For example, the presence of scale within the first heat exchanger may result in less heat per volume of the second fluid stream (e.g., heating fluid stream) being transferred to the first fluid stream (e.g., salt-containing water stream) flowing through the first heat exchanger, thereby causing the temperature of the first fluid stream exiting the first heat exchanger to be less than the temperature of a first fluid stream flowing through a first heat exchanger without scale. Accordingly, in some cases, a relatively low first temperature of a first fluid stream exiting a first heat exchanger may be used to identify a fouled first fluidic pathway. In some embodiments, a fouled first fluidic pathway of a first heat exchanger may be characterized by a first temperature of a first fluid stream that differs from (e.g., is less than) the average first temperature of the first fluid streams by at least about 5%, at least about 10%, at least about 20%, at least about 30%, at least about 40%, at least about 50%, at least about 75%, at least about 100%, at least about 125%, or at least about 150% on the Kelvin scale. In certain embodiments, a fouled first fluidic pathway of a first heat exchanger may be characterized by a first temperature of a first fluid stream that differs from (e.g., is less than) the average first temperature of the first fluid streams by an amount in the range of about 5% to about 150%, about 10% to about 150%, about 20% to about 150%, about 30% to about 150%, about 40% to about 150%, about 50% to about 150%, about 75% to about 150%, or about 100% to about 150% on the Kelvin scale.

According to some embodiments, the method further comprises increasing a flow rate of a second fluid stream (e.g., a heating fluid stream) flowing through a first heat exchanger of a desalination unit if the first temperature of a first fluid stream (e.g., a salt-containing water stream) flowing through the desalination unit falls below a threshold temperature. For example, increasing the flow rate of the second fluid stream may increase the amount of heat transferred to the first fluid stream over a particular time period, thereby compensating for the presence of scale and increasing the first temperature of the first fluid stream such that it is at or above the threshold temperature.

In certain embodiments, the step of increasing the flow rate of a second fluid stream (e.g., a heating fluid stream) is performed by the control system. In some cases, the control system is configured to maintain a relatively constant temperature of the first fluid stream (e.g., salt-containing water stream) exiting the first heat exchanger. In certain cases, if the first temperature of the first fluid stream falls below a threshold temperature (e.g., a temperature programmed into the control system), the flow rate of the second fluid stream (e.g., heating fluid stream) may be increased to transfer additional heat to the first fluid stream and thereby increase the temperature of the first fluid stream exiting the first heat exchanger.

According to some embodiments, the method further, or alternatively, comprises measuring a first flow rate of at least two, some, or each of all the second fluid streams (e.g., heating fluid streams) of the heat exchangers. In some embodiments, the first flow rate of a second fluid stream (e.g., heating fluid stream) is measured downstream of the first heat exchanger. In certain cases, for example, the first flow rate of a second fluid stream (e.g., heating fluid stream) flowing through a heat exchanger-containing desalination unit is measured at a liquid outlet of the second fluidic pathway of the first heat exchanger of the desalination unit. Referring to FIG. 12, the first flow rate of heating fluid stream 1234A may be measured at liquid outlet 1250A of first heat exchanger 1208A of first desalination unit 1202A, and the first flow rate of heating fluid stream 1234B may be measured at liquid outlet 1250B of first heat exchanger 1208A of second desalination unit 1202B. However, the first flow rate may be measured at other locations downstream of the first heat exchanger.

In some cases, the first flow rate of the second fluid stream (e.g., heating fluid stream) may be measured using an input device configured to send a signal to a control system. The input device may be any suitable flow rate measurement device known in the art. Non-limiting examples of suitable flow rate measurement devices include paddle wheel flow meters, rotameters, ultrasonic flow meters, and mass flow meters. In some embodiments, the first flow rate refers to a mass flow rate. In some embodiments, the first flow rate refers to a volumetric flow rate.

In some embodiments, the method further comprises determining an average first flow rate of at least two, some, or all the first flow rates of the second fluid streams. As used herein, the average first flow rate of the second fluid streams refers to the number average of the first flow rates of the second fluid streams (e.g., the sum of the first flow rates of all the second fluid streams divided by the number of second fluid streams). In some embodiments, the step of determining the average first flow rate is performed by the controller of a control system.

In some cases, the method further comprises identifying at least one fouled first fluidic pathway. In some cases, scale formation within the first heat exchanger of a desalination unit may cause the first flow rate of a second fluid stream unit (e.g., heating fluid stream) exiting the first heat exchanger of the desalination unit to increase. For example, the presence of scale within the first heat exchanger may result in less heat per volume of the second fluid stream (e.g., heating fluid stream) being transferred to the first fluid stream (e.g., salt-containing water stream) flowing through the first heat exchanger, thereby causing the first temperature of the first fluid stream to be relatively low. As noted above, in certain embodiments, if the first temperature of the first fluid stream falls below a threshold temperature, the flow rate of the second fluid stream may be increased to compensate. Accordingly, a relatively high first flow rate of a second fluid stream exiting a first heat exchanger may indicate the presence of scale within the first heat exchanger. Therefore, in some embodiments, a fouled first fluidic pathway may be characterized by a flow rate of a second fluid stream that differs from (e.g., is greater than) the average first flow rate of the second fluid streams by at least about 5%, at least about 10%, at least about 20%, at least about 30%, at least about 40%, at least about 50%, at least about 75%, at least about 100%, at least about 125%, or at least about 150%. In certain embodiments, a fouled first fluidic pathway may be characterized by a flow rate of a second fluid stream that differs from (e.g., is greater than) the average first flow rate of the second fluid streams by an amount in the range of about 5% to about 150%, about 10% to about 150%, about 20% to about 150%, about 30% to about 150%, about 40% to about 150%, about 50% to about 150%, about 75% to about 150%, or about 100% to about 150%.

According to some embodiments, the method further comprises measuring a second temperature of at least two, some, or each of all the second fluid streams (e.g., heating fluid streams) flowing through the heat exchanger-containing desalination units. In some embodiments, the second temperature of a second fluid stream (e.g., heating fluid stream) flowing through a heat exchanger-containing desalination unit is measured upstream of the first heat exchanger. In certain cases, for example, the second temperature of a second fluid stream (e.g., heating fluid stream) is measured at a liquid inlet of the second fluidic pathway of the first heat exchanger. Referring to FIG. 12, the second temperature of heating fluid stream 1232A may be measured at liquid inlet 1254A of the second fluidic pathway of first heat exchanger 1208A of first desalination unit 1202A, and the second temperature of heating fluid stream 1232B may be measured at liquid inlet 1254B of first heat exchanger 1208B of second desalination unit 1202B. However, the second temperature of the second fluid stream may be measured at other locations upstream of the first heat exchanger.

In some cases, the second temperature of the second fluid stream (e.g., heating fluid stream) may be measured using an input device configured to send a signal to a control system. The input device may be any suitable temperature measurement device known in the art. Non-limiting examples of suitable temperature measurement devices include dial thermometers and thermocouples.

In some embodiments, the method further comprises measuring and determining a relative standard deviation of at least two, some, or all the second temperatures of the second fluid streams (e.g., heating fluid streams). A standard deviation of the second temperatures of the second fluid streams (e.g., heating fluid streams) can be determined according to Equation (1):

$$\sigma = \sqrt{\frac{1}{N}\sum_{i=1}^{N}(x_i - \bar{x})^2} \quad (1)$$

where N is the number of measured temperatures of the second fluid streams, $\bar{x}$ is the mean second temperature, and $x_i$ is the second temperature of the $i^{th}$ second fluid stream. In certain cases, a relative standard deviation of the second temperatures of the second fluid streams can be determined according to Equation (2):

$$\% RSD = \frac{\sigma}{\bar{x}} \times 100 \quad (2)$$

where σ is the standard deviation of the second temperatures of the second fluid streams (as determined according to Equation (1)) and $\bar{x}$ is the mean second temperature. In some embodiments, the relative standard deviation of the second temperatures of the second fluid streams (e.g., heating fluid streams) flowing through the heat exchanger-containing desalination units is controlled and maintained (e.g. through the above described methods of fouling detection and descaling methods described in greater detail below) to be about 50% or less, about 40% or less, about 30% or less, about 20% or less, about 10% or less, about 5% or less, or about 1% or less. In some embodiments, the relative standard deviation of the second temperatures of the second fluid streams (e.g., heating fluid streams) is in a range between about 1% to about 50%, about 1% to about 40%, about 1% to about 30%, about 1% to about 20%, about 1% to about 10%, or about 1% to about 5%. In certain embodiments, the second temperatures of the second fluid streams (e.g., heating fluid streams) may be substantially similar because a common source of the second fluid streams (e.g., a boiler) supplies a second fluid stream to each heat exchanger-containing desalination unit. In certain embodiments, the step of measuring and determining the relative standard deviation is performed by the controller of a control system.

According to some embodiments, the method further comprises measuring a second temperature of at least two, some or each of all first fluid streams (e.g., salt-containing water streams) flowing through the heat exchanger-containing desalination units. In some embodiments, the second temperature of a first fluid stream (e.g., salt-containing water stream) flowing through a heat exchanger-containing desalination unit is measured upstream of the first heat exchanger. In certain cases, for example, the second temperature of a first fluid stream (e.g., salt-containing water stream) is measured at a liquid inlet of the first fluidic pathway of the first heat exchanger. Referring to FIG. 12, the second temperature of salt-containing water stream 1226A may be measured at liquid inlet 1252A of the first fluidic pathway of first heat exchanger 1208A of first desalination unit 1202A, and the second temperature of salt-containing water stream 1226B may be measured at liquid inlet 1252B of the first fluidic pathway of first heat exchanger 1208B of second desalination unit 1202B.

In some cases, the second temperature of the first fluid stream (e.g., salt-containing water stream) may be measured using an input device configured to send a signal to a control system. The input device may be any suitable temperature measurement device known in the art. Non-limiting examples of suitable temperature measurement devices include dial thermometers and thermocouples.

In some embodiments, the second temperatures of the first fluid streams entering the heat exchanger-containing desalination units are controlled/maintained to be substantially constant. In some embodiments, for example, the relative standard deviation of the second temperatures of the first fluid streams (e.g., salt-containing water streams) flowing through the heat exchanger-containing desalination units is less than about 50%, less than about 40%, less than about 30%, less than about 20%, less than about 10%, less than about 5%, or less than about 1%. In some embodiments, the relative standard deviation of the second temperatures of the first fluid streams (e.g., salt-containing water streams) is in the range of about 1% to about 50%, about 1% to about 40%, about 1% to about 30%, about 1% to about 20%, about 1% to about 10%, or about 1% to about 5%.

In some embodiments, the method further comprises selectively flowing a de-scaling composition through only the at least one first fluidic pathway(s) determined, e.g., by the fouling detection methods described above, to be fouled to an extent warranting regeneration (e.g., cleaning). In some cases, a de-scaling composition may be flowed through a fouled first fluidic pathway of a first heat exchanger of a desalination unit after a desalination process has been performed within the desalination unit.

A general summary of the operation of an exemplary desalination system, such as the one illustrated in FIG. 12, follows. In operation, a salt-containing water stream 1222 may enter desalination system 1200 through central feed tank 1218. From central feed tank 1218, a first salt-containing water stream 1224A may be directed to flow to second heat exchanger 1210A of first desalination unit 1202A, and a second salt-containing water stream 1224B may be directed to flow to second heat exchanger 1210B of second desalination unit 1202B. In second heat exchanger 1210A of first desalination unit 1202A, heat may be transferred from water stream 1236A exiting dehumidifier 1206A to first salt-containing water stream 1224A to produce heated salt-containing water stream 1226A. Similarly, in second heat exchanger 1210B of second desalination unit 1202B, heat may be transferred from water stream 1236B exiting dehumidifier 1206B to second salt-containing water stream 1224B to produce heated salt-containing water stream 1226B. Heated salt-containing water streams 1226A and 1226B may then directed to flow to first heat exchangers 1208A and 1208B, respectively. At the same time, first heating fluid stream 1232A and second heating fluid stream 1232B may be directed to flow from common heating fluid source 1220 to first heat exchangers 1208A and 1208B, respectively. In first heat exchanger 1208A of first desalination unit 1202A, heated salt-containing water stream 1226A may flow in a first direction through a first fluidic pathway of first heat exchanger 1208A, and first heating fluid stream 1232A may flow in a second, substantially opposite direction through a second fluidic pathway of first heat exchanger 1208A. As the two fluid streams flow through first heat exchanger 1208A, heat may be transferred from first heating fluid stream 1232A to heated salt-containing water stream 1226A to produce further heated salt-containing water stream 1228A. Similarly, in first heat exchanger 1208B of second desalination unit 1202B, heated salt-containing water stream 1226B may flow in a first direction through a first fluidic pathway of first heat exchanger 1208B, and second heating fluid stream 1232B may flow in a second, substantially opposite direction through a second fluidic pathway of first heat exchanger 1208B. As the two fluid streams flow through first heat exchanger 1208B, heat may be transferred from second heating fluid stream 1232B to heated salt-containing water stream 1226B to produce further heated salt-containing water stream 1228B.

According to some embodiments, a first temperature of each of streams 1228A and 1228B is measured. In some cases, for example, the first temperatures of streams 1228A and 1228B are measured at liquid outlets (e.g., liquid outlets of the first fluidic pathways) of first heat exchangers 1208A and 1208B. In certain embodiments, if the first temperature of stream 1228A or 1228B is below a certain threshold, an automated feedback control system in electronic communication with first desalination unit 1202A and second desalination unit 1202B increases the flow rate of heating fluid streams 1232A or 1232B to increase the first temperature of stream 1228A or 1228B.

In some embodiments, a first temperature of each of heating fluid streams 1234A and 1234B is measured. In some cases, for example, the first temperatures of heating fluid streams 1234A and 1234B are measured at liquid outlets (e.g., liquid outlets of the second fluidic pathways) of first heat exchangers 1208A or 1208B. In certain embodiments, an average first temperature of the heating fluid streams is determined. In certain cases, if the first temperature of heating fluid stream 1234A or 1234B differs from (e.g., is greater than) the average first temperature by a certain amount (e.g., at least about 10% on the Kelvin scale), the first fluidic pathway of the corresponding first heat exchanger is identified as being fouled. In some cases, a de-scaling composition is selectively flowed through the fouled first fluidic pathway.

In some embodiments, a first flow rate of each of heating fluid streams 1234A and 1234B is measured. In some cases, for example, the first flow rates of heating fluid streams 1234A and 1234B are measured at liquid outlets (e.g., liquid outlets of the second fluidic pathways) of first heat exchangers 1208A or 1208B. In certain embodiments, an average first flow rate of the heating fluid streams is determined. In certain cases, if the first flow rate of heating fluid stream 1234A or 1234B differs from (e.g., is greater than) the average first flow rate by a certain amount (e.g., at least about 10%), the first fluidic pathway of the corresponding first heat exchanger is identified as being fouled. In some cases, a de-scaling composition is selectively flowed through the fouled first fluidic pathway.

According to some embodiments, the de-scaling composition is a liquid composition (e.g., an aqueous composition, a non-aqueous composition) comprising a multidentate ligand. In some cases, the de-scaling composition is directed to flow from a source of the de-scaling composition through at least one fouled first fluidic pathway (e.g., a first fluidic pathway of at least one first heat exchanger). In some such embodiments, scale on a surface of the first heat exchanger can be at least partially removed by exposing the scale to the de-scaling composition comprising the at least one multidentate ligand. In certain embodiments, the multidentate ligand and a cationic species within the scale on the solid surface form a coordination complex that is substantially soluble in the de-scaling composition. Without wishing to be bound by any particular theory, it is believed that the multidentate ligands can interact with ions already bonded in crystalline structures of the scale, and that this interaction can force the metal cation out of its existing structure and into a central position within the coordination complex, causing the scale to dissolve. After the multidentate ligand forms the coordination complex with the cationic species, the coordination complex can be dissolved in the de-scaling composition, and the scale can be removed from the solid surface of the heat exchanger. As one particular example, the strontium cation in strontium sulfate scale can be chelated using a multidentate ligand such as diethylenetriaminepentaacetic acid (DTPA). The chelated ions generally have a high solubility in water, and thus, will generally dissolve in an aqueous de-scaling composition. After dissolving in the de-scaling composition, the dissolved complexes can be transported away by purging the de-scaling composition from the heat exchanger.

It should be understood that the use of the phrases "de-scaling" and "de-scaling composition" are not meant to imply that complete removal of all scale from the surface(s) of the heat exchanger(s) is necessarily achieved (although, in some embodiments, complete or substantially complete removal of scale from the heat exchanger(s) may be achieved). In some cases, the de-scaling composition can be used to perform a de-scaling operation such that only a portion of the scale is removed from the surface(s) of the heat exchanger(s).

Any multidentate ligand that can form a complex with one or more ions of a scale-forming salt can potentially be used in the de-scaling composition used to remove scale from the heat exchanger(s). The term "multidentate ligand," as used herein, refers to a ligand that is capable of forming a coordination complex with a central ion such that multiple parts of the ligand molecule interact with the central ion of the coordination complex. Those of ordinary skill in the art are familiar with the concept of multidenticity in the context of ligands. Multidentate ligands are sometimes also referred to by those of ordinary skill in the art as multivalent ligands. In some embodiments, the multidentate ligand can comprise a bidentate ligand (i.e., a ligand with two parts that each interact with the central ion in a coordination complex), a tridentate ligand (i.e., a ligand with three parts that each interact with the central ion in a coordination complex), a tetradentate ligand (i.e., a ligand with four parts that each interact with the central ion in a coordination complex), a pentadentate ligand (i.e., a ligand with five parts that each interact with the central ion in a coordination complex), a hexadentate ligand (i.e., a ligand with six parts that each interact with the central ion in a coordination complex), a heptadentate ligand (i.e., a ligand with seven parts that each interact with the central ion in a coordination complex), and/or an octadentate ligand (i.e., a ligand with eight parts that each interact with the central ion in a coordination complex). Examples of multidentate ligands that can be used include, but are not limited to, triphosphate; nitrilotriacetic acid (NTA); inosine triphosphate; 3,4-dihydroxybenzoic acid; uridine triphosphate; ATP; citric acid; oxalic acid; ADP; kojic acid; trimetaphosphate; maleic acid; globulin; casein; albumin; adipic acid; fumaric acid; malic acid; (+)-tartaric acid; glutamic acid; citraconic acid; itaconic acid; succinic acid; aspartic acid; glutaric acid; ethylenediaminetetraacetic acid (EDTA); and diethylenetriaminepentaacetic acid (DTPA).

In certain embodiments, the de-scaling composition used to remove scale from the heat exchanger(s) comprises diethylenetriaminepentaacetic acid (DTPA). DTPA can be a strong chelant and has been observed to form coordinated complexes with strengths up to 100 times greater than the strengths of those formed using EDTA. Without wishing to be bound by any particular theory, it is believed that the strength of DTPA as a chelating agent may be due to its unusually high denticity. For example, at high pH values, DTPA can become a penta-anion, DTPA$^{5-}$, and it is believed that each of the DTPA anion's three nitrogen centers and five COO$^-$ groups can act as a center for coordination, making DTPA an octadentate ligand.

In some embodiments, the de-scaling composition contains multidentate ligand(s) in an amount of at least about 10 wt %, at least about 20 wt %, at least about 30 wt %, at least about 40 wt %, at least about 45 wt %, at least about 50 wt %, or more. In certain embodiments, the de-scaling composition contains multidentate ligand(s) in an amount of less than about 80 wt %, less than about 75 wt %, less than about 70 wt %, less than about 65 wt %, less than about 60 wt %, or less than about 55 wt %.

In some embodiments, the de-scaling composition contains DTPA in an amount of at least about 10 wt %, at least about 20 wt %, at least about 30 wt %, at least about 40 wt %, or at least about 45 wt % (and/or in some embodiments, up to about 50 wt %, up to about 55 wt %, up to about 60 wt %, up to about 60 wt %, or more).

According to certain embodiments, the de-scaling composition used to remove scale from a solid surface of the heat exchanger comprises oxalate anions. Without wishing to be bound by any particular theory, it is believed that the combination of oxalate anions and at least one other multidentate ligand exhibits a synergy that allows the combination of these chemicals to remove much more scale than could be removed using either of the two chemicals alone. In particular, it is believed that, in some cases in which the oxalate anions have a geometry that is different from the geometry of the other multidentate ligand, the different molecular geometry exhibited by the oxalate anions may increase the rate of chelation/dissolution by interacting with scale ions that are not reachable by the other multidentate ligand or are reachable by the other multidentate ligand only to a limited degree.

According to certain embodiments, de-scaling can be achieved using a relatively low amount of oxalate anions. In some embodiments, the de-scaling composition contains oxalate anions in an amount of at least about 0.5 wt %, at least about 1 wt %, at least about 2 wt %, at least about 3 wt %, at least about 4 wt %, or at least about 5 wt %. In some embodiments, the amount of oxalate anions in the de-scaling composition can be less than about 20 wt %, less than about 15 wt %, or less than about 10 wt %.

In certain embodiments, the de-scaling composition used to remove scale from a solid surface of the water treatment system comprises oxalate anions and diethylenetriaminepentaacetic acid (DTPA). Without wishing to be bound by any particular theory, it is believed that the combination of oxalate anions and DTPA exhibit, in some instances, a particularly beneficial synergy that allows the combination of the two chemicals to remove much more scale than could be removed using either of the two chemicals alone.

In some embodiments, the de-scaling composition used to remove scale from solid surfaces has a basic pH. For example, in some embodiments, the de-scaling composition has a pH of at least about 8, at least about 10, at least about 12, or at least about 12 (and/or, in some embodiments, a pH of up to about 14, or higher). The pH of the de-scaling composition can be raised, according to certain embodiments, by adding hydroxide ions to the de-scaling composition. This can be achieved, for example, by dissolving one or more hydroxide salts (e.g., potassium hydroxide, sodium hydroxide, or any other suitable hydroxide salt) within the de-scaling composition.

It has also been found that the amount of water contained in the de-scaling composition can also impact the rate at which the formation of coordination complexes occurs. Thus, in some embodiments, the de-scaling composition is diluted with water. In some embodiments, the de-scaling composition contains water in an amount of at least about 10 wt %, at least about 20 wt %, at least about 30 wt %, or at least about 35 wt % (and/or in some embodiments, up to about 40 wt %, up to about 45 wt %, up to about 50 wt %, or more).

The de-scaling compositions used to remove scale as described above can be used to remove many types of scale, including many of the scaling salts mentioned above or elsewhere herein (e.g., $BaSO_4$, $SrSO_4$, $BaCO_3$, and/or $SrCO_3$, and/or many of the scaling salts mentioned above or elsewhere herein). According to certain embodiments, the de-scaling composition is configured to remove scales that are most often formed when treating oilfield wastewaters, such as wastewater and produced water from hydraulic fracturing operations. In certain (although not necessarily all) embodiments, the de-scaling compositions used to remove scale can be especially effective in removing strontium-containing scale (e.g., salts containing $Sr^{2+}$ ions such as, for example, strontium carbonate, strontium bicarbonate, strontium sulfate, and strontium bisulfate).

Example

Figure 13:
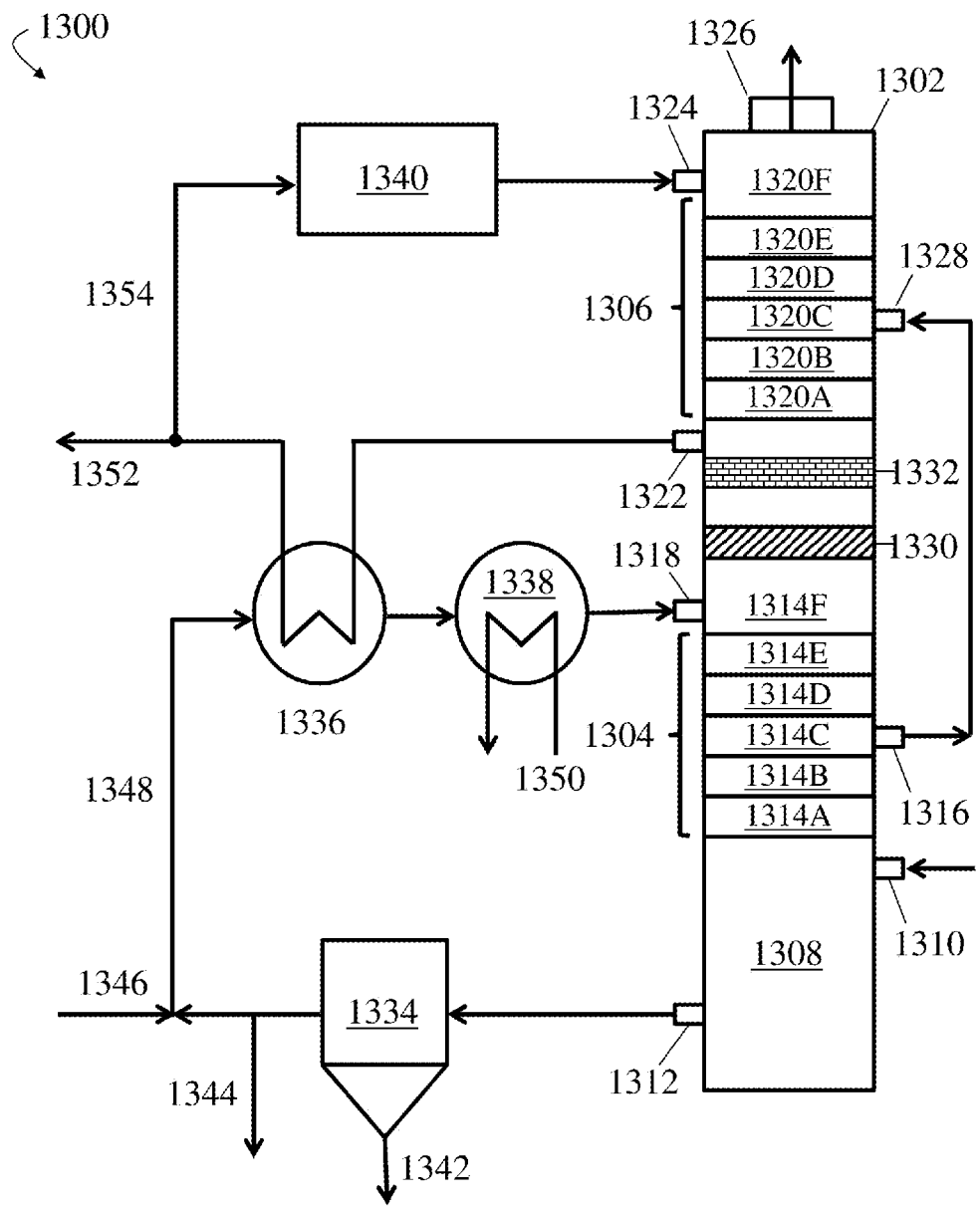
FIG. 13 shows, according to some embodiments, a schematic illustration of an exemplary desalination system comprising an apparatus comprising a humidification region and a dehumidification region, a precipitation apparatus, a first heat exchanger, a second heating exchanger, and a cooling device.

As shown in FIG. 13, this example describes desalination system 1300, which comprises combined bubble column apparatus 1302, precipitation apparatus 1334, first heat exchanger 1336, second heat exchanger 1338, and cooling device 1340. Desalination system 1300 is configured to produce 850 barrels of substantially pure water per day.

Combined bubble column apparatus 1302 comprises humidification region 1304 and dehumidification region 1306 positioned vertically above humidification region 1304. As shown in FIG. 13, apparatus 1302 further comprises gas distribution chamber 1308 positioned vertically below humidification region 1304. In FIG. 13, gas distribution chamber 1308 is in fluid communication with apparatus air inlet 1310 and humidification region brine outlet 1312. In some cases, gas distribution chamber 1308 comprises a liquid sump volume and a gas distribution region positioned above the liquid sump volume. Humidification region 1304 comprises a plurality of stages 1314A-F that are vertically arranged above gas distribution chamber 1308. Each of stages 1314A-F is coupled to a bubble generator and comprises a liquid layer and a vapor distribution region positioned above the liquid layer. As shown in FIG. 13, third stage 1314C is fluidically connected to intermediate air outlet 1316, and sixth stage 1314F (e.g., the topmost stage of humidification region 1304) is fluidically connected to humidification region brine inlet 1318. Dehumidification region 1306 comprises a plurality of vertically-arranged stages 1320A-F, each stage coupled to a bubble generator and comprising a liquid layer and a vapor distribution region positioned above the liquid layer. A liquid collection region positioned below first stage 1320A is fluidically connected to dehumidification region water outlet 1322, and sixth stage 1320F (e.g., the topmost stage of dehumidification region 1306) is fluidically connected to dehumidification region water inlet 1324 and apparatus air outlet 1326. In addition, third stage 1320C is fluidically connected to intermediate air inlet 1328, which is fluidically connected to intermediate air outlet 1316 through a gas conduit. Droplet eliminator 1330 and liquid collector 1332 are positioned between humidification region 1304 and dehumidification region 1306.

In addition to combined bubble column apparatus 1302, desalination system 1300 comprises precipitation apparatus 1334, first heat exchanger 1336, second heat exchanger 1338, cooling device 1340, solid conduit 1342, and liquid conduits 1344, 1346, 1348, 1350, 1352, and 1354. Precipitation apparatus 1334 is directly fluidically connected to humidification region brine outlet 1312 and first heat exchanger 1336. First heat exchanger 1336, in addition to being directly fluidically connected to precipitation apparatus 1334, is directly fluidically connected to dehumidification region water outlet 1322, second heat exchanger 1338, and cooling device 1340. Additionally, second heat exchanger 1338 is directly fluidically connected to humidification region brine inlet 1318, and cooling device 1340 is directly fluidically connected to dehumidification region water inlet 1324.

In operation, ambient air enters humidification region 1304 of combined bubble column apparatus 1302 through apparatus air inlet 1310. The ambient air enters humidification region 1304 at a flow rate of 8330 actual cubic feet per minute (acfm) and a temperature of 60° F. The stream of ambient air flows upwards through each of stages 1314A, 1314B, 1314C, 1314D, 1314E, and 1314F of humidification region 1304. Meanwhile, a stream comprising salt-containing water enters humidification region 1304 through humidification region brine inlet 1318 at a flow rate of 632 gallons per minute (gpm) and a temperature of 200° F. The salt-containing water stream flows in a direction substantially opposite to the direction of the flow of the air stream (e.g., downwards through each of stages 1314F, 1314E, 1314D, 1314C, 1314B, and 1314A of humidification region 1304). Each of stages 1314A-F is at least partially occupied by a liquid layer comprising the salt-containing water. Accordingly, as the air stream flows upwards through the stages of humidification region 1304, each of which is coupled to a bubble generator, air bubbles form and travel through the liquid layers comprising the salt-containing water, which has a higher temperature than the air bubbles. As the air bubbles come into direct contact with the salt-containing water of the liquid layers, heat and mass (e.g., water vapor) are transferred from the salt-containing water to the air bubbles, and the air bubbles become increasingly heated and humidified. Within the vapor distribution region of each stage, heated and at least partially humidified air bubbles recombine to form an air stream that is substantially evenly distributed throughout the vapor distribution region. The substantially evenly distributed air stream may then pass through a bubble generator coupled to the next stage and flow through the liquid layer of that next stage, becoming further heated and humidified. When the air stream reaches third stage 1314C, at least a portion of the heated and at least partially humidified air stream exits humidification region 1304 through intermediate air outlet 1316 at a flow rate of 8000 acfm and a temperature of 160° F. The remaining portion of the air stream continues to flow upwards through the vertically-arranged stages 1314D-F of humidification region 1304.

After flowing through stages 1314A-F of humidification region 1304, the heated, at least partially humidified air stream flows through droplet eliminator 1330 and liquid collector 1332 and enters dehumidification region 1306. The heated, at least partially humidified air stream flows upwards through each of stages 1320A, 1320B, 1320C, 1320D, 1320E, and 1320F of dehumidification region 1306. Meanwhile, a stream of substantially pure water enters dehumidification region 1306 through dehumidification region water inlet 1324 at a flow rate of 550 gpm and a temperature of 125° F. The substantially pure water stream flows in a direction substantially opposite to the direction of the flow of the air stream (e.g., downwards through each of stages 1320F, 1320E, 1320D, 1320C, 1320B, and 1320A of dehumidification region 1306). Each of stages 1320A-F is at least partially occupied by a liquid layer comprising the substantially pure water. Accordingly, as the heated, at least partially humidified air stream flows upwards through the stages of dehumidification region 1306, each of which is coupled to a bubble generator, heated, at least partially humidified air bubbles form and travel through the liquid layers comprising the substantially pure water, which has a lower temperature than the heated, at least partially humidified air bubbles. As the air bubbles come into direct contact with the substantially pure water, heat and mass (e.g., water vapor) are transferred from the air bubbles to the substantially pure water of the liquid layers, and the air bubbles become increasingly cooled and dehumidified. Within the vapor distribution region of each stage, cooled, at least partially dehumidified air bubbles recombine to form an air stream that is substantially evenly distributed throughout the vapor distribution region. In third stage 1320C, heated, at least partially humidified air extracted from intermediate air outlet 1316 enters dehumidification region 1306 and joins the air stream flowing through dehumidification region 1306. After flowing through each of stages 1320A-F of dehumidification region 1306, the cooled, at least partially dehumidified air stream exits combined bubble column apparatus 1302 through apparatus gas outlet 1326.

As noted above, two liquid streams—a substantially pure water stream and a salt-containing water stream—flow through combined bubble column apparatus 1302 counter-flow to the air stream. The salt-containing water stream, which comprises water and at least one dissolved salt, enters humidification region 1304 of combined bubble column apparatus 1302 through humidification region brine inlet 1318 and flows downwards through each of stages 1314A-F of humidification region 1304 to gas distribution chamber 1308. As the salt-containing water stream flows downwards through each stage of humidification region 1304, the salt-containing water stream encounters air bubbles having a temperature lower than the temperature of the salt-containing water stream, and heat and mass (e.g., water vapor) are transferred from the salt-containing water stream to the air bubbles, thereby resulting in a cooled, concentrated salt-containing water stream. As the salt-containing water stream flows through each stage of humidification region 1304, the concentration of at least one dissolved salt in the salt-containing water stream increases (e.g., due to evaporation of water). The cooled, concentrated salt-containing water stream then exits apparatus 1302 through humidification region brine outlet 1312 at a flow rate of 593 gpm and a temperature of 136° F. The cooled, concentrated salt-containing water stream is then made to flow to precipitation apparatus 1334, and at least a portion of at least one dissolved salt in the salt-containing water stream may precipitate within the precipitation apparatus. The precipitated salt may be discharged from system 1300 through solid conduit 1342. The remaining liquid portion of the salt-containing water stream exits precipitation apparatus 1334 as a precipitation apparatus liquid outlet stream. In some cases, at least a portion of the precipitation apparatus liquid outlet stream is discharged from desalination system 1300 through conduit 1344 at a flow rate of 593 gpm. Another portion of the precipitation apparatus liquid outlet stream may remain in desalination system 1300. In some cases, additional salt-containing water may enter desalination system 1300 through conduit 1346 at a flow rate of 25 gpm and a temperature of 60° F. The additional salt-containing water may combine with the portion of the precipitation apparatus liquid outlet stream remaining in desalination system 1300. The combined salt-containing water stream then flows through conduit 1348 to first heat exchanger 1336, entering first heat exchanger 1336 at a flow rate of 632 gpm and a temperature of 130° F. As noted above, first heat exchanger 1336 is also directly fluidically connected to dehumidification region water outlet 1322, and a substantially pure water stream enters first heat exchanger 1336 at a flow rate of 575 gpm and a temperature of 170° F. As the salt-containing water stream and substantially pure water stream flow through first heat exchanger 1336, heat is transferred from the substantially pure water stream to the salt-containing water stream, producing a heated salt-containing water stream that exits first heat exchanger 1336 at a temperature of 160° F. and a cooled substantially pure water stream that exits heat exchanger 1336 at a temperature of 140° F. The heated salt-containing water stream is then made to flow to second heat exchanger 1338 to be further heated. As the heated salt-containing water stream enters second heat exchanger 1338 at a flow rate of 632 gpm and a temperature of 160° F. and flows through second heat exchanger 1338, a heating fluid also flows through second heat exchanger 1338 via conduit 1350. Heat is transferred from the heating fluid to the heated salt-containing water stream to produce a further heated salt-containing water stream having a temperature of 200° F. The further heated salt-containing water stream then returns to humidification region 1304 of apparatus 1302 through humidification region brine inlet 1318 at a flow rate of 632 gpm and a temperature of 200° F.

In addition to the salt-containing water stream, a substantially pure water stream flows through combined bubble column apparatus 1302. The substantially pure water stream enters dehumidification region 1306 of apparatus 1302 through dehumidification region water inlet 1324 at a flow rate of 550 gpm and a temperature of 125° F. As the substantially pure water stream flows downwards through each of stages 1320A-F of dehumidification region 1306, the substantially pure water stream encounters bubbles of heated, at least partially humidified air, and heat and mass (e.g., water vapor) are transferred from the heated, at least partially humidified air bubbles to the substantially pure water stream, thereby resulting in a heated substantially pure water stream. As the substantially pure water stream flows downwards through each of the stages of dehumidification region 1306, the temperature of the substantially pure water stream increases. The heated substantially pure water stream then exits apparatus 1302 through dehumidification region water outlet 1322 at a flow rate of 575 gpm and a temperature of 170° F. After exiting apparatus 1302, the heated substantially pure water stream is made to flow through first heat exchanger 1336, where heat is transferred from the heated substantially pure water stream to the precipitation apparatus liquid outlet stream (e.g., a portion of the cooled, concentrated salt-containing water stream that exited apparatus 1302 through humidification region brine outlet 1312) to produce a cooled substantially pure water stream. The cooled substantially pure water stream exits first heat exchanger 1336 at a temperature of 140° F. In some cases, at least a portion of the cooled substantially pure water stream exits desalination system 1302 through conduit 1352 at a flow rate of 25 gpm and a temperature of 140° F. In some embodiments, at least a portion of the cooled substantially pure water stream remains in desalination system 1302 and is made to flow through conduit 1354 to cooling device 1340. The cooled substantially pure water stream enters cooling device 1340, which may be an air-cooled heat exchanger, at a flow rate of 550 gpm and a temperature of 135° F. As the cooled substantially pure water stream flows through cooling device 1340, the stream is further cooled to a temperature of 125° F. The further cooled substantially pure water stream then returns to combined bubble column apparatus 1302, entering dehumidification region 1306 of apparatus 1302 through dehumidification region water inlet 1324 at a flow rate of 550 gpm and a temperature of 125° F.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

In cases where the present specification and a document incorporated by reference, attached as an appendix, and/or referred to herein include conflicting disclosure, and/or inconsistent use of terminology, and/or the incorporated/appended/referenced documents use or define terms differently than they are used or defined in the present specification, the present specification shall control.

What is claimed is:

1. A desalination system, comprising:
   a vessel, comprising:
      a bubble column humidification region comprising a humidification region liquid inlet fluidically connected to a source of salt-containing water, a humidification region gas inlet fluidically connected to a source of a gas, a humidification region gas outlet, and one or more bubble generators, wherein the bubble column humidification region is configured to produce a vapor-containing humidification region gas outlet stream enriched in water vapor relative to the gas received from the humidification region gas inlet; and
      a bubble column dehumidification region comprising a dehumidification region gas inlet fluidically connected to the humidification region gas outlet, a dehumidification region gas outlet, a dehumidification region water outlet, and one or more bubble generators, wherein the bubble column dehumidification region is configured to remove at least a portion of the water vapor from the vapor-containing humidification region gas outlet stream to produce a dehumidification region water outlet stream and a dehumidification region gas outlet stream lean in water vapor relative to the humidification region gas outlet stream,
   wherein:
      the vessel has a height of about 5 m or less, and
      the bubble column humidification region and the bubble column dehumidification region are arranged within the vessel such that there is a fluidic pathway, within the vessel, from the bubble column humidification region to the bubble column dehumidification region.

2. The desalination system of claim 1, wherein the humidification region is configured to evaporate at least about 500 barrels per day.

3. The desalination system of claim 1, wherein the humidification region is configured to evaporate between about 500 barrels per day and about 2,500 barrels per day.

4. The desalination system of claim 1, wherein the dehumidification region is configured to condense at least about 500 barrels per day.

5. The desalination system of claim 1, wherein the dehumidification region is configured to condense between about 500 barrels per day and about 2,500 barrels per day.

6. The desalination system of claim 1, wherein the vessel has a footprint in the range of about 10 $m^2$ to about 100 $m^2$.

7. The desalination system of claim 1, wherein the one or more bubble generators of the humidification region and/or dehumidification region comprise a sparger plate comprising a plurality of holes.

8. The desalination system of claim 1, further comprising an external heat exchanger fluidically connected to the humidification region liquid inlet and the dehumidification region water outlet.

9. The desalination system of claim 1, further comprising a shipping trailer, wherein the vessel is positioned on the shipping trailer.

10. The desalination system of claim 9, wherein the shipping trailer comprises a flatbed trailer, a step deck trailer, or a lowboy trailer.

11. The desalination system of claim 10, wherein the flatbed trailer has a length of about 48 feet and a width of about 8 feet, 6 inches.

12. The desalination system of claim 10, wherein the flatbed trailer has a length of about 53 feet and a width of about 8 feet, 6 inches.

13. The desalination system of claim 9, wherein the vessel occupies at least about 75% of the available cargo area of the shipping trailer.

14. The desalination system of claim 9, wherein the vessel is contoured to fit around a wheel well of the shipping trailer.

15. The desalination system of claim 1, further comprising one or more wheels integrated with the vessel.

16. The desalination system of claim 1, further comprising a shipping container, wherein the vessel is positioned within the shipping container.

17. The desalination system of claim 16, wherein the shipping container is an intermodal shipping container.

18. The desalination system of claim 16, wherein the shipping container has a nominal length of 20 feet or 40 feet.

19. The desalination system of claim 16, wherein the shipping container has a height of 8 feet, 6 inches or 9 feet, 6 inches.

* * * * *